United States Patent [19]

Nguyen

[11] Patent Number: 4,888,711

[45] Date of Patent: Dec. 19, 1989

[54] IMAGE INTERPRETATION METHOD AND APPARATUS USING FACES FOR CONSTRAINT SATISFACTION

[75] Inventor: Van-Duc Nguyen, Albany, N.Y.

[73] Assignee: General Electric Company, Schenectady, N.Y.

[21] Appl. No.: 121,301

[22] Filed: Nov. 16, 1987

[51] Int. Cl.[4] ........................ G09G 1/06; G06F 15/20

[52] U.S. Cl. .................................... 364/522; 340/723; 364/521

[58] Field of Search ................................ 364/518-522; 340/721, 723; 382/44-48

[56] References Cited

U.S. PATENT DOCUMENTS

| | | | |
|---|---|---|---|
| 4,475,104 | 10/1984 | Shen | 364/521 X |
| 4,609,917 | 9/1986 | Shen | 364/522 X |
| 4,709,231 | 11/1987 | Sakalbara et al. | 364/522 X |

OTHER PUBLICATIONS

"The Psychology of Computer Vision", Chapter 2, 1975, pp. 76-77.

Chapter 2 of "The Psychology of Computer Vision", that Chapter being authored by David Waltz, McGraw Hill, 1975.

"Artificial Intelligence" by P. H. Winston, Addison-Wesley Publishing Company, 1984, pp. 43-72.

"Consistency in Networks of Relations" by A. K. Mackworth, Artificial Intelligence, vol. 8, 1977, pp. 99-118.

"The Complexity of Some Polynomial Network Consistency Algorithms for Constraint Satisfaction Problems" by A. K. Mackworth et al., Artificial Intelligence, vol. 25, 1985, pp. 65-74.

"Network of Constraints: Fundamental Properties and Applications to Picture Processing" by V. Montanari, Information Science, vol. 7, 1976, pp. 95-132.

"Exploiting 2D Topology in Labeling Polyhedral Images" by Van-Duc Nguyen, Tenth International Joint Conference on Artificial Intelligence, Milan, Italy, Aug. 23-30, 1987.

*Primary Examiner*—David L. Clark
*Assistant Examiner*—H. R. Herndon
*Attorney, Agent, or Firm*—John S. Beulick; James C. Davis, Jr.; Paul R. Webb, II

[57] ABSTRACT

A method, for practice on a computer, for interpreting two-dimensional images of three-dimensional scenes is disclosed. Descriptive labels are assigned to the vertex, edge and face elements of the image. A process of constraint satisfaction and propagation is carried out between image elements that are linked together with the effect of pruning away locally inconsistent labels at each element. The remaining labels assigned to the image elements are both locally and globally consistent.

10 Claims, 7 Drawing Sheets

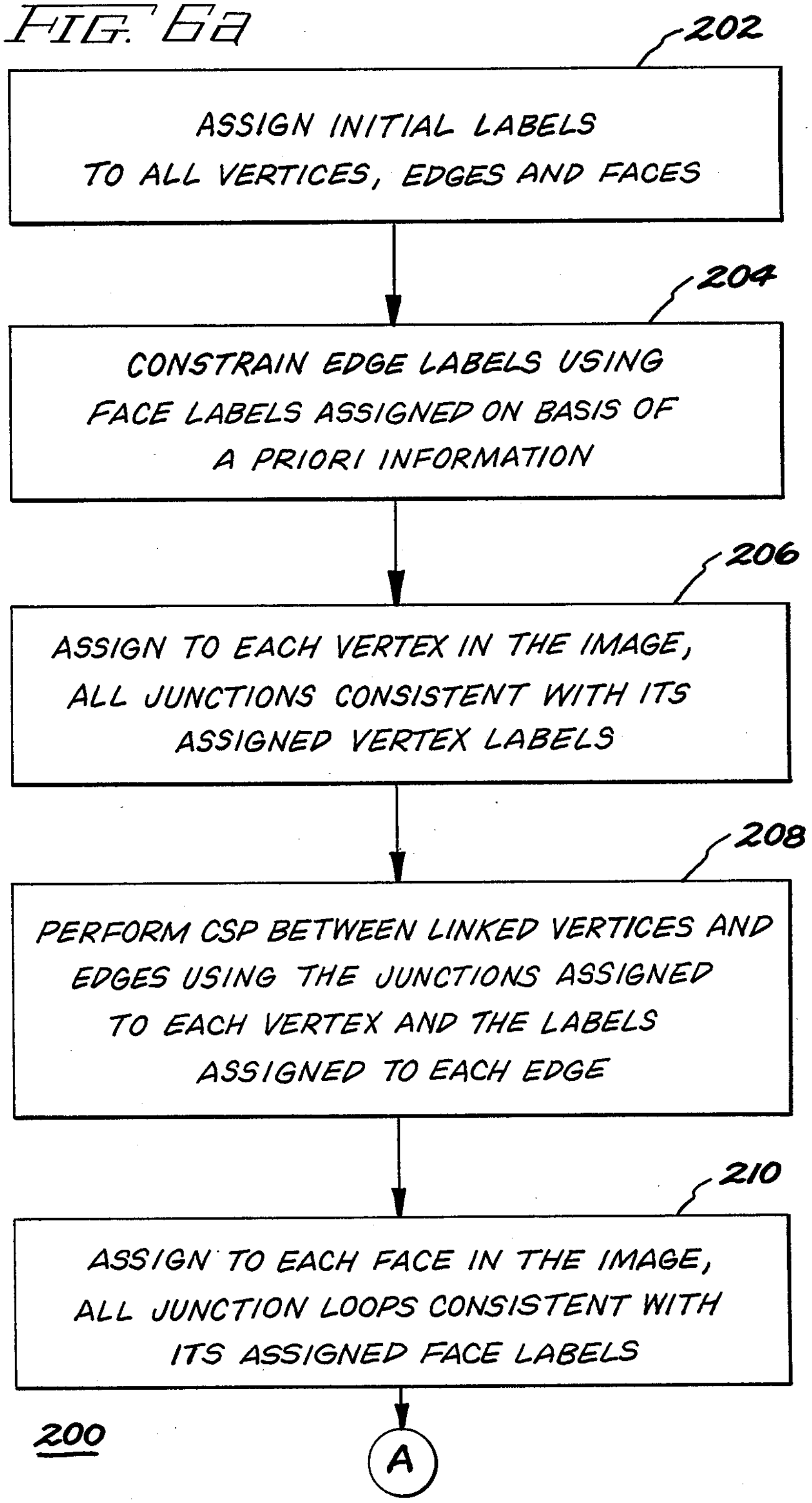

FIG. 6a

202 ASSIGN INITIAL LABELS TO ALL VERTICES, EDGES AND FACES

204 CONSTRAIN EDGE LABELS USING FACE LABELS ASSIGNED ON BASIS OF A PRIORI INFORMATION

206 ASSIGN TO EACH VERTEX IN THE IMAGE, ALL JUNCTIONS CONSISTENT WITH ITS ASSIGNED VERTEX LABELS

208 PERFORM CSP BETWEEN LINKED VERTICES AND EDGES USING THE JUNCTIONS ASSIGNED TO EACH VERTEX AND THE LABELS ASSIGNED TO EACH EDGE

210 ASSIGN TO EACH FACE IN THE IMAGE, ALL JUNCTION LOOPS CONSISTENT WITH ITS ASSIGNED FACE LABELS

200

(A)

300

IMAGE INTERPRETATION METHOD AND APPARATUS USING FACES FOR CONSTRAINT SATISFACTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention is related in general to computerized image interpretation techniques and, more specifically, to a method for interpreting the two-dimensional images of three-dimensional scenes.

BACKGROUND OF THE INVENTION

The general problem addressed by the method of the present invention is the interpretation of two-dimensional images of three-dimensional scenes. The problem, in a form addressed by prior art methods, is directed to image interpretation where the three-dimensional scene is comprised of plane faced objects. The two-dimensional image of such a scene is composed of the faces, edges and vertices of the three-dimensional objects. By techniques known in the art, that are not the subject of the present invention, e.g. edge detection or image segmentation, such a two-dimensional image can be initially processed by a computer to generally distinguish the object edges as lines and the vertices as points at which those lines intersect. Each face, then, is simply a connected region enclosed by the lines. Where the three-dimensional scene includes shadows caused by a light source directed onto the scene, the shadow regions will also be delineated by the image processing. For convenience, the features of the two-dimensional image are referred to herein as vertices, edges and faces. The interpretation of the two-dimensional image commences with this initial image data, generated by initial computer processing, about the three-dimensional scene.

A variety of methods are known in the art for interpreting the initial image data characterizing the two-dimensional image as edges, vertices, and faces. One particular method that is relevant to the practice of the present invention is an image intrepretation method formulated by David Waltz. That method is described in the book "The Psychology of Computer Vision" Chapter 2 of which (pages 19–91) is authored by David Waltz, the book being edited by P. H. Winston and published by McGraw-Hill, 1975. Chapter 2 of that book is incorporated in its entirety herein by reference. Basic aspects of two-dimensional image interpretation including D. Waltz's method are described in the book "Artificial Intelligence" by P. H. Winston, Addison-Wesley Publishing Company, 1984, at pages 43–72, those pages being incorporated in their entirely herein by reference. Common to such image interpretation methods is a cataloguing, by symbolic labels, of the possible edge and vertex configurations that may be encountered. Such configuration labels, many of which being illustrated in the above incorporated text pages and some of which being described and illustrated hereinbelow, serve to characterize the vertices and each image edge that extends between a pair of vertices. Commencing with the initial image data, it is at best possible to assign a plurality of possible ones of such labels to each vertex in the image. Waltz describes a method of "filtering" these labels, i.e. eliminating from consideration labels that cannot correctly characterize a particular vertex and an edge extending from that vertex to another vertex. That filtering method proceeds by using the labels at one vertex to constrain the possible labels at each other adjacent vertex joined thereto by an edge. In this manner, the constraints are propagated throughout the two-dimensional image and the number of labels remaining at each vertex is minimized. This basic aspect of the filtering method is referred to herein as contraint satisfaction and propagation. Descriptions of theoretical aspects of constraint satisfaction and propagation, as applied to a network of nodes, are disclosed in "Consistency in Networks of Relations" by A. K. Mackworth, Artificial Intelligence, Vol. 8, pp. 99–118 (1977); "The Complexity of Some Polynomial Network Consistency Algorithms for Constraint Satisfaction Problems" by A. K. Mackworth et al., Artificial Intelligence, Vol. 25, pp, 65–74, (1985); and "Network of Constaints: Fundamental Properties and Applications to Picture processing" by V. Montanari, Information Science, Vol. 7, pp. 95–132, (1976).

One deficiency with the Waltz filtering method is the relatively long computing time required to execute it upon a complex image. It would therefore be desirable to provide an image interpretation method that constrains the image labelling to characterize a two-dimensional image in a relatively short computing time.

The Waltz filtering method by concentrating on satisfying the constraints existing between adjacent vertices achieves what is referred to as local consistency between those vertices. That is, since the labels at each vertex are constrained by and used to constain the labels at each adjacent vertex connected thereto by an edge, a local consistency is achieved between such adjacent vertices. The filtering method does not by its nature achieve global consistency over the entire image being interpreted. Global consistency means that the label(s) remaining, after a process such as Waltz's filtering method, for each image element is consistent with all other element labels remaining in the image. With respect to Waltz's filtering method, it is suggested that the art that global consistency among image element labels can be achieved following filtering by performing an additional depth first search with respect to each label. In such a depth first search, each label would be considered in turn with respect to its consistency not only with labels of adjacent elements but also with labels of all other elements in the image. As a result, for an image having m elements being labelled and an average of n labels remaining per element, after filtering, the size of the remaining search space within which to perform the depth first search is on the order of $n^m$ possible label combinations. For a fairly complex image where m is on the order of 100 or more, it is readily apparent that the remaining computing task to achieve global consistency can be prohibitively large. Aside from this disadvantage associated with attempting to achieve global consistency, problems can arise if the image being interpreted contains extraneous elements or is missing one or more elements (e.g. extra or missing lines). In such a case, the depth first search to achieve global consistency may find no consistency at all and the entire interpretation process will fail. It is therefore additionally desirable to provide an image interpretation method that does not suffer these disadvantages associated with achieving global consistency.

OBJECTS OF THE INVENTION

It is a principal object of the present invention to provide an image interpretation method, and apparatus for practicing the method, that is not subject to the aforementioned problems and disadvantages.

It is an additional object of the present invention to provide an image interpretation method which provides image labelling with a relatively short computing time.

It is a further object of the present invention to provide an image interpretation method that achieves a global consistency between the labels assigned to image elements without encountering the above described short-comings of prior art image interpretation methods.

SUMMARY OF THE INVENTION

The foregoing objects of the present invention are achieved by means of a new image interpretation method for practice on a computer and computing apparatus constructed to practive that image interpretation method. The method interprets a two-dimensional image of a three-dimensional scene, where the two-dimensional image comprises a plurality of vertices, edges and faces. Each vertex is defined by the intersection of at least two edges of the image. Each image face is defined by the closed chain of edges which bound it. Each vertex is associatively linked with its defining intersecting edges and with the faces bound by those defining edges. Each face is associatively linked with each edge of the closed edge chain bounding the face.

The method proceeds with a required initial step in which a vertex label, an edge label and a face label are respectively assigned to each vertex, edge and face of the image. The vertex, edge and face labels are respectively selected from vertex, edge and face label hierarachies. Each vertex label is selected on the basis of the number and configuration of the intersecting edges defining the vertex to which the label is being assigned. The method next proceeds to an optional step that can be performed if a priori information is available to characterize a selected image face and thereby refine the face label assigned to that face. In such a case, the edge labels assigned to the edges bounding the selected face are constrained to be consistent with the face label assigned on the basis of the a priori information.

Following the step, a required step is performed in which for each vertex label a predetermined set of junctions consistent with the vertex label is assigned. An optional step is next performed in which a process of constraint satisfaction and propagation (CSP) is performed between linked vertices and edges of the image using the junctions and edge labels respectively assigned to the vertices and edges of the image. At a next required step of the inventive method, junction loops are assigned to each image face, this process entailing a search of all possible junction loops for each image face. The search narrows for consideration only those junction loops having the property that the junctions of adjacent vertices represented in the junction loop have the same edge label for their common edge. Only those junction loops found to be consistent with the face labels assigned to a particular face are assigned to that face. Each junction loop is an in-tuple of junction labels and consists of one junction from each of the n vertices respectively at each of n intersections of the edges bounding the face.

The inventive image interpretation method proceeds to an optional step in which CSP is performed between linked vertices and edges of the image and between linked image vertices and faces. This CSP step is performed using the junctions, edge labels and junction loops respectively assigned to the image vertices, edges and faces. Following this step, a required step is performed in which junction pairs are assigned for each image edge. Each junction pair is a two-tuple of junctions and consists of one junction assigned to each vertex at each end of the edge. The assignment process entails a search of all possible junction pairs which narrows for consideration junction pairs within which the junctions assigned to the vertices at the ends of the edge have the same edge label for that edge. Only those junction pairs that are found to be consistent with the edge labels assigned to a particular edge are assigned to that edge. The method then proceeds to a final required step in which CSP is performed between linked vertices and edges, between linked vertices and faces and between linked edges and faces of the image. This CSP step is performed using the junctions, junction pairs and junction loops respectively assigned to the image vertices, edges and faces. The result of performing the inventive method is a set of junctions, junction pairs and junction loops and their respectively corresponding vertex, edge and face labels that are descriptive of the three-dimensional scene. By operation of the inventive method, the resulting junctions, junction pairs and junction loops and their respectively corresponding vertex, edge and face labels are not only locally consistent but also globally consistent.

In a serial implemented embodiment of the present invention, the above steps are performed in sequence on a computer. A parallel implemented embodiment of the present invention may be practiced on a parallel processing system. Such a system comprises a plurality of processors each comprising processing means for performing arithmetic and logical functions and memory means for storing information. With each vertex, edge and face of the image being an image element, each such image element is stored in the memory means of a different one of the processors. Each particular processor is intercoupled to at least read information stored in each other processor storing one of the elements linked to the element stored in the particular processor. Each processor is programmed to at least perform the above described required steps of the invention to the extent possible in accordance with the type of image element (i.e. vertex, edge or face) stored therein and the information stored in the processors storing linked elements. The ability to read information such as labels, junctions, etc. at the linked processors enables each processor to perform CSP when sufficient information is available.

BRIEF DESCRIPTION OF THE DRAWINGS

While the specification concludes with claims defining the features of the invention that are regarded as novel, it is believed that the invention, together with further objects thereof will be better understood from a consideration of the following description in conjunction with the drawing figures, in which:

FIGS. 6a and 6b illustrate is a flowchart representation of a serial implemented embodiment of the image interpretation method of the present invention.

DESCRIPTION OF THE INVENTION

The method of the present invention is effective for interpreting two-dimensional images including polyhedral images having complex features such as multihedral vertices, i.e. vertices at which three or more planes intersect, shadows cast by a light source and other image features, e.g. cracks, such as described in the above incorporated text pages by Waltz and Winston. The embodiment of the present invention described hereinbelow is however, for illustrative purposes, demonstrated on a two-dimensional polyhedral image without shadows or cracks and with trihedral vertices and planar faces. It will become apparent, however, that the inventive method is readily applicable to more complex images including polyhedral images additionally characterized by the above noted complex features. Further, appendices to this specification contain ZetaLisp source code of an implementation of the present invention capable of interpreting a variety of such complex features.

Figure 1A:
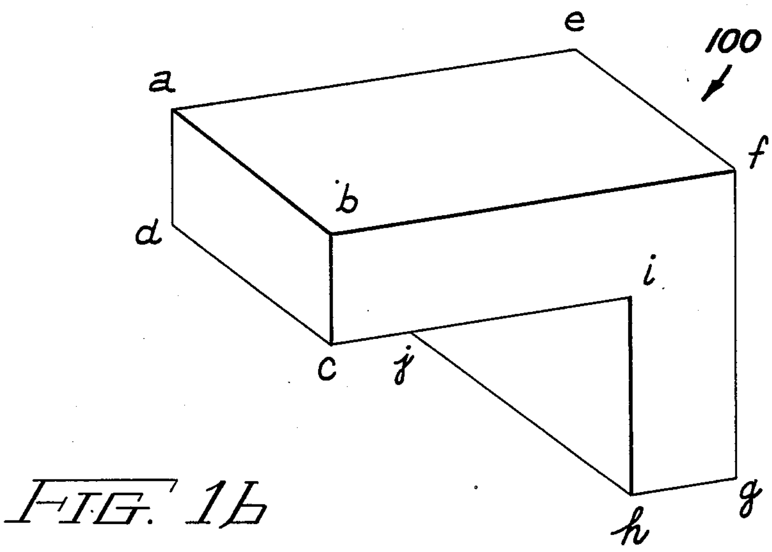
FIGS. 1*a* and 1*b* each illustrate a two-dimensional image of a three-dimensional L-shaped object with reference to which the method of the present invention is described.
Figure 1B:
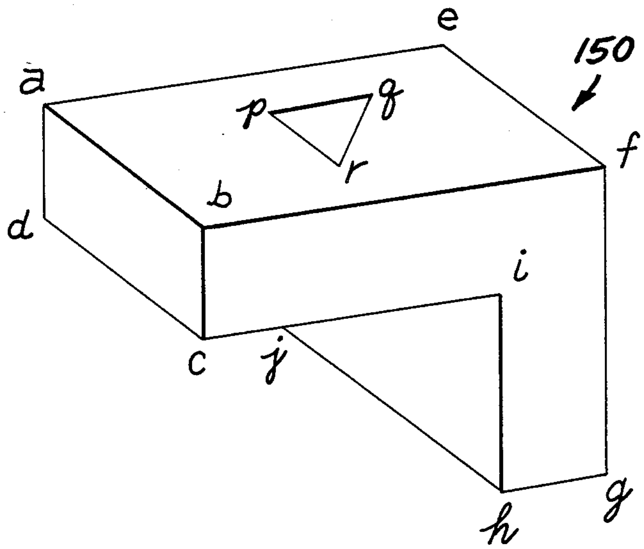

FIG. 1a illustrates a two-dimensional image 100 of a three-dimensional L-shaped solid object with reference to which the method of the present invention will be described. The L-shaped solid has planar faces. The vertices of image 100 are identified with the lower case letters "a, b, . . . , j" where a vertex is defined as the intersection of at least two edges in the image. Each edge in image 100 will, for convenience of description, be referred to according to the vertex letters at its respective ends. Thus, edges in image 100 may be referred to as "a-b", "b-c", etc. without particular regard to the order in whichA the vertex letters appear. With respect to faces, each face is defined as a connected region bounded by a closed chain of edges. Each face is therefore referred to as a clockwise sequence of vertex letters that follow the chain of edges defining the face. Thus, faces of image 100 may be referred to as "a-e-f-b", "a-b-c-d", etc. More generally, with respect to images more complex than image 100, a face may be defined as bound by more than one closed chain of edges. For example, referring to FIG. 1b, an image 150, shaped similarly to image 100, includes an opening p-q-r. The face, which is a connected region, surrounding that opening is defined in terms of the closed chains of edges, referred to herein as "cycles", that bound it. That face is therefore defined by the cycles a-e-f-b and p-q-r. For the illustrated embodiment of image 100 (FIG. 1a), each connected region of the image is composed of only one cycle and the term face, rather than cycle, is used to describe such region. However, the source listings in the attached appendices address the more general situation of defining image faces in terms of cycles.

Figure 2:
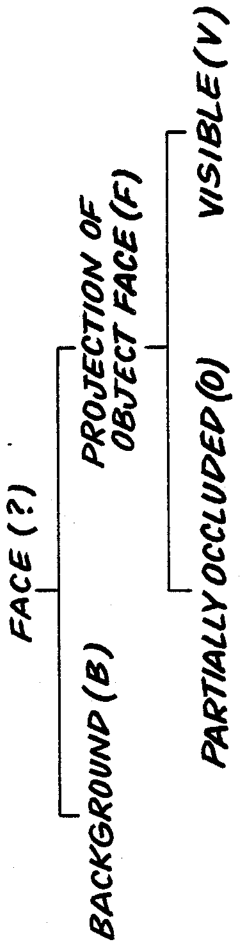
FIG. 2 illustrates a hierarchy of image face labels.

In order to practice the method of the present invention, it is first necessary to establish the hierarchy of symbolic labels that are used to characterize the edges, faces and vertices of an object the image of which is being interpreted. Such label characterizations are known in the art and described in detail in the above incorporated references by Winston and Waltz. A limited set of such labels are used to illustrate the practice of the present invention is illustrated and described herein. A label hierarchy for characterizing each face of the two-dimensional image 100 and hence each face of the corresponding three-dimensional object is shown in FIG. 2. Where no information is known about an object face, it may initially be characterized by a default label "?". The background label "B", when appropriate, identifies the background field, assuming there is one, on/against which the object is situated. For example, referring again to FIG. 1a, the region surrounding image 100 is a background field and upon being so interpreted, would appropriately be labelled with a "B". A label "F" identifies a true face of the object. However, the label "F" may be further refined to indicate whether that face is entirely visible, by assigning label "V" or is partially occluded, such as by another object face, the occluded face being labelled "O". Faces of image 100 such as a-e-f-b and j-i-h could, upon being so interpreted, be correctly labeled with an "F". However, as is intuitively clear to a human viewer of image 100, face a-e-f-b is totally visible while face j-i-h is partially occluded by face b-f-g-h-i-j-c. Thus, upon being so interpreted in accordance with the method of the present invention, faces a-e-f-b and j-i-h would respectively be labelled "V" and "O". In the source code implementation contained in the appendices to this specification, the same label hierarchy is used to characterize both faces and cycles.

Figure 3:
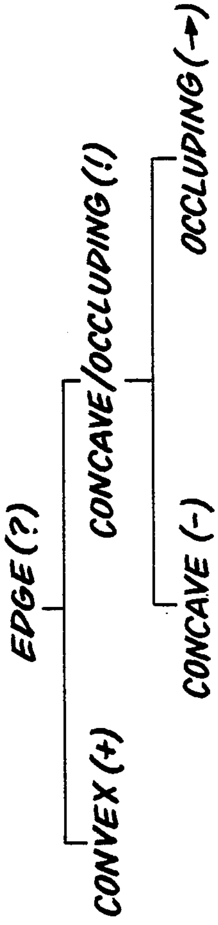
FIG. 3 illustrates a hierarchy of image edge labels.

A label hierarchy for characterizing each edge of the three-dimensional object as seen in the two-dimensional image is shown in FIG. 3. As in the case of face labels, where no information is available about an edge, an initial default label "?" may be assigned. At the next level of the edge label hierarchy, the edge may be characterized as convex with a "+" label or concave/occluding with a "!" label. A convex edge is defined by adjacent faces intersecting with an external angle, i.e. the angle subtended external to the object from one face to the other, greater than 180°. Referring again to FIG. 1a, edges a-b and b-c are examples of convex edges. A concave edge, denoted by a "—" label, is one defined by adjacent faces intersecting with an external angle less than 180°. There are no visible concave edges in image 100. An occluding edge is denoted by an arrow along the edge. Given a face that occludes another image face or the background field, each edge of the occluding face that is superimposed on the occluded face or background field is an occluding edge. The direction of the "→" label on the occluding edge is selected such that the occluding face is to the right with respect to travel along the edge in the arrow direction. Referring to FIG. 1a, edge i-j would correctly be labelled an occluding edge with the arrow pointing from the "i" toward the "j". Edges a-e, e-f and f-g are examples of occluding edges that occlude the background.

Figure 4:
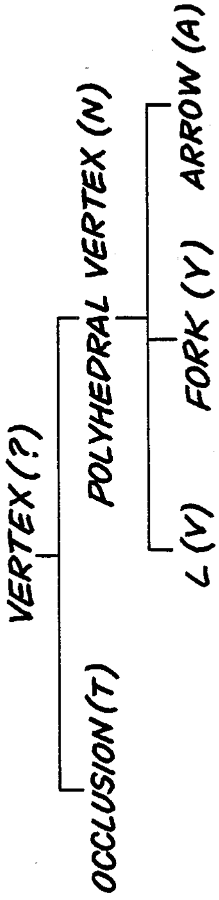
FIG. 4 illustrates a hierarchy of image vertex labels.

A label hierarchy for characterizing each vertex is illustrated in FIG. 4. As in the case of face and edge labels, an initial default label "?" may be assigned in the absence of information about a vertex. At the next level of the vertex label hierarachy, a vertex may be characterized as an occlusion, by label "T", or as a polyhedral vertex, by label, "N". An occlusion vertex is one occurring at an intersection of edges associated with the occlusion of one object face by another. Referring to FIG. 1, vertex "j" is an example of an occlusion vertex that would appropriately be labelled "T". As noted above with respect to the illustrated embodiment of the present invention, consideration of polyhedral vertices is limited to trihedral vertices, that is, vertices at which three faces meet. Only three types of labels are required in order to characterize a trihedral vertex, these being the "L" (labelled "V"), the fork (labelled "Y") and the arrow (labelled "A"). It is noted that the additional types of vertex labels for characterizing polyhedral vertices at which more than three faces meet, are described in detail in the above incorporated Winston and Waltz references. Referring again to FIG. 1*a*, vertices e, b and a of image 100 are respectively examples of L, fork and arrow vertices.

Figure 5:
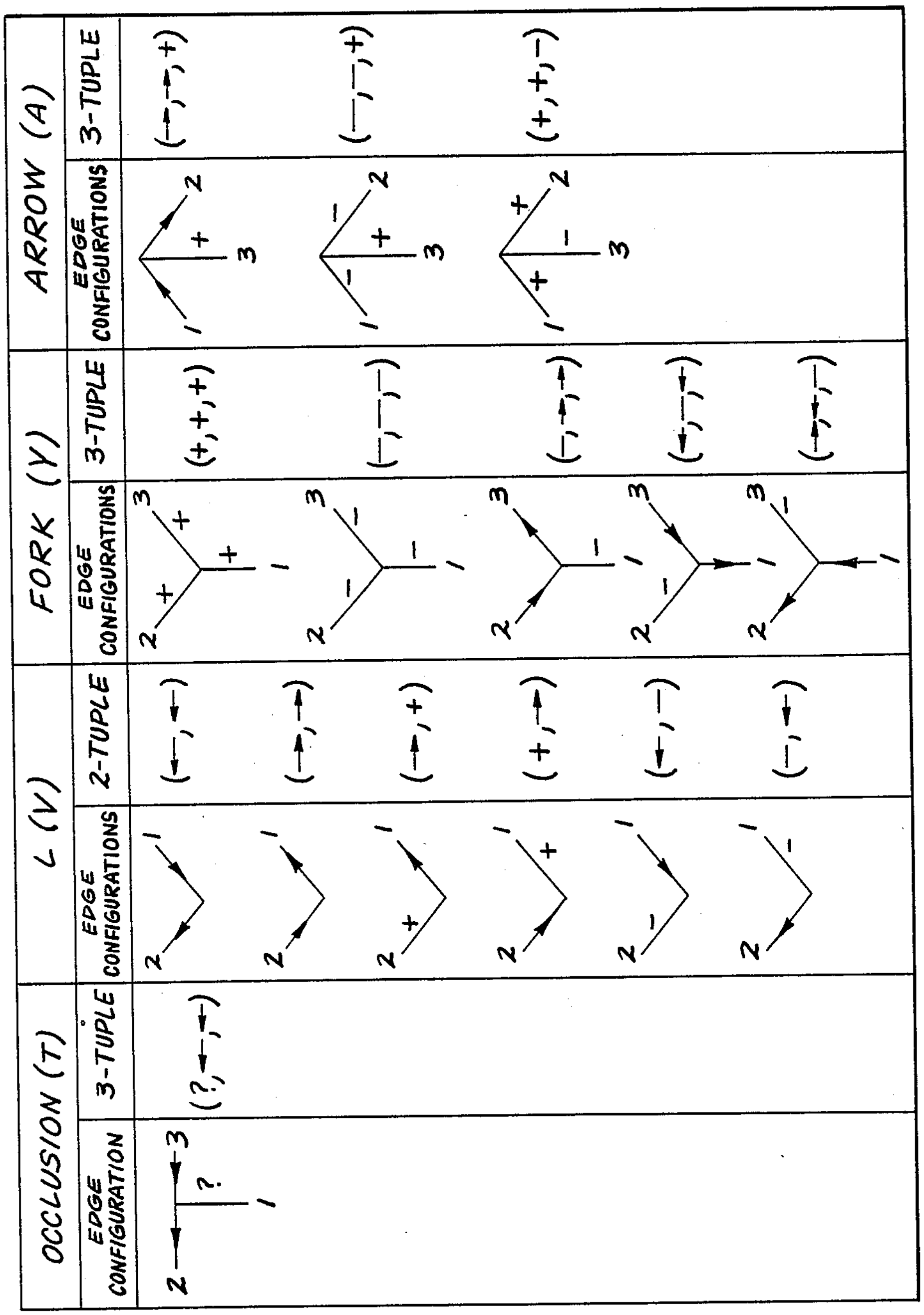
FIG. 5 illustrates an exemplary set of vertex labels and junctions consistent therewith.

The T, L, fork and arrow vertices can be formed by a variety of edge configurations. FIG. 5 illustrates the different possible edge configurations, referred to hereinafter as junctions, that can form the vertices. It is noted that each junction uniquely characterizes, by the above described edge labels, each of the two or three edges meeting at the vertex.

In the inventive image interpretation method described hereinbelow, various labels are checked to determine whether they are consistent with other labels. As used herein, the terminology "consistent with" has the meaning "is a subclass of" as would be denoted by the symbol "$\subset$", that symbol having the meaning attributed to it in set theory. Within each label hierarchy illustrated and described hereinabove, each label at a lower level of the hierarchy is "consistent with" a label from which it derives at a higher level of the hierarchy. For example, referring again to FIG. 2, the label "O" denoting a partially occluded face is consistent with the labels "F", and "?". Conversely, still with reference to the hierarchy illustrated in FIG. 2, the label "?" is *not* consistent with any other labels in the hierarchy, other than itself, since it derives from none of them. More generally, within the tree structure of each hierarchy, children are consistent with their parents, grandparents, etc., but parents are not consistent with children, grandchildren, etc. With respect to junctions (FIG. 5), a parent-child relationship exists between vertex labels and junctions so that a junction is consistent with its corresponding vertex label, but a vertex label is not consistent with its junctions.

Each junction is represented as a two-tuple or three-tuple of the edge labels of its edge configuration. These two- and three-tuples are also illustrated in FIG. 5. Thus, for example, the first possible edge configuration listed for a fork junction consists of the intersection of three convex edges. The corresponding three-tuple representing this configuration is simply (+,+,+). It is important to note that the edges that intersection at each junction are arbitrarily numbered with one edge being assigned #1 and the remaining edges being numbered in ascending sequence moving clockwise around the junction. This edge numbering is shown with each junction edge configuration in FIG. 5. The edge labels in each junction two- or three-tuple are listed in a sequence corresponding to the edge numbering. As is described in greater detail below, when in the practice of the inventive method a junction is assigned to a vertex, each edge meeting at the vertex n the image is assigned an edge number corresponding to the edge number of the junction as shown in FIG. 5 and that correspondence between image edge number and junction edge number is maintained throughout the practice of the method. For example, vertex f of image 100 (FIG. 1) which would correctly be labelled an arrow junction formed by the intersection of one convex edge and two occluding edges, would correctly be assigned the junction three-tuple (→,→,+). In that three-tuple, edges e-f, f-g and f-b would respectively be edge #s 1, 2 and 3.

In a similar manner, each image edge is also characterized herein as a two-tuple of the junction tuples at the respective ends of the edge, the edge two-tuple being referred to herein as a junction pair. For example, assuming vertex c in image 100 (FIG. 1) is characterized by the arrow junction (→,→,+), and further assuming the fork junction (+,+,+) for vertex b, the edge b-c would be described by the junction pair two-tuple ((+,+,+), (→,→,+)). Note that edge b-c need not be necessarily have the same edge number with respect to both junctions, it being edge #3 in the (→,→,+) junction and edge #1 in the (+,+,+) junction.

Each face of the image is characterized by an n-tuple of junction tuples encountered by passing over the closed chain of edges bounding the face, this n-tuple being referred to herein as a junction loop. For example, if in FIG. 1*a* vertex d is assigned the "L" junction label (←,←) and vertex a is assigned the arrow junction label (→,→,+), and further assuming the junction labels described above for vertices b and c, then face a-b-c-d would be characterized by the junction loop ((→,→,+), (+,+,+), (→,→,+), (←,←)). It is noted that with respect to junction pairs and junction loops where there is more than one possible junction assigned to a vertex, there are multiple possible combinations of junctions with which to form a junction pair or junction loop. The image interpretation method of the present invention provides a fast, efficient way to prune away inconsistent junctions at each vertex in a manner that avoids an exponential explosion of the number of possible combinations and enable interpretation of the image. In the same manner as for faces, the above described cycles are also characterized by junction loops.

As indicated hereinabove, by a process known in the art, the two-dimensional image is initially processed to distinguish edges, vertices and faces from one another. As a result of this initial processing, basic associative links exist between the elements of the image so that each edge is associatively linked to the vertices at its respective ends and to the face(s) it bounds with each face is further linked to vertices at the intersections of its bounding edges. Where cycles are also utilized to characterize an image, each cycle is linked to its bounding edges and the vertices associated therewith as well as to the image face which the cycle in part defines.

In accordance with previous image interpretation methods such as that of Waltz, the possible labels for each vertex are used to constrain the possible junctions at adjacent vertices. In this manner, a local consistency is achieved between adjacent vertices and the edges extending therebetween. Such methods suffers the problems described above with respect to the need for and difficulties associated with achieving global consistency among the labels assigned to the image features. In accordance with the present invention, the vertices, edges, cycles (where implemented) and faces of the image are treated as separate image elements distinct from one another and each is used to constrain the other elements linked thereto. As indicated hereinbelow, by performing a process of constraint satisfaction and progation between vertices, edges, cycles (where implemented) and faces, both local and global consistency are simultaneously achieved without the need for and problems encountered in performing a separate step to achieve global consistency.

Steps directed to the performance of a serial implemented embodiment of the image interpretation method of the present invention are shown in a flowchart 200 illustrated in FIGS. *6a* and *6b*. The method disclosed therein is serial in the sense that it is described to a sequence of steps to be performed in accordance with the inventive method. The performance of some of the illustrated steps are optional, as will be described in greater detail below. Appendices to this specification provide source listings of a computer program for practicing the serial embodiment of the present invention. The program has been written in the ZetaLisp programming language and has been successfully run on a Symbolics LISP machine as manufactured by Symbolics, Inc. of Concord, Mass. In the course of describing certain steps of the method hereinbelow, detailing of selected steps is presented in pseudolanguage form. As is well known, such as pseudolanguage representation effectively apprises those skilled in the art of the program structure for implementing the inventive method. Generally and as will be indicated below, within selected steps of the serial embodiment, some operations may be performed serially or in parallel. For example, where a step requires performance of an operation for each vertex of the image, that operation may be performed for each vertex in turn or simultaneously for all vertices. As an alternative to the serial embodiment, when the appropriate computing resources are available, the method of the present invention may be executed in parallel fashion. A description of such a parallel implemented embodiment is described below and source listings descriptive of such a parallel embodiment are also contained in appendices to this specification.

Referring to FIG. *6a* and flowchart 200, at a first required step 202 initial labels are assigned to all image vertices, edges and faces. With respect to each vertex, the configuration of the edges intersecting there are evaluated and possible vertex labels are assigned. The possible vertex labels are selected primarily on the basis of the number of edges intersecting and the angle of the largest sector being two adjacent edges. Details of vertex label assignments based on two-dimensional vertex appearance are described in the above incorporated Waltz reference. As a result of performing step 202, each vertex will have assigned to it one or more vertex labels. In the absence of a priori information, i.e. information known in advance, a default label "?" would be assigned to each edge and face of the image. One example of a priori information that may be available is the identity of the background field against which the object of interest in situated. This may be determined from a uniform color of the background distinct from that of the object. Also, the above incorporated Waltz reference suggests a method for determining which lines in an image are part of the boundary between the object and background field. A second example of a priori information may be the identity of a visible face of the object. The source listing in Appendix A to this specification is directed to the performance of step 202.

Next, the method proceeds to an optional step 204 in which edge labels are constrained with any a priori labels applied to the faces in step 202. If all faces of the image are labelled with the default label, step 204 is trivial and produces no useful result. As an example of constraining the edges with an priori face label, in the context of step 204, it is assumed that a priori knowledge is provided identifying the region around image 100 as background. As a result, this background region would be labelled "B". Application of this label to the edges of image 100 would constrain those edges bordering on the background to be occluding edges and therefore appropriately labelled with "→". The direction of the arrow label on each such occluding edge would be oriented so that the background is to the left relative to travel in the arrow direction. With respect to image 100, edges a-e, e-f, f-g, g-h, h-j, j-c, c-d and d-a would all be constrained to be occluding edges. Appendix B to this specification contains a source listing directed to performance of step 204. That source listing addresses the case where cycles are also used to characterize the image. In such a case, the face labels constain the cycle labels and the cycle labels constrain both the face and edge labels.

Next, the method proceeds to a required step 206 in which each vertex is assigned the junctions that are consistent with the vertex labels already assigned to the vertex. The junctions consistent with each vertex label are as illustrated in FIG. 5. The source listing in Appendix C is directed to the performance of step 206. Referring again to FIG. *6a*, flowchart 200 proceeds to an optional step 208 in which CSP is performed between vertices and edges using the junctions assigned to each vertex and the edge labels assigned to each edge. CSP, as used herein, is the process, described briefly above, by which the descriptive properties (i.e. labels, junctions, etc.) known about a first image element are used to constrain the properties of a second adjacent image element. Thus, the properties of the second element are limited in order to satisfy the constraint. To the extent the descriptive properties of the second element are constrained and the second element properties are applied to contrain those of a third element adjacent thereto, the constraint is said to be propagated. This is implemented in the Waltz filtering method between adjacent image vertices, that method being described in the Waltz and Winston references incorporated above. With respect to the present invention, the CSP process is applied to linked image elements. Thus in step 208 in the case of vertices and edges, the vertices at the respective ends of an edge are linked to it and CSP is performed so that the junctions of each vertex constrain the edge labels of the edge and vice versa.

The following lines of pseudolanguage illustrate the performance of step 208:

| | |
|---|---|
| (1) | Initialize Vertex-Fifo and Edge-Fifo respectively with all vertices and edges in the image. |
| (2) | Loop until (and (emptyp Vertex-Fifo) (emptyp Edge-Fifo)) do |
| (3) | Loop until (emptyp Vertex-Fifo) do |
| (4) | Let V :⊆ (pop Vertex-Fifo). |
| (5) | Loop for all edges $E_i$ in Edges(V) do |
| (6) | Restrict edge-labels of edge $E_i$ with junctions of V. |
| (7) | If the set of labels of edge $E_i$ has been restricted then (insert $E_i$ Edge-Fifo). |
| (8) | Loop until (emptyp Edge-Fifo) do |
| (9) | Let E :⊆ (pop Edge-Fifo). |
| (10) | Loop for all vertices $V_i$ in Vertices(E) do |
| (11) | Restrict junctions of vertex $V_i$ with edge-labels of E. |
| (12) | If the set of junctions of vertex $V_i$ has been restricted |
| (13) | then (insert $V_i$ Vertex-Fifo). |

At line (1) all vertices and edges in the image are grouped as a Vertex-Fifo and Edge-Fifo, respectively, where each "Fifo" represents a first-in-first-out queue. Line (2) indicates that the overall process proceeds with vertices and edges individually being drawn from the Vertex- and Edge-Fifos and continues until those Fifos are empty. Lines (3)–(7) describe the constraint of edge labels with the vertex junctions. Thus, line (3) indicates that the vertices of the image should be individually drawn from the Vertex-Fifo until that Fifo is empty. At line (4), a vertex is drawn or "popped" from the Vertex-Fifo and is assigned to the variable "V". At line (5), the function "Edges(V)" returns the individual edges intersecting at the vertex currently assigned to "V". These edges are referred to as $E_i$. For example, in the case of vertex b of image 100 (FIG. 1*a*) being assigned to "V", Edges(V) would identify the edges b-a, b-c and b-f. Thus, line (5) of the pseudolanguage requires looping through, i.e. consideration of, each edge intersecting at the vertex being considered. Line (6) is the actual process of constraint satisfaction in which the labels associated with each edge $E_i$ of vertex b are constrained by the junctions currently assigned to "V". The operations occurring at line (6) are expanded below. It is noted that terms such as "restrict", "restriction", etc. in the pseudolanguage and discussion hereinbelow are used interchangeably with the term "constraint, "constrained", etc. If as a result of the restriction/constraint process at line (6), the labels of an edge are in fact restricted, i.e. describe a smaller class, that particular edge is placed into the Edge-Fifo. This assures the application of the edge, as constrained, to its associated vertices. This is necessary because the process of lines (8)–(13), which is directed to the constraint of vertices by edges, may be conducted in parallel with the process of lines (3)–(7). As a result, a constrained edge or vertex in each process is returned to the appropriate Fifo to assure its consideration in the other process.

Before describing the process at lines (8)–(13), the expansion of the constraint process at line (6) is shown in the following pseudolanguage lines:

```
(14)  Loop for each edge-label e in Edge-Labels(E_i) do
(15)  if Loop for all junctions J in Junctions(V)
(16)  never e ≦ aref(J,E_i)
(17)  then if Loop for all junctions J in Junctions(V)
(18)  thereis aref(J,E_i) ≦ e
(19)  then replace edge-label e by its sub-labels
      in Edge-Labels(E_i)
(20)  else delete edge-label e from
      Edge-Labels(E_i).
```

At line (14), a function "Edge-Labels($E_i$)" returns the individual edge labels "e" assigned to edge $E_i$. The "Loop" at line (14) considers each edge label e of edge $E_i$. At line (15), a function "Junctions(V)" returns the junctions assigned to the vertex that is currently represented by the variable V. At line (16), a function "aref(-J,$E_i$)" returns for a junction J the particular edge label assigned to the edge of the junction corresponding to edge $E_i$. As previously discussed, when junctions are assigned to a vertex, a correlation is established and maintained between the edge numbers of the junction and the actual edges intersecting at the vertex to which the junction is assigned. For example, referring again to image 100 of FIG. 1*a*, considering vertex f, if the arrow junction (→,→,+) has been assigned thereto and is under consideration, the convex (+) edge #3 of the junction corresponds to edge f–b in image 100. Then, for this junction and edge f–b, aref(J,$E_i$) returns "+". It is noted that "aref" is a standard LISP function for retrieving data values from an array.

The loop at line (15) considers, for all the junctions of the vertex represented by "V", if the particular edge label e of edge $E_i$ is "never" consistent with the corresponding edge labels of the junctions (line (16)). If this "never" condition is *not* satisfied, the next edge label e is considered. If the "never" condition at line (16) is satisfied, the "then" statement at line (17) is performed. Line (17) requires again looping through all junctions of the vertex represented by "V". For these junctions, line (18) tests if aref(J,$E_i$) $\subseteq$ e, i.e. any of the junction edge labels corresponding to edge $E_j$, are consistent with edge label e. If the answer is yes, then line (19) is performed and if not, at line (20) the edge label e under consideration is deleted from the labels assigned to edge $E_i$. Line (19) requires replacing the edge label e with its sub-labels, i.e. children in the edge label hierarchy (FIG. 3). The process of llines (14)–(20) continues for all edge labels of edge $E_i$. In the event of lines (19) or (20) being performed by any of those edge labels, the edge $E_i$ is considered to have been restricted and so in accordance with line (7), that edge is returned to the Edge-Fifo for subsequent consideration.

The process represented by lines (1)–(7) and (14)–(20) is illustrated by a brief example. It is assumed that at line (4), vertex b is "popped" from the Vertex-Fifo so that V=vertex b. Then, at line (5), Edges(V) and hence the edges $E_i$ are defined as a-b, b-c and b-f. For this example, the edge a-b is considered. Of course, the loop at line (5) would ultimately result in consideration of all edges $E_i$. The example then proceeds to line (6) and hence lines (14)–(20). Assuming no a priori information was available, the only edge label for edge a-b (=$E_i$) is "?" (assigned in step 202). As a result, at line (14), the only edge label e returned by Edge-Labels($E_i$) is "?". It is next assumed for the example that at step 202 of the method, vertex b was assigned an initial vertex label "Y" (i.e. it was interpreted as having a fork configuration). Consistent with this assumption, at step 206, vertex b would have been assigned the five junctions consistent with the fork configuration (FIG. 5). It is additionally assumed that those junctions were assigned to vertex b with junction edge #2 corresponding to edge a-b. Thus, at lines (15) and (16) it is determined whether e=? is consistent with the five fork junction edge labels corresponding to edge a-b, those five labels being +,−,→,−, and ←. As previously indicated, in each label hierarchy a parent is never consistent with its children, so that the "?" label is never consistent with any of the junction edge #2 labels. The example therefore proceeds to lines (17) and (18) which require determining if any of the junction edge labels are consistent with "?". Upon review of the edge hierarchy in FIG. 3, it is clear that they all are consistent, though only one need be found consistent to satisfy the condition at line (18). The operation at line (19) is therefore performed and for edge a-b, the label "?" is replaced with the edge labels at the next level of the FIG. 3 hierarchy, i.e. "+" and "!". It is important to note that at this point, the method is within the loop described at line (14) and, in accordance therewith, the next edge level of edge a-b is considered as edge label e. Where previously there was only the label "!", there are now the edge labels "+" and "!" so that lines (14)–(20) are performed using one of those labels. After consideration of edge a-b is complete, its identity would be returned to the Edge-Fifo since its labels have been constrained (line (7)).

Description of step 208 (FIG. *6a*) continues with a description of the above listed pseudolanguage lines (8)–(13). These lines perform a process analogous to that of lines (3)–(7). Line (8) indictes that this process continues until the Edge-Fifo is empty. At line (9), an image edge is "popped" from the Edge-Fifo and assigned to the variable E. At line (10), the function "Vertices(E)" returns the identities of the two vertices $V_i$ at the respective ends of the edge assigned to variable E. The loop at line (10) therefore requires consideration of each of these vertices. The restriction step at line (11) represents the constraint of the junctions assigned to the vertices of edge E with the edge labels of edge E. In accordance with lines (12) and (13), if as a result of the restriction process the junctions of a vertex are constrained, the identity of that vertex is returned to the Vertex-Fifo. The restriction operation of line (11) is better illustrated by the expanded pseudolanguage at lines (21)–(27):

```
(21)  Loop for each junction J in Junctions(Vi) do
(22)  if Loop for all edge-labels e in Edge-Labels(E)
(23)  never aref(J,E) ≦ e
(24)  then if Loop for all edge-labels e in
      Edge-labels(E)
(25)  thereis e ≦ aref(J,E)
(26)  then replace junction J by its
      sub-junctions by expanding aref(J,E)
      by its sub-labels.
(27)  else delete J from Junctions(Vi).
```

At line (21), the function "Junctions($V_i$)" returns the junctions currently assigned to the particular vertex $V_i$ under consideration. The loop at line (21) requires consideration of each of the junctions assigned to vertex $V_i$. At line (22), the function "Edge-Labels(E)" returns the edge labels e currently assigned to the edge represented by the variable E. At line (23), aref(J,E) returns for the junction J currently under consideration (per line (21)) the edge label corresponding to edge E. Then in accordance with lines (22) and (23), it is determined whether aref(J,E) is consistent with any of the edge labels e. If any consistency is found, the loop at line (21) proceeds to the next junction returned by Junctions($V_i$). If aref(J,E) is not consistent with any edge label e, i.e. is "never" consistent, then the process advances to lines (24) and (25) where all of the edge labels e of edge E are tested to see if any are consistent with the edge label in junction J corresponding to edge E (=aref(J,E)). If no consistency is found, junction J is deleted from the junctions assigned to vertex $V_i$ (line 27). If any consistency is found at line (25), then at line (26) the edge label in the junction J tuple corresponding to edge E is replaced by its children (sub-labels) in the edge label hierarchy. This in turn results in the formation of one or more new junctions that replace it. In the context of the example embodied in image 100 (FIG. *1a*) and the limitation to trihedral vertices as well as the other limitations described above, only the junction associated with the occlusion vertex label will result in the performance of line (26).

A brief example illustrating operation of pseudolanguage lines (8)–(13) and (21)–(27) is provided. It is assumed that at line (9), edge j-h is "popped" from the Edge-Fifo so that variable E is assigned the value "edge j-h". At line (10), Vertices(E) returns the vertices j and h and it is assumed that the loop at line (10) is currently considering vertex j as vertex $V_i$. Proceeding to line (11) and hence line (21), it is assumed junctions ($V_i$) returns at least the junction consistent with the occlusion vertex label (FIG. 5), that junction having the three-tuple (?,←,←). With reference to FIG. 5, it is assumed that the edge #s 1, 2 and 3 of that junction respectively correspond to image edges j-h, j-c and j-i intersecting at vertex j. At line (22), it is assumed Edge-Labels(E) returns "!". In view of these assumptions, aref(J,E)="?". The test at line (23) therefore correctly determines that "?" is never consistent with "!" and the process proceeds to lines (24) and (25) which test if "!" is consistent with "?", which it is. Then in accordance with line (26), aref(J,E)="?" is expanded by being replaced by its children, which are "+" and "!" (FIG. 3). The junction (?,←,←) is therefore replaced by the two new junctions (+,←,←) and (!,←,←). The loop defined at line (21) would subsequently consider these two new junctions. In this example the junctions of vertex j were restricted and so, in accordance with line (12) and (13), vertex j is inserted back into the Vertex-Fifo. The source listing in Appendix D to this specification is directed to the performance of step 208.

Referring again to FIG. *6a*, flowchart 200 proceeds to a required step 210 in which for each face in the image all junction loops are assigned that are consistent with the already assigned face labels. As previously described, a junction loop of a face is an n-tuple of the function tuples of the vertices encountered in a clockwise circuit around the closed chain of bounding edges defining the face. As noted above, in the more general case, the closed chain defines a cycle. Where there is more than one junction assigned to a vertex, the number of junction loops that may be assigned to the corresponding face increases. The actual process of assigning junction loops to a face proceeds by a depth first search for all consistent junctions around a loop. That is, in order to form a junction loop, the junctions of any two adjacent vertices in the junction loop must have the same edge label for the edge connecting them. Depth first search as used herein means beginning at one vertex and checking all junctions assigned thereto for consistency with junctions assigned to adjacent vertices joined by bounding edges of the face for which the junction loops are being determined. Where no consistency is found, sub-junction replacement occurs with the result that for each junction loop the junctions assigned to adjacent vertices have the same edge label for their common edge. Having found possible junction loops composed of consistent junctions, it is next necessary to delete those junction loops that are not consistent with the face labels assigned to the particular face. In the case of no a priori knowledge, the face label at this point in the serial implemented embodiment will be "?" and all the possible junction loops will be found consistent therewith. If a priori information was available, then consistency with a face label other than "?" must be evaluated. In the illustrated example, in which cases are limited to trihedral vertices and no shadows, a prior information may have identified a face as either visible or partially occluded. For a visible face, any junction loop defining an occluded edge would be inconsistent and deleted. Similarly for a partially occluded face, any junction loop which entirely lacks an occluded edge would be inconsistent and deleted.

In view of the definitions of junctions and junction loops, it is apparent that only one label of each junction composing the junction loop corresponds to a bounding edge of the face described by the loop. The aref function, utilized above, enables extraction of the appropriate edge information to allow determination of whether possible junction loops are consistent with a face label. Thus, where "L" denotes a particular junction loop and $V_i$ a vertex of a bounding edge $E_j$ of the corresponding face, then aref(L,$V_i$) returns the junction $J_i$ corresponding to vertex $V_i$ in the junction loop. Further, aref(aref(L,$V_i$),$E_j$) returns the edge label $e_j$ corresponding to edge $E_j$ of vertex $V_i$. In this manner, appropriate information may be extracted to determine consistency of a junction loop with an other than default face label. Appendix E to this specification contains the source listing corresponding to the performance of step 210.

Referring next to FIG. *6b*, in which flowchart 200 continues, the method proceeds to an optional step 212 at which SCP is performed between linked vertices and edges and between linked vertices and faces using assigned junctions, edge labels and face loops for the image vertices, edges and faces, respectively. The CSP process between vertices and edges is the same as described for step 208. The following pseudolanguage lines describe the CSP process as applied to linked vertices and faces:

| | |
|---|---|
| (28) | Initialize Face-Fifo and Vertex-Fifo respectively with all faces and vertices in the image |
| (29) | Loop until (and (emptyp Face-Fifo) (emptyp Vertex-Fifo)) do |
| (30) | Loop until (emptyp Face-Fifo) do |
| (31) | Let F := (pop Face-Fifo) |
| (32) | Loop for all vertices $V_i$ in Vertices(F) do |
| (33) | Restrict junctions of $V_i$ with junction-loops of F |
| (34) | If the set of junctions of vertex $V_i$ has been restricted |
| (35) | then (insert $V_i$ Vertex-Fifo) |
| (36) | Loop until (emptyp Vertex-Fifo) do |
| (37) | Let V := (pop Vertex-Fifo) |
| (38) | Loop for all faces $F_i$ in Faces(V) do |
| (39) | Restrict junction-loops of $F_i$ with junctions of V |
| (40) | If the set of junction-loops of face $F_i$ has been restricted |
| (41) | then (insert $F_i$ Face-Fifo) |

It is noted that the CSP process described in pseudolanguage lines (28)–(41) is precisely analogous to that described at lines (1)–(27) for performing that task on linked vertices and edges. At line (28), a Face-Fifo established to contain identities of the image faces and the previously described Vertex-Fifo are initialized with all image faces and vertices, respectively. At line (29), the extent of the process to be performed by lines (30)–(41) is defined in terms of looping until both the Face- and Vertex-Fifos are empty. Lines (30)–(35) address the constraint of the junctions at vertices with the junction loops of the faces linked to the vertices. Thus at line (30), it is indicated that this process continues until the Face-Fifo is empty. At line (31), a face identity is "popped" from the Face-Fifo and that face identity is assigned to a variable F. At line (32), the function "Vertices(F)" returns the identities of all vertices $V_i$ linked to face F, i.e. encountered in a circuit around the closed chain of bounding edges of face F. In accordance with the loop at line (32), these vertices $V_i$ are subjected to the restriction process at lines (33), (34) and (35). The restriction of junctions by face loops proceeds in a manner analogous to that described above for their restriction by edge labels. Each junction of a vertex is considered separately and tested for consistency with all junction loops of the face containing the vertex. The consistency tests are specifically between the elements of the junction loop corresponding to the face bounding edges intersecting at the particular vertex and the elements of the junction being constrained according to those same edges. The result of constraining a junction with a face loop is either complete deletion of the junction or the expansion of one or more of the edge labels composing the junction. Thus for example, where the junction comprises edge labels such as "?" or "!", expansion would entail replacing such a label by its children in the edge label hierarchy (FIG. 3). The junctions formed based on the children would then be subjected to constraint by the face loops. Lines (34) and (35) require insertion of each vertex, whose junctions are constrained, into the Vertex-Fifo.

Lines (36)–(41) address the constraint of the junction loops of each face with the junctions of the vertices linked to that face. Thus at line (36), it is indicated that the process continues until the Vertex-Fifo is empty. At line (37), a vertex identity is "popped" from the Vertex-Fifo and assigned to the variable V. At line (38), the function "Faces(V)" returns the identities of all faces $F_i$ linked to the vertex currently assigned to V. The loop at line (38) causes each of these faces $F_i$ to be subjected to the restriction process at lines (39), (40) and (41). Again this restriction process proceeds in a manner analogous to the other restriction processes described above. Each junction loop at each face is considered separately and tested for consistency with all the junctions of the vertex V. These consistency tests are between the same elements are described for the tests at line (33). The result of restricting the junction loops is either complete deletion of a loop or the expansion of one or more edge labels comprising the junction loop. Again, as described above, each expansion occurs by replacing an edge label such as "?" or "!" with its children and thereby forming new junction loops. These newly formed junction loops are then subjected to constraint by the junctions of V. In accordance with lines (40) and (41), if at least one junction loop of a face $F_i$ is restricted, that face is reinserted into the Face-Fifo. Appendix F to this specification contains the source listing directed to CSP between vertices and faces, where the faces are characterized in terms of cycles in the listing. Thus, in the source listing, CSP is carried out using the junctions of the vertices and junction loops of the cycles. The source listing in Appendix D applies also in step 212 to the performance of CSP between vertices and edges.

Referring again to FIG. *6b*, the method next proceeds to a required step 214 in which each edge is characterized by one or more junction pairs consistent with junctions of the vertices at the respective ends of the edge. At this point in the serial implemented embodiment of the inventive method, the edge labels assigned to the edges are default labels, assuming no a priori information was available. However, the previous optional steps, if performed, have resulted in a refinement of the junctions assigned to each vertex. This junction information is therefore used to generate the junction pairs. While the junction pairs could be blindly generated from the vertex junctions, it is preferred herein that for each edge, the junction pairs to be generated by a depth first search commenced at an arbitrarily selected first one of the two vertices at the edge ends. This process is essentially the same as the depth first search described above to assign face loops to an image face. Within each junction pair so generated for an edge, the junctions respectively assigned to the vertices at the edge ends have the same edge label for that edge. Of these generated junction pairs, the edge labels corresponding to the connecting edge are checked for consistency with the edge labels currently assigned to that edge, and only junction pairs for which such consistency is found are retained. The source listing corresponding to step 214 is contained in Appenix G to this specification.

As seen in flowchart 200 in FIG. *6b*, the method next proceeds to a final required step 216 which requires performance of CSP between linked vertices and edges, between linked vertices and faces and between linked edges and faces using the junctions, junction pairs and junction loops assigned to the image vertices, edges and faces respectively. This step is outlined in the following pseudolanguage lines (42)–(73):

```
(42) Initialize Vertex-Fifo, Edge-Fifo, and Face-Fifo
     respectively with all vertices, edges, and faces
     in the image
(43) Loop until (and (emptyp Vertex-Fifo)
     (emptyp Edge-Fifo) (emptyp Face-Fifo)) do
(44) Loop until (emptyp Vertex-Fifo) do
(45) Let V := (pop vertex-Fifo)
(46) Loop for all edges E_i in Edges(V) do
(47) Restrict junction-pairs of E_i with
     junctions of V
(48) If the set of junction-pairs of edge E_i has
     been restricted
(49) then (insert E_i Edge-Fifo)
(50) Loop for all faces F_i in Faces(V) do
(51) Restrict junction-loops of F_i with
     junctions of V
(52) If the set of junction-loops of face F_i has
     been restricted
(53) then (insert F_i Face-Fifo)
(54) Loop until (emptyp Edge-Fifo) do
(55) Let E := (pop Edge-Fifo).
(56) Loop for all faces F_i in Faces(E) do
(57) Restrict junction loops of F_i with
     junction-pairs of E
(58) If the set of junction-loops of face F_i has
     been restricted
(59) then (insert F_i Face-Fifo)
(60) Loop for all vertices V_i in Vertices(E) do
(61) Restrict junctions of V_i with
     junction-pairs of E
(62) If the set of junctions of vertex V_i has
     been restricted
(63) then (insert V_i Vertex-Fifo)
(64) Loop until (emptyp Face-Fifo) do
(65) Let F := (pop Face-Fifo)
(66) Loop for all vertices V_i in Vertices(F) do
(67) Restrict junctions of V_i with
     junction-loops of F
(68) If the set of junctions of vertex V_i has
     been restricted
(69) then (insert V_i Vertex-Fifo)
(70) Loop for all edges E_i in Edges(F) do
(71) Restrict junction-pairs of E_i with
     junction-loops of F
(72) If the set of junction-pairs of edge E_i has
     been restricted
(73) then (insert E_i Edge-Fifo)
```

Lines (42)–(73) will not be described in detail since the nature of the processes described therein are either identical to or analogous to those already described. The functions Faces(E) and Edges(F), which were not previously defined, respectively return the identifies of the faces linked to an edge E and the identities of the edges linked to a face F. It is noted that the process at lines (42)–(73) may be performed in a serial fashion by proceeding through the sequence of lines. Alternatively, within the serial embodiment, following initializing the Fifos at line (42), the operations at lines (44)–(53), lines (54)–(63) and lines (64)–(73) may be treated separately and performed in parallel. Appendix H contains the source listing corresponding to step 216. That listing is adapted for performance on an image additionally characterized by cycles.

Each of the method step blocks 202 to 216 in FIGS. *6a* and *6b* may also be considered as a means for performing the stated steps, which means are more specifically disclosed in the associated appendices. For example, step 202 may, when implemented by computer, be considered to realize a means for assigning a label to vertices, edges and faces. In similar fashion, step 216 may be considered as providing a means for performing CSP between the vertices, edges, and junctions.

As indicated above, the parallel implemented embodiment of the present invention requires appropriate computing resources for execution. Such computing resources as contemplated herein comprise a parallel processing system in which a plurality of independent, interconnected arithmetic-logical processor elements operate in parallel to perform a multiplicity of processing functions. Each such processor also preferably has dedicated memory storage facilities. Parallel processing systems and implementations of various image processing techniques on such systems are well known in the art. One reference that describes at length the constituents of such parallel processing systems is "The Connection Machine" by W. D. Hillis, the MIT Press, 1985. For the preferred implementation of the image interpretation method of the present invention on such a parallel system, each processor would be provided with program code corresponding to the entire method. It is assumed the initial image has already undergone the above described initial processing so that it is represented as a plurality of linked image elements, i.e. a plurality of linked vetices, edges, cycles (where implemented) and faces. The individual image element identities are respectively stored in different processors in the parallel processing system so that only one element is stored in each processor. Information is also stored at each processor identifying the other processors at which linked elements are stored. It is assumed that parallel processing system includes communication facilitates enabling communication between at least the processor storing linked elements. Such communication should enable each processor to read data stored at the processor storing the linked element.

The parallel processing system contemplated for practice of the parallel implemented embodiment of the present invention would preferably be of the single instruction multiple data (SIMD) type, known in the art, in which a single sequence of instructions is provided in parallel to all processors. However, since each processor would store program code corresponding to the entire method, each instruction in the instruction sequence would serve merely to initiate one or more of the instructions embodied in the code stored at each processor. FIGS. *7a* and *7b* illustrate a flowchart 300 comprising the steps to be performed in accordance with the parallel implemented embodiment of the present invention. Steps 302, 306, 310, 314 and 316 are identical to steps 202, 206, 210, 214 and 216, respectively, of flowchart 200. As a result, the source listing provided for each of these flowchart 200 steps is equally applicable to the corresponding flowchart 300 step. Referring to FIG. *7a*, step 304 of flowchart 300 describes performance of CSP between all linked image elements using the labels of the vertices, edges and faces. Appendix I to this specification contains a source listing directed to this step and assumes the image characterization includes cycles. This source listing represents an outline of the operations required to perform CSP at this step. Source code is not provided for some functions implemented in that outline. However, the nature of each of these functions, e.g. "restrict-labels-of-edge-with vertex-labels", will be obvious to those skilled in the art in view of its name and in view of the description of the CSP operations implemented in the serial embodiment. The Fifo's used in the serial implemented embodiment of the present invention are not used in the parallel embodiment when CSP is performed. Instead, a bit would be allocated at each process such that the setting or unsetting of that bit by the processor has the same significance as respectively pushing to or popping from a Fifo.

Step 308 of flowchart 300 calls for performance of CSP between all linked elements using junctions assigned to the vertices and labels assigned to the edges and faces. Appendix J to this specification contains a source listing representing an outline of the operations required for performing this CSP step. As was the case with Appendix I, source code is not provided for certain functions listed in Appendix J. The nature of these functions will be obvious to those skilled in the art from the function names and in view of above described CSP operations.

Figure 7A:
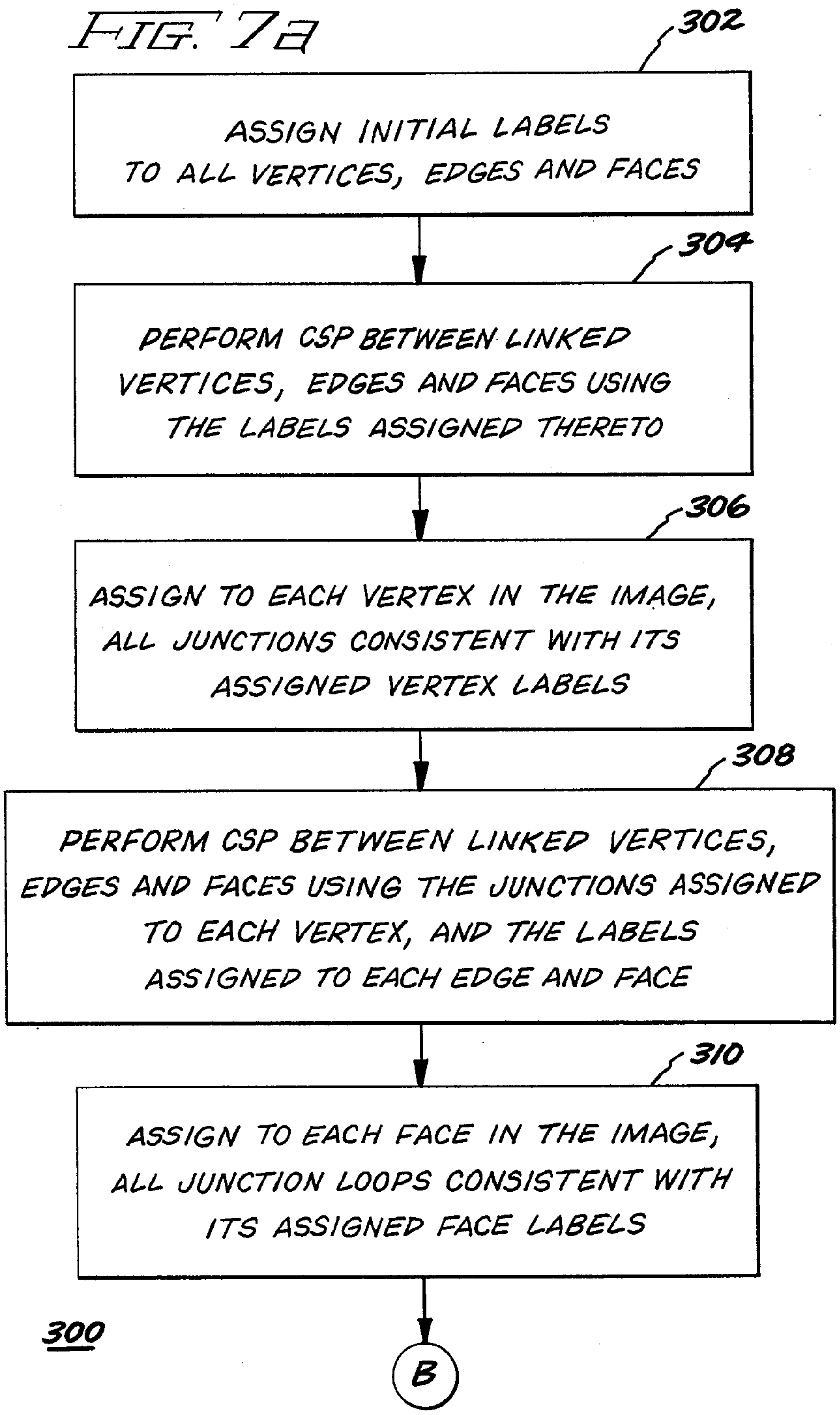
FIGS. 7a and 7b illustrate a flowchart representation of a parallel implemented embodiment of the image interpretation method of the present invention.
Figure 7B:
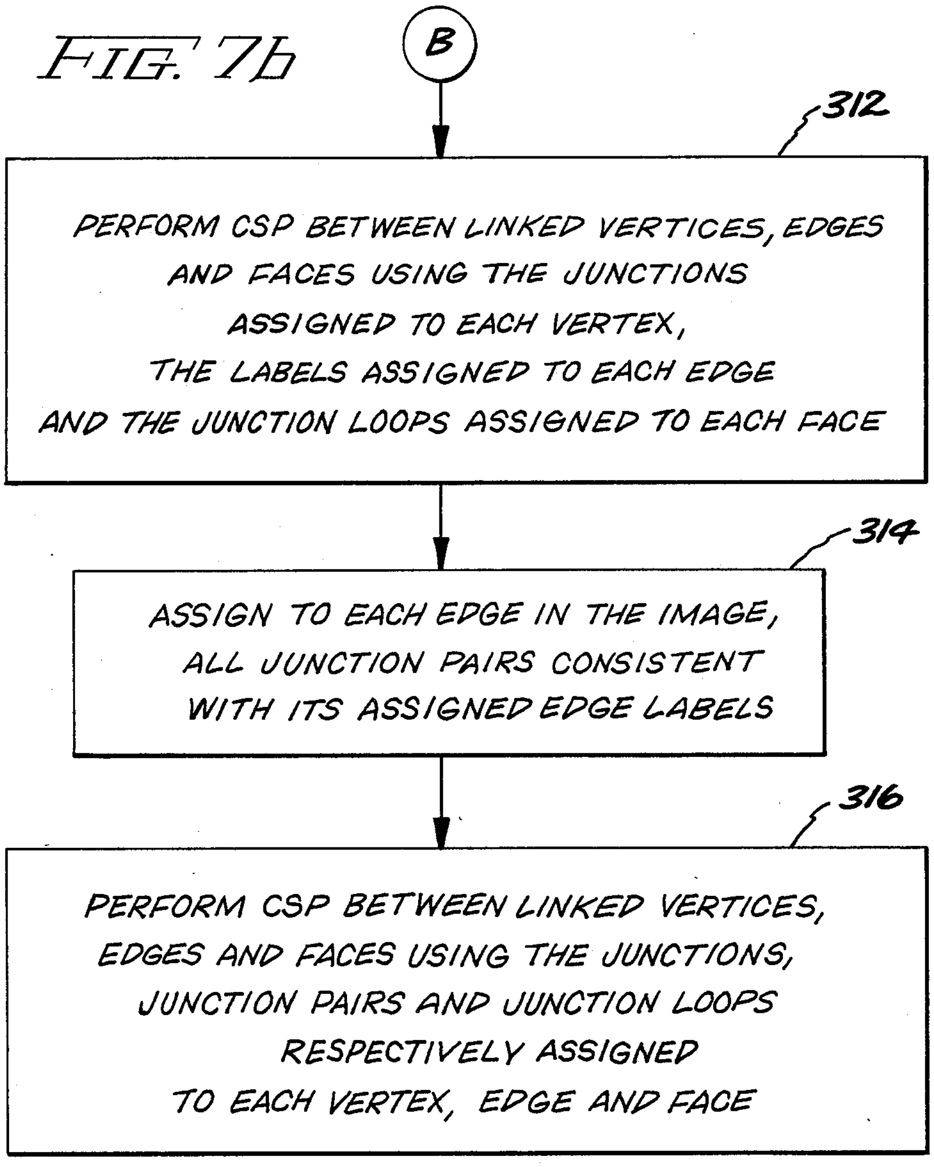

Referring to FIG. 7*b,* at step 312 CSP is performed between all linked elements using the junctions, junction loops and edge labels assigned to the vertices, faces and edges, respectively. Appendix K to this specification contains a source listing representing an outline of the operations required to perform step 312. As with Appendices I and J, the source code for some listed functions is not provided, though the operations performed by those functions would be obvious to those skilled in the art.

With each processor, in the parallel processing system, provided with programming corresponding to steps 302 through 316, and an image element stored at each processor, a first instruction would be applied to all processors causing performance of step 302. The next instruction applied to all processors would cause initiation of the sequence of remaining steps of flowchart 300. As a result, each processor would independently proceed through these steps for its stored image element. Obviously, with only one element stored at each processor not all steps can be executed at any processor. For example, with respect to a processor at which an image edge is stored, it is not possible to perform steps 306 and 310. However, as soon as that edge processor determines by reading the information at processors storing linked vertices that junctions have been assigned thereto, it will perform step 314. The intent of the parallel implementation is to have all processors independently performing CSP based on information read from all processors storing linked elements. Each processor also performs one of steps 306, 310 or 314, as appropriate, when required information at the processors storing linked elements is available. In this manner, the parallel operation of processors enables the rapid reduction of the number of possible labels assigned to each image element. It is noted that, as a minimum, the parallel implemented embodiment may be successfully practiced with the individual processors programmed to perform only steps 302, 306, 310, 314 and 316 (FIG. 7), i.e. those steps the performance of which was required in the serial embodiment.

As the method of the present invention proceeds in accordance with either the serial or parallel embodiment, it is preferred herein to deduce from junctions, junction pairs and junction loops the vertex, edge and face labels respectively corresponding thereto. This deduction process is preferably performed as soon as specific junctions, junction pairs or junction loops are defined by the constraint process. Appendix L to this specification contains a source listing of functions adapted to perform this deduction process. Appendix M to this specification contains a source listing of miscellaneous functions utilized in the other source listings.

As indicated above, the performance of CSP between linked vertices, edges and faces not only achieves local consistency in the labels assigned to those image elements but also achieves global consistency over the entire image. This result derives from all elements of the image being included in the constraint process. Unlike the Waltz CSP process in which a vertex constrains and is constrained by its adjacent vertices, in accordance with the present invention each vertex constrains and is constrained by its linked edges and faces. The vertices, edges and faces constitute the complete image and requiring their mutual constraint assures global consistency of the element labels derived thereby over the complete image. It is noted that by achieving global consistency in this manner, the problems encountered by prior art methods in intrepreting images with extra or missing lines are avoided by the present invention.

While the parallel implemented embodiment is described herein as being preferably practiced on a SIMD type system, the invention is not so limited. The implementation of the parallel embodiment of the present invention on a multiple instruction, multiple data (MIMD) type parallel processing system will be apparent to those skilled in the art.

While the illustrated embodiment of the image interpretation method the present invention is limited to interpreting images having trihedral vertices and without complex features such as shadows and cracks, the invention is not so limited. The above incorporated Waltz and Winston references characterize multi-hedral vertices and complex features, such characterizations simply representing additional labels that can be assigned to image elements. Given a hierarchy of such labels representing multi-hedral vertices and complex features, or even more complex features such as found in natural scenes, the method described hereinabove is applicable to interpret two-dimensional images comprising such features.

Figure 6B:
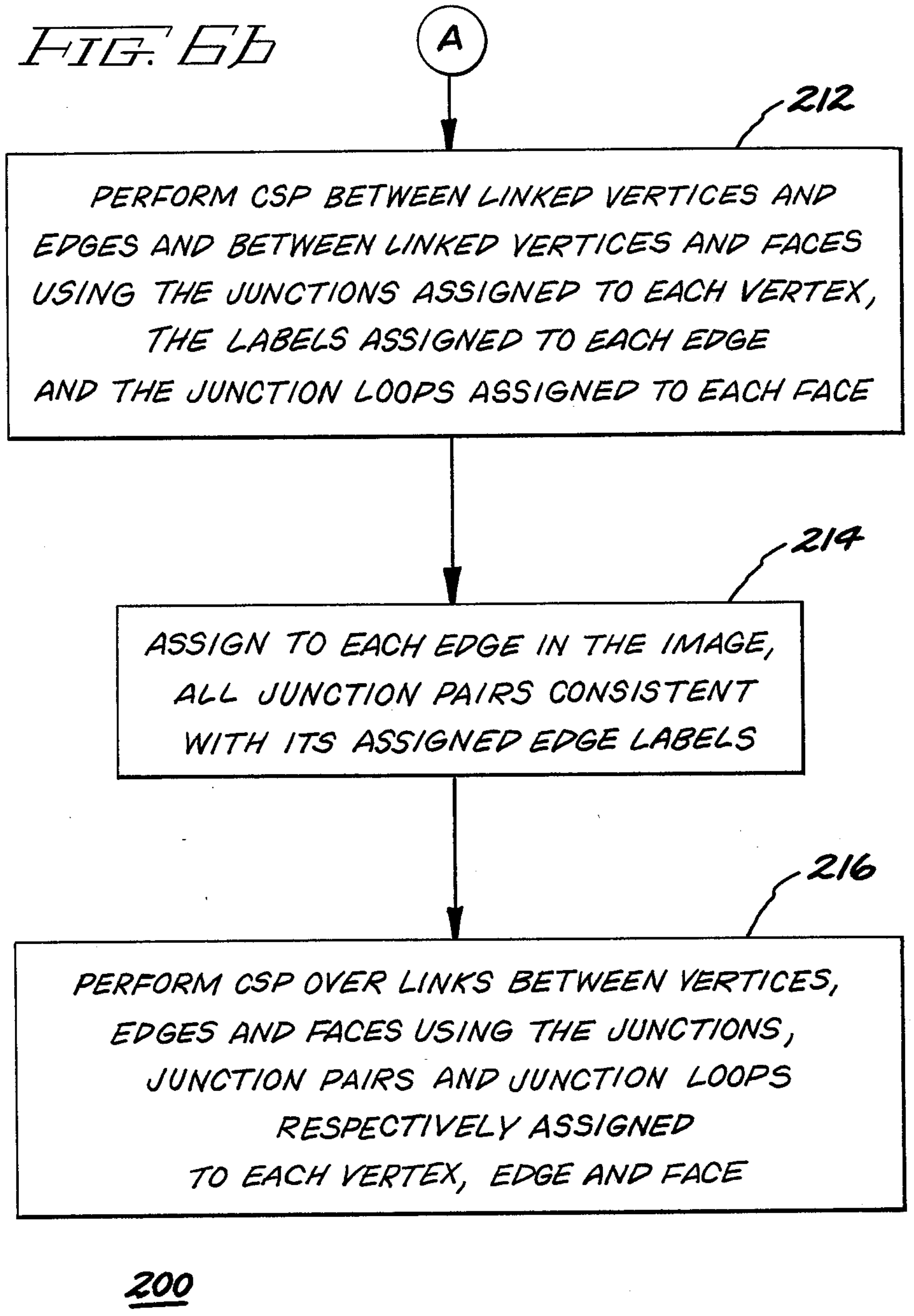

While in the serial implemented embodiment of the present invention a limited CSP operation is performed at steps 204, 208 and 212 (FIGS. 6*a* and 6*b*), the invention is not so limited. In the serial embodiment, at each of these steps, CSP may be performed between linked elements other than indicated in the description of those steps. For example, at step 204, the face labels could be used to constrain the vertices linked thereto. It is believed, however, that performance of such additional CSP operations does not provide significant additional information that would not otherwise be determined at a subsequent step.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

APPENDIX A

```
(defmethod (:INITIALIZE-LABELS SCENE) ()
  (loop for vertex in 2d-vertex-list do
    (send vertex :set-labeling (make-instance 'labeling)))
  (loop for edge in 2d-edge-list do
    (send edge :set-labeling (make-instance 'labeling)))
  (loop for cycle in 2d-cycle-list do
    (send cycle :set-labeling (make-instance 'labeling)))
  (loop for face in 2d-face-list do
    (send face :set-labeling (make-instance 'labeling)))

  (send self :set-labeling-assumption-list ())
  (send self :initialize-vertex-labels)
  (send self :initialize-edge-labels)
  (send self :initialize-cycle-labels)
  (send self :initialize-face-labels))

  ;;; 1. Label of an edge in the image can be:
  ;;;      * nil: edge is not labeled yet, or no consistent label.
  ;;;      * ?  : anything:
  ;;;             * ε : projection of 0 polyhedral edge:
  ;;;                   * S : shadow edges,
  ;;;;                  * L : texture edges
  ;;;             * E : projection of 1 polyhedral edge:
  ;;;                   * + : convex edge. The gradient points G1G2 are ordered CCW
  ;;;                         relative to the oriented edge going out from common vertex,
  ;;;                         and separating the two planes P1, P2.
  ;;;                   * ! : concave or occluding edge. The gradient points G1G2 are ordered
  ;;;                         CW relative to the oriented edge going out from common vertex,
  ;;;                         and separating the two planes P1, P2.
  ;;;                         * - : concave edge.
  ;;;                         * → : occluding edge, solid on the right.
  ;;;                         * ← : occluding edge, solid on the left.
  ;;;      * projection of more than 1 edge: accidental alignment. This case is
  ;;;        already handled by accidental alignment of two vertices or two junctions.
  ;;;        An edge in the image must correspond to at least one edge in the 3D scene.


  ;;; Current hierarchy of labels for the edges.
  ;;; Currently, we assume no shadow, no texture edges.

  (putprop '? (list '+ '!) ':edge-labels)
  (putprop '! (list '- '← '→) ':edge-labels)


  ;;; 2. Label of a vertex in the image can be:
  ;;;      * nil : vertex is not labeled yet, or no consistent label.
  ;;;      * ? : anything:
  ;;;             * γ : fake intersection:
  ;;;                   * T : occlusion,
  ;;;                         The 2D vertex does not corresponds to a 3D vertex on the objects
  ;;;                   * S : shadow vertices.
  ;;;                   * P : texture points.
  ;;;             * J : real intersection:
  ;;;                   The 2D vertex corresponds to a 3D vertex of the objects.
  ;;;                   * I, V, Y, A : trihedral junctions.
  ;;;                   * M : multi-hedral junctions with 0/1 or >1 hidden faces.
  ;;;      * accidental alignment: The 2D vertex is the projection of at least two 3D
  ;;;        vertices of the object.

  ;;; Current hierarchy of labels for the vertices.
  ;;; Currently, we assume no shadow, no texture vertices.

  (putprop '? (list 'T 'I 'V 'Y 'A 'M) ':vertex-labels)
```

```
;;; 3. Label of a face (cycle) in the image can be:
;;;       * nil : face is not labeled yet, or no consistent label.
;;;       * ? : anything:
;;;             * π : fake face:
;;;                   * B : background
;;;                   * S : shadow region
;;;                   * R : texture region
;;;             * F : real polyhedral face
;;;                   * O : partially occluding
;;;                   * V : totally visible.


;;; Current hierarchy of labels for the faces.
;;; Currently, we assume no shadow, no texture regions.

(putprop '? (list 'B 'F) ':face-labels)
(putprop 'F (list 'O 'V) ':face-labels)
;;; label the vertices consistently with their geometries, which are junctions
;;; between distinct edges.

(defmethod (:INITIALIZE-VERTEX-LABELS SCENE) ()
  ;;Assumes: This method is done first to setup labeling structs,
  ;;         and initialize the labels for the vertices.
  ;;Effect: Step 1: Find junction labels for all nodes in the region.

  ;;find junction labels based on their geometry
  (loop for vertex in 2d-vertex-list do
    (if (send vertex :topology-inconsistentp)
        (send vertex :set-labeling-inconsistency '1-inconsistent)
        (send vertex :find-default-vertex-labels self)))

  ;;display results.
  (and *tracep*
       (send self :display-labeling ':vertices ':labels)))


(defmethod (:FIND-DEFAULT-VERTEX-LABELS VERTEX) (&optional (scene *scene*))
  ;;Effect: Find the largest class of default labels for this vertex consistent with
  ;;         its junction geometry.
  ;;Implementation: 1. To deal with errors, we sort the arcs about the vertex CCW, and
  ;;                   the first two arcs have the largest sector angle in between them.
  ;;                2. Enumerate all the labels at junctions. Note the assumptions...

  (let ((number-of-edges (length edge-list))
        (default-assumption (make-instance 'assumption
                                           :attachment self
                                           :restriction 'no-shadow)))
    (push default-assumption (send scene :labeling-assumption-list))
    (send labeling :set-supports
          (list default-assumption self))

    (send labeling :set-labels
          (cond
            ;;if there is duplication then we might have a dangling vertex here.
            ((send self :danglingp)
             (ncons '?))
            ;;guess trihedral vertex
            ((<= number-of-edges 3)
             (let ((largest-sector (cyclic-angle-diff (first angles) (second angles))))
               (cond
                 ;;guess a V junction with 3 faces, or no junction, i.e.I.
                 ((= number-of-edges 2)
                  (cond ((~= largest-sector pi *fudge-angle*)   ;good I
                         (ncons 'I))
                        ((~= largest-sector pi (* 2.0 *fudge-angle*))    ;between I and V
                         (ncons 'V))                ;should be '(I V)
                        (t                          ;good V
                         (ncons 'V))))

                 ;;guess a Y,A,T junction with 3 intersecting faces
                 ((= number-of-edges 3)
                  (cond ((<= (abs (- largest-sector pi)) *fudge-angle*) ;T junction here
                         (list 'T))
                        ((< largest-sector (- pi (* 2.0 *fudge-angle*)))        ;Y junction.
                         (list 'Y))
                        ((< largest-sector pi)  ;mix between T and Y
                         (list 'T 'Y))
```

```
         ((> largest-sector (+ pi (* 2.0 *fudge-angle*)))        ;Arrow here
          (list 'A))
         (t                          ;mix between T and A
          (list 'T 'A)))))))

;;guess a multi-hedral vertex with 0/1 hidden faces,
;;or no partially visible/hidden face.
;;guess a junction with shadow edges, or just anything.
(t
 (ncons 'M))))))
 (defmethod (:INITIALIZE-EDGE-LABELS SCENE) ()
   ;;Effect: Find edge-labels for all edges in the region.

   (loop for edge in 2d-edge-list do
     (if (send edge :topology-inconsistentp)
         (send edge :set-labeling-inconsistency '1-inconsistent)
         (send edge :find-default-edge-labels)))

   ;;display results.
   (and *tracep*
        (send self :display-labeling ':edges ':labels)))

;;; labels the edges according to their geometries, which are real segments between
;;; distinct junctions.

 (defmethod (:FIND-DEFAULT-EDGE-LABELS EDGE) ()
   ;;Effect: Edge is labeled initially with ?, unless we have apriori knowledge of
   ;;        its label.
   (send labeling :set-supports (ncons self))
   (send labeling :set-labels (ncons '?)))
(defmethod (:INITIALIZE-CYCLE-LABELS SCENE) ()
  ;;Effect: Find edge-labels for all edges in the region.

  (loop for cycle in 2d-cycle-list do
    (if (send cycle :topology-inconsistentp)     ;not closed cycle
        (send cycle :set-labeling-inconsistency '1-inconsistent)
        (send cycle :find-default-cycle-labels)))

  ;;display results.
  (and *tracep*
       (send self :display-labeling ':cycles ':labels)))

(defmethod (:FIND-DEFAULT-CYCLE-LABELS CYCLE) ()
  ;;Effect: Cycle is labeled initially with ?, unless we have apriori knowledge of
  ;;        its label.
  (send labeling :set-supports (ncons self))
  (send labeling :set-labels (ncons '?)))


(defmethod (:INITIALIZE-FACE-LABELS SCENE) ()
  ;;Effect: Find edge-labels for all edges in the region.

  (loop for face in 2d-face-list do
    (if (send face :topology-inconsistentp)      ;not all the cycles are closed.
        (send face :set-labeling-inconsistency '1-inconsistent)
        (send face :find-default-face-labels)))

  ;;display results.
  (and *tracep*
       (send self :display-labeling ':faces ':labels)))


(defmethod (:FIND-DEFAULT-FACE-LABELS FACE) ()
  ;;Effect: Face is labeled initially with ?, unless we have apriori knowledge of
  ;;        its label.
  (send labeling :set-supports (ncons self))
  (send labeling :set-labels (ncons '?)))
```

APPENDIX B

```
(defmethod (:RESTRICT-LABELS-OF-CYCLE-WITH-FACE-LABELS FACE) (cycle)
  ;;Effect: Cycle is part of the boundary of face, and so must have clabel in flabel.
  (let ((cycle-labeling (send cycle :labeling)))
    (and (not (send cycle-labeling :node-inconsistentp))
         (let ((cycle-labels (send cycle-labeling :labels))
               (deleted-labels ())
               (face-labels (send labeling :labels)))

           ;;we mutate the set of labels of cycle,
           ;;this work with label hierarchy.
           (let ((cycle-labels-ptr (cons 'ptr cycle-labels)))
             (setq cycle-labels cycle-labels-ptr)       ;pointer to the list
             (do ((cycle-label (cadr cycle-labels-ptr)
                               (cadr cycle-labels-ptr)))
                 ((null cycle-label))
               (cond
                 ;;cycle-label is not consistent with any face-label
                 ((loop for face-label in face-labels
                        never (eq-or-is-a cycle-label face-label ':face-labels))
                  (cond
                    ;;cycle-label must be refined to match a face-label
                    ((loop for face-label in face-labels
                           thereis (eq-or-is-a face-label cycle-label ':face-labels))
                     (rplacd (last cycle-labels-ptr)    ;replace it by its equivalent labels
                             (expand-class cycle-label ':face-labels)))
                    ;;no need for refinement, must throw away.
                    (t
                     (push cycle-label deleted-labels)))
                  (rplacd cycle-labels-ptr (cddr cycle-labels-ptr)))    ;increment ptr

                 ;;cycle-label is part of a face-label
                 (t
                  (setq cycle-labels-ptr (cdr cycle-labels-ptr)))))     ;increment ptr
             (setq cycle-labels (cdr cycle-labels)))    ;get back the cycle-labels

           ;;Record the new set of labels, always the last non null set that is locally
           ;;consistent with its first-constraining supports.
           (send cycle :set-labels (or cycle-labels deleted-labels))

           ;;Keep track of the set of supports for the labels at cycle
           ;;corresponding to the last consistent set of labels.
           ;;This set of supports records nodes that constrain the labels at cycle first.
           (when deleted-labels
             (cond ((null cycle-labels)
                    ;;detect a contradiction in the set of supports.
                    (send cycle :set-labeling-inconsistency '1-inconsistent)
                    (mark-conflicting-supports (send cycle-labeling :supports)  ;conflict
                                               (send labeling :supports)))      ;in 2 sets
                   (t
                    (send cycle-labeling :set-supports
                          (tagged-nunion (send cycle-labeling :supports)        ;concatenate
                                         (send labeling :supports))))))) ;2 sets of supports

           ;;signal=T if cycle is revised, and still has a consistent set of labels
           (and cycle-labels
                deleted-labels)))))


(defmethod (:RESTRICT-LABELS-OF-EDGE-WITH-CYCLE-LABELS CYCLE) (edge)
  ;;Effect: if cycle-label is in {?, F, O} then no restriction on the edge-labels.
  ;;           elseif cycle-label = B
  ;;                  then all edges are occluding with the face occluded.
  ;;                  elseif cycle-label = V
  ;;                         then all edges can be only (+, -, occluding) with face occluding.
  (let ((edge-labeling (send edge :labeling)))
    (and (not (send edge-labeling :node-inconsistentp))

         (let* ((cycle-labels (send labeling :labels))
                (restrict-elabels
                  (cond
                    ((loop for clabel in cycle-labels
                           thereis (memq clabel '(? F O)))      ;can be anything.
```

```
        ())
       ((= (length cycle-labels) 1)
        (cond ((eq (car cycle-labels) 'B)  ;background face
               (ncons (occluding-arc-from-facep (send self :sidep edge)
                                                'occluded)))
              ((eq (car cycle-labels) 'V)  ;visible face
               (list '+ '- (occluding-arc-from-facep (send self :sidep edge)
                                                     'occluding)))))))
 (when restrict-elabels
   (let ((edge-labels (send edge-labeling :labels))
         (deleted-labels ()))

    ;;we mutate the set of labels of edge,
    ;;this work with label hierarchy.
    (let ((edge-labels-ptr (cons 'ptr edge-labels)))
      (setq edge-labels edge-labels-ptr)      ;pointer to the list
      (do ((edge-label (cadr edge-labels-ptr)
                       (cadr edge-labels-ptr)))
          ((null edge-label))
        (cond
          ;;edge-label is not part of any relabel in restrict-elabels
          ((loop for relabel in restrict-elabels
                 never (eq-or-is-a edge-label
                                   relabel
                                   ':edge-labels))
           (cond
             ;;edge-label must be refined to match an arc of some junction
                    ((loop for relabel in restrict-elabels
                           thereis (eq-or-is-a relabel
                                               edge-label
                                               ':edge-labels))
                     (rplacd (last edge-labels-ptr) ;replace it by its equivalent labels
                             (expand-class edge-label ':edge-labels)))
                    ;;no need for refinement, must throw away.
                    (t
                     (push edge-label deleted-labels)))
                   (rplacd edge-labels-ptr (cddr edge-labels-ptr)))  ;increment ptr

                  ;;edge-label is part of an junction
                  (t
                   (setq edge-labels-ptr (cdr edge-labels-ptr)))))   ;increment ptr
            (setq edge-labels (cdr edge-labels)))  ;get back the edge-labels

           ;;Record the new set of labels, always the last non null set that is locally
           ;;consistent with its first-constraining supports.
           (send edge :set-labels (or edge-labels deleted-labels))

           ;;Keep track of the set of supports for the labels at edge
           ;;corresponding to the last consistent set of labels.
           ;;This set of supports records nodes that constrain the labels at edge first.
           (when deleted-labels
             (cond
               ((null edge-labels)
                (send edge :set-labeling-inconsistency '1-inconsistent)
                (mark-conflicting-supports (send edge-labeling :supports)   ;a conflict in
                                           (send labeling :supports)))      ;2 sets
               (t
                (send edge-labeling :set-supports
                      (tagged-nunion (send edge-labeling :supports) ;concatenate
                                     (send labeling :supports)))))) ;2 sets of supports

           ;;signal=T if edge is revised, and still has a consistent set of labels
           (and edge-labels
                deleted-labels))))))


(defun OCCLUDING-ARC-FROM-FACEP (sidep occlusionp)
  (cond ((or (and (eq sidep 'right) (eq occlusionp 'occluding))
             (and (eq sidep 'left) (eq occlusionp 'occluded)))
         '→)                                        ;solid on the right
        ((or (and (eq sidep 'left) (eq occlusionp 'occluding))
             (and (eq sidep 'right) (eq occlusionp 'occluded)))
         '←)))
```

```
(defmethod (:RESTRICT-LABELS-OF-FACE-WITH-CYCLE-LABELS FACE) ()
  ;;Effect: Find the most refined face-label for face, such that the cycle-labels
  ;;        are all member of face-label.

  (and (not (send labeling :node-inconsistentp))
       (loop for cycle in cycle-list
             never (send cycle :labeling-inconsistentp 1))

       (let ((face-labels (send labeling :labels))
             (deleted-labels ())
             (cycle-labels ()))

         ;;collect labels from the cycles, find highest cycle-labels
         (loop for cycle in cycle-list do
           (loop for clabel in (send cycle :labels 1) do
             (and (not (memq clabel cycle-labels))
                  (push clabel cycle-labels))))
         (setq cycle-labels (find-highest-classes cycle-labels ':face-labels))
         ;;a face can be a background only if all its cycles can be background.
         (and (memq 'B cycle-labels)
              (not (loop for cycle in cycle-list
                         always (memq 'B (send cycle :labels))))
              (setq cycle-labels (delq 'B cycle-labels)))

         (multiple-value (face-labels deleted-labels)
           (restrict-labels1-with-labels2 face-labels cycle-labels ':face-labels))

         ;;Record the new set of labels, always the last non null set that is locally
         ;;consistent with its first-constraining supports.
         (send labeling :set-labels (or face-labels deleted-labels))

         ;;Keep track of the set of supports for the labels at face
         ;;corresponding to the last consistent set of labels.
         ;;This set of supports records nodes that constrain the labels at face first.
         (when deleted-labels
           (let ((additional-supports ()))
             ;;collect the additional supports from the cycles
             (loop for cycle in cycle-list do
               (loop for sup in (send cycle :labeling-supports) do (set-tag sup)))
             (loop for sup in (send labeling :supports) do (unset-tag sup))
             (loop for cycle in cycle-list do
               (loop for sup in (send cycle :labeling-supports) do
                 (when (send sup :tag)
                   (unset-tag sup)
                   (push sup additional-supports))))
             (setq additional-supports (nreverse additional-supports))

             (cond ((null face-labels)
                    ;;detect a contradiction in the set of supports.
                    (send self :set-labeling-inconsistency '1-inconsistent)
                    (mark-conflicting-supports (send labeling :supports)        ;conflict
                                               additional-supports))    ;in 2 sets
                   (t
                    (send labeling :set-supports
                          (tagged-nunion (send labeling :supports)      ;concatenate
                                         additional-supports))))))      ;2 sets of supports

         ;;signal=T if face is revised, and still has a consistent set of labels
         (and face-labels
              deleted-labels))))


(defun RESTRICT-LABELS1-WITH-LABELS2 (labels1 labels2 hierarchy)
  ;;Effect: We mutate the set of labells, this work with label hierarchy.
  ;;        Return restricted labels1 and deleted labels from labels1
  (let ((labels1-ptr (cons 'ptr labels1))
        (deleted-labels1 ()))
    (setq labels1 labels1-ptr)                  ;pointer to the list
    (do ((label1 (cadr labels1-ptr)
                 (cadr labels1-ptr)))
        ((null label1))
      (cond
```

```
;;label1 is not consistent with any label2
((loop for label2 in labels2
       never (eq-or-is-a label1 label2 hierarchy))
 (cond
   ;;label1 must be refined to match a label2
   ((loop for label2 in labels2
          thereis (eq-or-is-a label2 label1 hierarchy))
    (rplacd (last labels1-ptr)          ;replace it by its equivalent labels
            (expand-class label1 hierarchy)))
   ;;no need for refinement, must throw away.
   (t
    (push label1 deleted-labels1)))
 (rplacd labels1-ptr (cddr labels1-ptr)))      ;increment ptr

;;label1 is part of a label2
(t
 (setq labels1-ptr (cdr labels1-ptr)))))       ;increment ptr
(setq labels1 (cdr labels1))                   ;get back the labels1
(values labels1 deleted-labels1)))
```

APPENDIX C

```
;;; Find the junctions at the vertices from their geometry, and do constraint
;;; propagation based on this junction constraint.
```

```
;;; This is a precomputed library all the labels of trihedral vertices:
;;; The dictionary has the most explicit labels according to each junction geometry.
;;; For now, we assume that a junction represents a local volume only.

;;; possible labels for edge: ? ! + - ← →.
;;; ↑ : ray going into junction.
;;; ↓ : ray going out of junction
;;; ray labels (↑,↓) will be converted into the arc labels (←,→), according to the
;;; direction of the edge connected at junction.
;;; ← : solid on the left of edge
;;; → : solid on the right of edge

(putprop '*RAY-JUNCTION-DIC*
         (list (list '+ '+)
               (list '- '-)
               (list '↑ '↓)
               (list '↓ '↑))
         'I)

(putprop '*RAY-JUNCTION-DIC*
         (list (list '↑ '↓)
               (list '↓ '↑)
               (list '↑ '-)
               (list '- '↓)
               (list '↓ '+)
               (list '+ '↑))
         'V)

(putprop '*RAY-JUNCTION-DIC*
         (list (list '+ '+ '+)
               (list '- '- '-)
               (list '↑ '↓ '-)
               (list '↓ '- '↑)
               (list '- '↑ '↓))
         'Y)

(putprop '*RAY-JUNCTION-DIC*
         (list (list '↑ '↓ '+)
               (list '- '- '+)
               (list '+ '+ '-))
         'A)

(putprop '*RAY-JUNCTION-DIC*
         (list (list '↓ '↑ '?))                    ;(list '(↓ ↑ ↑) '(↓ ↑ ↓) '(↓ ↑ +) '(↓ ↑ -))
         'T)

;;; multi-hedral junctions will be labelled with + and !. ! is further refined to - ← →
;;; by the neighboring junctions.
```

```
;;; find the labelings of the junctions at the vertices, from their geometries,
;;; and from the labels of the edges and faces.

(defmethod (:FIND-JUNCTIONS SCENE) ()
  ;;Effect: Find junctions at vertices, consistent with everything else.
  ;;Note: Also handle inconsistent topology around vertices.

  (loop for vertex in 2d-vertex-list do (send vertex :find-junctions))
  ;;display results.
  (when *tracep*
    (send self :display-labeling ':vertices ':labels)
    (send self :display-labeling ':vertices ':no-of-junctions)))

(defmethod (:FIND-JUNCTIONS VERTEX) ()
  ;;Require: Vertex and its connecting edges and faces have valid labels.
  ;;Effect: Find all sets of edge-labels consistent with the geometry of the vertex.
  ;;        Support is the vertex itself, with its apriori or default label.

  (and (not (send self :labeling-inconsistentp 2))      ;up to its neighboors
       (let ((junctions ()))
         (loop for label in (send self :labels) do
           (let ((new-junctions
                   (selectq label
                     ((I V T Y A)
                      (loop for ray-junction in (get '*ray-junction-dic* label)
                            collect (send self :junction-from-rays ray-junction)))
                     ;;Multi junctions are not implemented yet
                     (M
                      (ncons (loop for i from 0 below (length edge-list)
                                   collect '?)))
                     ;;dangling vertices and others.
                     (?
                      (ncons (loop for i from 0 below (length edge-list)
                                   collect '?))))))
             (loop for junction in new-junctions do     ;eliminate duplicates
               (and (member junction junctions)
                    (setq new-junctions (delq junction new-junctions))))
             (setq junctions (nconc junctions new-junctions))))

         (cond ((null junctions)
                (send self :set-labeling-inconsistency '1-inconsistent)
                (mark-conflicting-supports (send labeling :supports) ()))
               (t
                (send self :set-junctions junctions))))))

(defmacro IS-OCCLUDING-RAYP (rlabel)
  `(or (eq ,rlabel '↑) (eq ,rlabel '↓)))

(defmethod (:JUNCTION-FROM-RAYS VERTEX) (jlabel)
  (loop for rlabel in jlabel
        for edge in edge-list
        collect (if (is-occluding-rayp rlabel)
                    (send edge :occluding-arc-from-ray self rlabel)
                    rlabel)))

(defmethod (:OCCLUDING-ARC-FROM-RAY EDGE) (vertex rlabel)
  ;;Effect: Find occluding label of edge, face is on left (←) or right (→) side of edge,
  ;;        given the direction of the arc going into (↑) or outof (↓) vertex.
  (if (or (and (eq vertex vertex1) (eq rlabel '↓))
          (and (eq vertex vertex2) (eq rlabel '↑)))
      '→                                        ;face is on right side of edge
      '←))                                      ;face is on left side of edge


(defmacro IS-OCCLUDING-ARCP (alabel)
  `(or (eq ,alabel '←) (eq ,alabel '→)))


(defmacro CAN-BE-OCCLUDING-ARCP (alabel)
  `(or (eq-or-is-a '← ,alabel ':edge-labels)
       (eq-or-is-a '→ ,alabel ':edge-labels)))


(defmethod (:RAY-FROM-OCCLUDING-ARC EDGE) (vertex alabel)
```

```
;;Effect: Find the direction of the arc going into (↑) or outof (↓) vertex,
;;        given the occluding label of edge, face is on left (←) or right (→) side
;;        of edge.
;;        This is the inverse mapping of the above :occluding-arc-from-ray.
(if (or (and (eq vertex vertex1) (eq alabel '←))
        (and (eq vertex vertex2) (eq alabel '→)))
    '↑                                         ;ray going into vertex
    '↓))                                       ;ray going outof vertex.
```

APPENDIX D

```
;;; Constraint propagation over vertex-edge links, in level 1.

(defmethod (:CSP-VERTEX-EDGE SCENE)
           (&aux (vertex-fifo (make-instance 'fifo))
                 (edge-fifo (make-instance 'fifo)))

  ;;Requires: (send self :find-junctions) has already been done.
  ;;          All junctions are locally consistent with everything else.
  ;;Effect: Constraint satisfaction and propagation along the vertex-edge links.
  ;;   Do until (and (emptyp vertex-fifo) (emptyp edge-fifo))
  ;;      a. For each vertex in vertex-fifo queue, constrain the set of edge-labels of
  ;;      the edges intersecting at vertex, using the set of junctions.
  ;;      Push the edges that are constrained in edge-fifo queue.
  ;;      b. For each edge in edge-fifo queue, constrain the set of junctions at its
  ;;      two end points, using the set of edge-labels.
  ;;      Push the vertices that are constrained in vertex-fifo queue.
  ;;      c. Note that edge-vertex links are changed if there exists a push.

  ;;Constraint satisfaction and propagation.
  (loop for firstp first t then ()
        until (and (not firstp)
                   (send vertex-fifo :emptyp)
                   (send edge-fifo :emptyp)) do

    ;;Step a: Vertices constrain edges, insert constrained edge in edge-fifo
    ;        Update labels for vertices.
    (let ((restrict-vlabelsp ()))             ;for vertices that have restricted set of
      (loop for vertex in (send vertex-fifo :elements) do       ;junctions
        (and (send vertex :deduce-labels-of-vertex-from-junctions)
             (setq restrict-vlabelsp t)))
      (and *tracep*
           restrict-vlabelsp
           (send self :display-labeling :vertices :labels)
           (format t "~% > Restrict labels of vertices from their junctions.")))
    (and firstp
         (send vertex-fifo :pushes 2d-vertex-list))

    (let ((restrict-edgesp ()))
      (loop until (send vertex-fifo :emptyp)
            for vertex = (send vertex-fifo :pop) do
        (or (send (send vertex :labeling) :node-inconsistentp)
            (loop for edge in (send vertex :edge-list) do
              (and (send vertex :restrict-labels-of-edge-with-junctions edge)
                   (setq restrict-edgesp t)
                   (send edge-fifo :push edge)))))
      (and *tracep*
           restrict-edgesp
           (send self :display-labeling :edges :labels)
           (format t "~% > Vertices restrict their linked edges.")))

    ;;Step b: Edges constrain vertices, find vertex-fifo
    (and firstp
         (send edge-fifo :pushes 2d-edge-list))

    (let ((restrict-verticesp ()))
      (loop until (send edge-fifo :emptyp)
            for edge = (send edge-fifo :pop) do
        (or (send (send edge :labeling) :node-inconsistentp)
            (let ((vertex1 (send edge :vertex1))
                  (vertex2 (send edge :vertex2)))
              (and (send edge :restrict-junctions-of-vertex-with-edge-labels vertex1)
```

```
            (setq restrict-verticesp t)
            (send vertex-fifo :push vertex1))
        (and (send edge :restrict-junctions-of-vertex-with-edge-labels vertex2)
            (setq restrict-verticesp t)
            (send vertex-fifo :push vertex2)))))
 (and *tracep*
     restrict-verticesp
     (send self :display-labeling :vertices :no-of-junctions)
     (format t "~% > Edges restrict their linked vertices.")))
 ))
(defmethod (:RESTRICT-LABELS-OF-EDGE-WITH-JUNCTIONS VERTEX) (edge)
 ;;Require: Vertex consistent junctions
 ;;Effect: Edge can only have labels that are at least in one junction.
 (let ((edge-labeling (send edge :labeling)))
   (and (not (send edge-labeling :node-inconsistentp))

        (let ((edge-no (find-position-in-list edge edge-list))
              (edge-labels (send edge-labeling :labels))
              (deleted-labels ())
              (je-labels ()))

          ;;collect the edge-labels from the junctions, and find the highest labels
          (loop for junction in (send labeling :links)
                for je-label = (nth edge-no junction) do
            (and (not (memq je-label je-labels))
                 (push je-label je-labels)))
          (setq je-labels (find-highest-classes je-labels ':edge-labels))

          ;;we mutate the set of labels of edge,
          ;;this work with label hierarchy.
          (let ((edge-labels-ptr (cons 'ptr edge-labels)))
            (setq edge-labels edge-labels-ptr) ;pointer to the list
            (do ((edge-label (cadr edge-labels-ptr)
                             (cadr edge-labels-ptr)))
                ((null edge-label))
              (cond
                ;;edge-label is not part of any junction
                ((loop for je-label in je-labels
                       never (eq-or-is-a edge-label je-label ':edge-labels))
                 (cond
                   ;;edge-label must be refined to match an arc of some junction
                   ((loop for je-label in je-labels
                          thereis (eq-or-is-a je-label edge-label ':edge-labels))
                    (rplacd (last edge-labels-ptr)     ;replace it by its equivalent labels
                            (expand-class edge-label ':edge-labels)))
                   ;;no need for refinement, must throw away.
                   (t
                    (push edge-label deleted-labels)))
                 (rplacd edge-labels-ptr (cddr edge-labels-ptr)))       ;increment ptr

                ;;edge-label is part of an junction
                (t
                 (setq edge-labels-ptr (cdr edge-labels-ptr)))))       ;increment ptr
            (setq edge-labels (cdr edge-labels)))      ;get back the edge-labels

          ;;Record the new set of labels, always the last non null set that is locally
          ;;consistent with its first-constraining supports.
          (send edge :set-labels (or edge-labels deleted-labels))

          ;;Keep track of the set of supports for the labels at edge
          ;;corresponding to the last consistent set of labels.
          ;;This set of supports records nodes that constrain the labels at edge first.
          (when deleted-labels
            (cond ((null edge-labels)
                   ;;detect a contradiction in the set of supports.
                   (send edge :set-labeling-inconsistency '1-inconsistent)
                   (mark-conflicting-supports (send edge-labeling :supports)   ;conflict
                                              (send labeling :supports)))      ;in 2 sets
                  (t
                   (send edge-labeling :set-supports
                         (tagged-nunion (send edge-labeling :supports) ;concatenate 2 sets
                                        (send labeling :supports)))))) ;of supports

          ;;signal=T if edge is revised, and still has a consistent set of labels
          (and edge-labels
               deleted-labels)))))
```

```
(defmethod (:RESTRICT-JUNCTIONS-OF-VERTEX-WITH-EDGE-LABELS EDGE) (vertex)
  ;;Require: Edge has consistent edge-labels.
  ;;Effect: Vertex can only have junctions that correspond to labels of edge.
  ;;         Further update the list of labels of vertex.
  (let ((vertex-labeling (send vertex :labeling)))
    (and (not (send vertex-labeling :node-inconsistentp))
    (let ((edge-no (find-position-in-list self (send vertex :edge-list)))
          (junctions (send vertex-labeling :links))
          (deleted-junctions ()))

      ;;we mutate the set of labels of edge,
      ;;this work with label hierarchy.
      (let ((junctions-ptr (cons 'ptr junctions)))
        (setq junctions junctions-ptr)     ;a pointer to junctions
        (do ((junction (cadr junctions-ptr)
                       (cadr junctions-ptr))
             (edge-labels (send labeling :labels)))
            ((null junction))
          (let ((arc-label (nth edge-no junction)))
            (cond
              ;;junction is not consistent with any edge-label along edge.
              ((loop for edge-label in edge-labels
                     never (eq-or-is-a arc-label edge-label ':edge-labels))
               (cond
                 ;;junction must be refined to match an edge-label of edge
                 ((loop for edge-label in edge-labels
                        thereis (eq-or-is-a edge-label arc-label ':edge-labels))
                  (rplacd (last junctions-ptr)     ;replace it by its equivalents
                          (expand-tuple-at-nth junction edge-no ':edge-labels)))
                 ;;no need for refinement, must throw away.
                 (t
                  (push junction deleted-junctions)))
               (rplacd junctions-ptr (cddr junctions-ptr)))          ;increment ptr
              ;;junction is consistent with an edge-label of edge
              (t
               (setq junctions-ptr (cdr junctions-ptr))))))          ;increment ptr
        (setq junctions (cdr junctions)))  ;get back the junctions

      ;;Record the new set of junctions, always the last non null set that is locally
      ;;consistent with its firt-constraining supports.
      (send vertex :set-junctions (or junctions deleted-junctions))

      ;;Keep track of the set of supports for the junctions at vertex
      ;;corresponding to the last consistent set of junctions.
      ;;This set of supports records nodes that constrain the junctions at vertex first.
      (when deleted-junctions
        (cond ((null junctions)
               ;;detect a contradiction in the set of supports.
               (send vertex :set-labeling-inconsistency '1-inconsistent)
               (mark-conflicting-supports (send vertex-labeling :supports)
                                          (send labeling :supports)))
              (t
               (send vertex-labeling :set-supports
                     (tagged-nunion (send vertex-labeling :supports)      ;concatenate
                                    (send labeling :supports)))))) ; 2 sets

      ;;signal=T if vertex is revised, and still has a consistent set of junctions
      (and junctions
           deleted-junctions)))))
```

APPENDIX E

```
;;; Constraint: The boundary cycles and chains must be labeled consistently.
;;; Find the labelings of the cycle and chain, from the labels of the edges and junctions.
;;; The supports will be both the vertex-labels
;;; and the edge-labels.
;;; Do constraint propagation based on this constraint.


(defmethod (:FIND-JUNCTION-LOOPS SCENE) (&optional (background-catchp t))
  ;;Effect: For each face in region, do a depth-first search for all valid labelings
  ;;        of the edges and vertices around the loop.
  ;;Note: Will also handle inconsistent topology around faces

  ;;from now on, we'll be collecting cycles that are enumerated later in the CSP
  (setq *late-cycles* ())

  (loop for cycle in 2d-cycle-list do
    (send cycle :find-junction-loops self background-catchp))

  (when *tracep*
    (send self :display-labeling :cycles :labels)
    (send self :display-labeling :cycles :no-of-junction-loops)))


;;; It is a waste of time to enumerate junction-loops for cycles that have too
;;; many vertices, or for which the vertices have too many alternatives.
;;; We use a heuristic effort test.

(defvar *HEURISTIC-REDUCTION-EFFORT* 15)
(defvar *LATE-CYCLES* ())                       ;cycles whose loops are just enumerated.

(defmethod (:FIND-JUNCTION-LOOPS CYCLE)
           (&optional (scene *scene*) (background-catchp t)
                      &aux (search-vertices ()) (junction-loops ()) (cycle-labels ())
                      (loops-enumeratedp ()))
  ;;Require: All vertices, and edges along cycle boundary have valid labelings.
  ;;Effect: Do a depth-first search for all valid labelings
  ;;        of the edges and vertices around the loop.
  ;;        Check that the labels for the boundary edges are consistent with
  ;;        a cycle-label in (send self :labels).
  ;;        Currently, we assume that all cycles are labeled initially with ?.
  ;;        So no check for consistency between junction-loop and cycle-label.
  ;;        Support is the cycle itself with its apriori or default label,
  ;;        and the supports for all the boundary vertices in the cycle.
  ;;Properties: 1. Each edge of the cycle will be labeled at most twice as we
  ;;              explore all the junctions at the vertices.
  ;;            2. A vertex of the cycle can be labeled more than once.
  ;;            3. Complete search for all labelings from all combinations of
  ;;              the junctions. Without loss of generality, we can insert the
  ;;              labels for the vertices with unique junction first, then explore
  ;;              depth-first the vertices with multiple junctions.
  ;;Invariant: All the background loops are ahead in the list....

  (unless (send labeling :inconsistentp 2)      ;up to its neighbors

    ;;Insert the labels for the vertices with unique junctions.
    (loop for vertex in vertex-list
          for junctions = (send vertex :junctions) do
      (cond ((cdr junctions)                    ;multiple alternatives
             (push vertex search-vertices))
            (junctions                          ;1 labeling only
             (store-junction-in-diagram (car junctions) vertex))))

    ;;we stop the enumeration when all background labelings are detected.
    (cond ((null search-vertices)
           (multiple-value-bind (junction-loop cycle-label)
               (send self :junction-loop-from-labeled-diagram)
             (setq junction-loops (ncons junction-loop)
                   cycle-labels (ncons cycle-label)
                   background-catchp ()
                   loops-enumeratedp t)))
          (t
           (setq search-vertices (nreverse search-vertices))
           ;;edges in the cycle must be either concave or occluding
           (and background-catchp
```

```
      (setq background-catchp (send self :check-edges-for-backgroundp)))
  ;;do an initial search for all junction-loops with cycle as background
  (when background-catchp
    (loop for vertex in search-vertices do
      (send vertex :sort-junctions-background-first self))
    (multiple-value (junction-loops cycle-labels)
      (enumerate-labelings-of-cycle-depth-first search-vertices self
                                                 background-catchp))
    (setq background-catchp (not (null junction-loops))
          loops-enumeratedp background-catchp))

  ;;if there is no background possible, then choose to enumerate all loops or not
  (when (not background-catchp)
    (let ((approx-reduction
            (loop with product = 1
                  with number = 0
                  with sum = 0
                  for vertex in vertex-list do
                (let ((js (length (send vertex :junctions))))
                  (setq product (* product js)
                        sum (+ sum js)
                        number (1+ number)))
                  finally (return (// (* number (expt (// sum number) number))
                                      product)))))
      ;;(format t "~%> % guessed reduction from vertices: ~a" approx-reduction)
      (when (< approx-reduction *heuristic-reduction-effort*)
        (multiple-value (junction-loops cycle-labels)
          (enumerate-labelings-of-cycle-depth-first search-vertices self
                                                     background-catchp))
        (setq loops-enumeratedp t))))))

(send self :clear-diagram)                   ;make sure everything is erased.


(when loops-enumeratedp

  ;;Record the set of junction-loops and the associated cycle-labels, and restriction
  (send self :set-labels cycle-labels)
  (send self :set-junction-loops junction-loops)

  ;;Keep track of the set of supports for the junction-loops of cycle.
  (let ((cycle-supports (send self :labeling-supports))
        (additional-supports
          (and background-catchp
               (let ((background-assump (make-instance 'assumption
                                                       :attachment self
                                                       :restriction 'background)))
                 (push background-assump (send scene :labeling-assumption-list))
                 (ncons background-assump)))))
    (loop for vertex in vertex-list do
      (loop for node in (send vertex :labeling-supports) do (set-tag node)))
    (loop for edge in edge-list do (set-tag edge))
    (loop for node in cycle-supports do (unset-tag node))
    (setq additional-supports
          (nconc additional-supports
                 (loop for vertex in vertex-list
                       nconc (loop for node in (send vertex :labeling-supports)
                                   if (send node :tag)
                                     collect (progn (unset-tag node)
                                                    node)))
                 (loop for edge in edge-list
                       if (send edge :tag)
                         collect (progn (unset-tag edge)
                                        edge))))
    (cond ((null junction-loops)
           (send self :set-labeling-inconsistency '1-inconsistent)
           (mark-conflicting-supports cycle-supports        ;conflict in 2 sets
                                      additional-supports))
          (t
           (push self *late-cycles*)
           (send labeling :set-supports
                 (tagged-nunion cycle-supports      ;concatenate 2 sets
                                additional-supports)))))    ;of supports
  junction-loops)))
```

```
(defmethod (:CLEAR-DIAGRAM SCENE) ()
  (loop for vertex in 2d-vertex-list do
    (send vertex :remove-diagram-label))
  (loop for edge in 2d-edge-list do
    (send edge :remove-diagram-label)))

(defmethod (:CHECK-DIAGRAM SCENE) ()
  (or (loop for vertex in 2d-vertex-list
            thereis (send vertex :diagram-label))
      (loop for edge in 2d-edge-list
            thereis (send edge :diagram-label))))

(defmethod (:CLEAR-DIAGRAM FACE) ()
  (loop for vertex in vertex-list do
    (send vertex :remove-diagram-label)
    (loop for edge in (send vertex :edge-list) do
      (send edge :remove-diagram-label))))

(defmethod (:CLEAR-DIAGRAM CYCLE) ()
  (loop for vertex in vertex-list do
    (send vertex :remove-diagram-label)
    (loop for edge in (send vertex :edge-list) do
      (send edge :remove-diagram-label))))


;;; Additions:
;;; 1. Search for the background face first. Exit enumeration loop, as soon as
;;;    all background faces are found. A face that can be interpreted as background
;;;    is assumed to be real background. So the face has only a few junction-loops
;;;    instead of hundreds or thousands of loops, as possible combinations of
;;;    the object floating-or-against some background(s) along its boundary.
;;; 2. A face will be labeled with one of:
;;;      a. object, completely visible.
;;;      b. object, partially hidden.
;;;      c. background.
;;; 3. Background assumption:
;;;      a. all edges are labeled with non-solid occluding labels,
;;;         saying that the face is non polyhedral,
;;;      b. and there is no edge that can have + or solid occluding labels.

(defmethod (:CHECK-EDGES-FOR-BACKGROUNDP CYCLE) ()
  ;;effect: T if all edges in cycle can only have non-solid occluding labels and -.
  (loop for edge in edge-list
        always (loop with backgroundp = ()
                     with concavep = t
                     for alabel in (send edge :labels) do
                 (cond ((send edge :cycle-is-hidden-resp-to-arcp self alabel)
                        (setq backgroundp t))
                       ((neq alabel '-)
                        (setq concavep ())))
                     finally (return (and backgroundp concavep)))))


(defmethod (:SORT-JUNCTIONS-BACKGROUND-FIRST VERTEX) (cycle)
  ;;Effect: sort the list of junctions, such that the junctions that
  ;;        have cycle as background are put first.
  (let* ((left-edge-no (find-position-in-list cycle cycle-list))        ;CW order about vertex
         (right-edge-no (mod (1+ left-edge-no) (length edge-list)))
         (left-edge (nth left-edge-no edge-list))
         (right-edge (nth right-edge-no edge-list))
         (junctions (send self :junctions))
         (background-junctions ()))
    (loop for junction in junctions
          for left-arc = (nth left-edge-no junction)
          for right-arc = (nth right-edge-no junction) do
      (and (send left-edge :cycle-is-hidden-resp-to-arcp cycle left-arc)
           (send right-edge :cycle-is-hidden-resp-to-arcp cycle right-arc)
           (push junction background-junctions)))
    (when background-junctions
      (loop for bg-j in background-junctions do
        (setq junctions (delq bg-j junctions)))
      (setq junctions
            (nconc background-junctions junctions))
      (send self :set-junctions junctions))))
```

```
(defmethod (:CYCLE-IS-HIDDEN-RESP-TO-JUNCTIONP VERTEX) (cycle jlabel)
  (let* ((left-edge-no (find-position-in-list cycle cycle-list))       ;CW order about verte
         (right-edge-no (mod (1+ left-edge-no) (length edge-list)))
         (left-arc (nth left-edge-no jlabel))
         (right-arc (nth right-edge-no jlabel)))
    (and (send (nth left-edge-no edge-list)
               :cycle-is-hidden-resp-to-arcp cycle left-arc)
         (send (nth right-edge-no edge-list)
               :cycle-is-hidden-resp-to-arcp cycle right-arc))))

(defmethod (:CYCLE-IS-HIDDEN-RESP-TO-ARCP EDGE) (cycle alabel)
  ;;Effect: T if cycle is background, consistent with alabel of edge,
  ;;        NIL if cycle is not background.
  ;;        the edge must either occludes the cycle or be concave.
  (cond ((eq alabel '→)
         (eq cycle (send self :left-cycle)))
        ((eq alabel '←)
         (eq cycle (send self :right-cycle)))))


(defmethod (:JUNCTION-LOOP-FROM-LABELED-DIAGRAM CYCLE) ()
  ;;Effect: find junction-loop and its associated label.
  (let ((junction-loop
          (loop for vertex in vertex-list

                collect
                  ;;most constraining label for this junction
                  (loop for edge in (send vertex :edge-list)
                        collect (send edge :diagram-label))))
        (cycle-label (send self :label-from-labeled-diagram)))
    (values junction-loop
            cycle-label)))


(defmethod (:LABEL-FROM-LABELED-DIAGRAM CYCLE) ()
  ;;Effect: Cycle is identified to be a background cycle, if all edge-labels
  ;;        can be left-occluding around it.
  ;;        First, vote for background or polyhedral cycle,
  ;;        then vote for visibility or not.

  (let ((face-votes 0)
        (background-votes 0)
        (undecided-votes 0))
    (loop for edge in edge-list
          for alabel = (send edge :diagram-label) do
      (let ((definitively-backgroundp
              (or (send edge :cycle-is-hidden-resp-to-arcp self alabel)
                  (eq-or-is-a (if (eq (send edge :side-of-cycle self) 'right) '←
                                  '→)
                              alabel ':edge-labels))))
        (cond ((eq definitively-backgroundp 'T)
               (setq background-votes (1+ background-votes)))
              ((eq definitively-backgroundp 'nil)
               (setq face-votes (1+ face-votes)))
              (t
               (setq undecided-votes (1+ undecided-votes))))))
    (cond ((≠ face-votes 0)                     ;there exists a connect edge, must be a face
           (cond ((≠ background-votes 0)
                  'O)
                 ((= undecided-votes 0)
                  'V)
                 (t
                  'F)))
          ((≠ undecided-votes 0)                ;a few undecided.
           '?)
          ((> background-votes 0)               ;all edges occlude cycle.
           'B))))

;;; Do a depth-first search with backtracking.
;;; With backtracking we can use constant O(n) space, where n is the size of image.
;;; We must be careful about undoing the previous results when we backtrack from
;;; a previous choice, and explore another alternative.
```

```
;;; Current labeling diagram is stored in property list :diagram of edge-vertex's labeling.
;;; Since an edge will be labelled twice, the :diagram slot will contains two labels,
;;; the top is always the most constraining label of the edge.
;;; A vertex will be labelled only once.


(defun ENUMERATE-LABELINGS-OF-CYCLE-DEPTH-FIRST
       (search-vertices cycle
        &optional (background-catchp t)
        &aux (cur-index 0) (cur-v (first search-vertices))
        (prev-vs ()) (next-vs (cdr search-vertices))
        (background-diagrams ()) (face-diagrams ()) (face-labels ()))

  ;;Assume: We label the cycle based on the vertex labels, and the consistency of
  ;;         the edge labels.
  ;;Require: cur-v and next-vs are not labelled yet.
  ;;           prev-vs and arcs attached to them are labelled consistently in diagram.
  ;;Effect: Depth-first search thru the tree of alternative labellings for the junctions
  ;;         Keep track of the diagram by storing labels of arcs and junctions.
  ;;         When we backtrack and explore another alternative, we have to undo
  ;;         the last result and restore the state of the diagram previous to taking
  ;;         the last alternative.
  ;;         The current diagram is the set of labels of prev-vs and the arcs attached
  ;;         to them. The labels are stored in ':diagram property lists.

  (loop while 'true do
    (comment
    (format t "~% cur-v:~a cur-index:~a diagram-no:~a"
            (length prev-vs) cur-index (length diagrams))
    )
    (cond
      ((null cur-v)                    ;we have explored all the junctions
       (multiple-value-bind (diagram label)
           (send cycle :junction-loop-from-labeled-diagram)
         (cond ((not background-catchp)
                (if (eq label 'B) (push diagram background-diagrams)
                    (push diagram face-diagrams)
                    (and (not (memq label face-labels))
                         (push label face-labels))))
               ((eq label 'B)
                (push diagram background-diagrams))))

       ;;backtrack up and undo last junction, then explore next alternative
       (let* ((prev-v (car prev-vs))
              (prev-index (find-position-in-list (send prev-v :diagram-label)
                                                 (send prev-v :junctions))))
         (undo-junction-in-diagram prev-v)      ;undo last junction
         (setq cur-v prev-v                     ;backtrack up.
               prev-vs (cdr prev-vs)
               cur-index (1+ prev-index))))     ;next alternative

      (t                                        ;in the downward search.
       ;;try label cur-v while keeping consistency with diagram,
       ;;then continue depth-first search.
       (let ((cur-jlabel (nth cur-index (send cur-v :junctions))))
         (cond

           ((null cur-jlabel)          ;no more junctions labels,
            (cond
              ((null prev-vs)                   ;we have backtrackted to the root.
               (return 'done))                  ;we are done

              (t                                ;we are in the middle of the tree
               ;;undo previous junction,
               ;;and explore next alternative for previous junction.
               (let* ((prev-v (car prev-vs))
                      (prev-index (find-position-in-list (send prev-v :diagram-label)
                                                         (send prev-v :junctions))))
               (undo-junction-in-diagram prev-v)       ;undo last junction
               (setq next-vs (cons cur-v next-vs)      ;backtrack up
                     cur-v prev-v
                     prev-vs (cdr prev-vs)
                     cur-index (1+ prev-index))))))    ;next alternative
```

```
        ;;a detour to search only for background labelings, then exit.
        (background-catchp
         (cond
           ((send cur-v :cycle-is-hidden-resp-to-junctionp cycle cur-jlabel)
            (cond
              ((junction-consistent-with-diagramp cur-jlabel cur-v)
               ;;store and update diagram with junction's label
               (store-junction-in-diagram cur-jlabel cur-v)
               ;;go down and find label for next junction.1
               (setq prev-vs (cons cur-v prev-vs)    ;depth-first search down 1 level.
                     cur-v (car next-vs)
                     next-vs (cdr next-vs)
                     cur-index 0))            ;first alternative
              (t
               ;;jlabel inconsistent with diagram, try next label for cur-v
               (setq cur-index (1+ cur-index)))))
           (t
            (cond
              ((null prev-vs)                 ;we have backtrackted to the root.
               (return 'done))                ;we are done
              (t
               ;;undo previous junction,
               ;;and explore next alternative for previous junction.
               (let* ((prev-v (car prev-vs))
                      (prev-index (find-position-in-list (send prev-v :diagram-label)
                                                         (send prev-v :junctions))))

                 (undo-junction-in-diagram prev-v)   ;undo last junction
                 (setq next-vs (cons cur-v next-vs)  ;backtrack up
                       cur-v prev-v
                       prev-vs (cdr prev-vs)
                       cur-index (1+ prev-index)))))))

        ;;ordinary route to find all labelings of diagram.
        ((junction-consistent-with-diagramp cur-jlabel cur-v)
         ;;store and update diagram with junction's label
         (store-junction-in-diagram cur-jlabel cur-v)
         ;;go down and find label for next junction.1
         (setq prev-vs (cons cur-v prev-vs)  ;depth-first search down 1 level.
               cur-v (car next-vs)
               next-vs (cdr next-vs)
               cur-index 0))                 ;first alternative
        (t
         ;;jlabel inconsistent with diagram, try next label for cur-v
         (setq cur-index (1+ cur-index)))))))

  (setq background-diagrams (nreverse background-diagrams)
        face-diagrams (nreverse face-diagrams))
  (if background-diagrams (values (nconc background-diagrams face-diagrams)
                                  (find-highest-classes (cons 'B face-labels) ':face-labels))
      (values face-diagrams
              (find-highest-classes face-labels ':face-labels))))


(defun JUNCTION-CONSISTENT-WITH-DIAGRAMP (jlabel vertex)
  ;;Assume: vertex has not been labeled before.
  (let ((old-jlabel (send vertex :diagram-label)))
    (if old-jlabel
        (loop for alabel in jlabel
              for old-alabel in old-jlabel
              always (or (eq-or-is-a alabel old-alabel ':edge-labels)
                         (eq-or-is-a old-alabel alabel ':edge-labels)))
        (loop for edge in (send vertex :edge-list)
              for alabel in jlabel
              always (arc-consistent-with-diagramp alabel edge)))))


(defun ARC-CONSISTENT-WITH-DIAGRAMP (alabel edge)
  (let ((old-alabel (send edge :diagram-label)))
  (cond ((null old-alabel)                   ;arc is not labelled yet
          alabel)
        ((eq-or-is-a alabel old-alabel ':edge-labels)
          alabel)
        ((eq-or-is-a old-alabel alabel ':edge-labels)
          old-alabel))))
```

```
(defun STORE-JUNCTION-IN-DIAGRAM (jlabel vertex)
  (send vertex :set-diagram-label jlabel)            ;store jlabel in junction
  (loop for edge in (send vertex :edge-list)    ;store alabel in arcs
        for alabel in jlabel do
    (store-arc-in-diagram alabel edge)))


(defun STORE-ARC-IN-DIAGRAM (alabel edge)
  (let ((old-alabel (send edge :diagram-label)))
    (cond ((or (null old-alabel)
               (eq-or-is-a alabel old-alabel ':edge-labels))    ;label hierarchy.
           (send edge :push-diagram-label alabel))
          (t
           (send edge :push-diagram-label old-alabel)))))


(defun UNDO-JUNCTION-IN-DIAGRAM (vertex)
  ;;Effect: Undo current label assignment for junction in the diagram.
  (send vertex :remove-diagram-label)           ;clear label of junction
  ;;clear all the labels of arcs connected to junction, if the arc has only
  ;;one labelled junction.
  (loop for edge in (send vertex :edge-list) do
    (send edge :pop-diagram-label)))
```

APPENDIX F

```
;;; Constraint propagation along cycle-vertex links in level 2:

(defmethod (:CSP-CYCLE-VERTEX SCENE)
           (&aux (cycle-fifo (make-instance 'fifo))
                 (vertex-fifo (make-instance 'fifo)))

  ;;Requires: (send self :find-junction-loops) has already been done.
  ;;          All junction-loops are locally consistent with everything else.
  ;;Effect: Constraint satisfaction and propagation along the face-vertex links.
  ;;   Do until (and (emptyp face-fifo) (emptyp vertex-fifo))
  ;;      a. For each face in face-fifo queue, constrain the set of junctions of
  ;;      the vertices around face, using the set of junction-loops.
  ;;      Push the vertices that are constrained in vertex-fifo queue.
  ;;      b. For each vertex in vertex-fifo queue, constrain the set of junction-loops
  ;;      of the faces around vertex, using the set of junctions.
  ;;      Push the faces that are constrained in face-fifo queue.


  ;;Constraint satisfaction and propagation.
  (loop for firstp first t then ()
        until (and (not firstp)
                   (send cycle-fifo :emptyp) (null *late-cycles*)
                   (send vertex-fifo :emptyp)) do

    ;;Step a: Cycles constrain vertices, find vertex-fifo
    (let ((restrict-clabelsp ()))
      (loop for cycle in (send cycle-fifo :elements) do
        (and (send cycle :deduce-labels-of-cycle-from-junction-loops)
             (setq restrict-clabelsp t)))
      (and *tracep*
           restrict-clabelsp
           (send self :display-labeling :cycles :labels)
           (format t "~% > Restrict labels of cycles from their junction-loops.")))
    (when *late-cycles*
      (send cycle-fifo :pushes *late-cycles*)
      (setq *late-cycles* ()))

    (let ((restrict-verticesp ()))
      (loop until (send cycle-fifo :emptyp)
            for cycle = (send cycle-fifo :pop) do
        (or (send (send cycle :labeling) :node-inconsistentp)
            (loop for vertex in (send cycle :vertex-list) do
              (and (send cycle :restrict-junctions-of-vertex-with-junction-loops vertex)
                   (setq restrict-verticesp t)
                   (send vertex-fifo :push vertex)))))
      (and *tracep*
```

```
        restrict-verticesp
        (send self :display-labeling :vertices :no-of-junctions)
        (format t "~% > Cycles restrict their linked vertices.")))

;;Step b: Vertices constrain cycles, find cycle-fifo
(let ((restrict-vlabelsp ()))
  (loop for vertex in (send vertex-fifo :elements) do
    (and (send vertex :deduce-labels-of-vertex-from-junctions)
         (setq restrict-vlabelsp t)))
  (and *tracep*
       restrict-vlabelsp
       (send self :display-labeling :vertices :labels)
       (format t "~% > Restrict labels of vertices from their junctions.")))
(and firstp
     (send vertex-fifo :pushes 2d-vertex-list))

(let ((restrict-cyclesp ()))
  (loop until (send vertex-fifo :emptyp)
        for vertex = (send vertex-fifo :pop) do
    (or (send (send vertex :labeling) :node-inconsistentp)
        (loop for cycle in (send vertex :cycle-list) do
          (and (send vertex :restrict-junction-loops-of-cycle-with-junctions cycle)
               (setq restrict-cyclesp t)
               (send cycle-fifo :push cycle)))))
  (and *tracep*
       restrict-cyclesp
       (send self :display-labeling :cycles :no-of-junction-loops)
       (format t "~% > Vertices restrict their linked cycles.")))

 (defmethod (:RESTRICT-JUNCTIONS-OF-VERTEX-WITH-JUNCTION-LOOPS CYCLE) (vertex)
   ;;Require: cycle has consistent junction-loops.
   ;;Effect: vertex can only have junctions that are at least in one junction-loop.
   (let ((vertex-labeling (send vertex :labeling))
         (junction-loops (send labeling :links)))
     (and (not (send vertex-labeling :node-inconsistentp))
          junction-loops

          (let ((vertex-no (find-position-in-list vertex vertex-list))
                (junctions (send vertex-labeling :links))
                (deleted-junctions ()))

            ;;we mutate the set of junctions of vertex,
            ;;this work with label hierarchy.
            (let ((junctions-ptr (cons 'ptr junctions)))
              (setq junctions junctions-ptr)     ;another pointer to junctions
              (do ((junction (cadr junctions-ptr)
                             (cadr junctions-ptr)))
                  ((null junction))
                (cond
                  ;;junction is not part of any junction-loop
                  ((loop for junction-loop in junction-loops
                         never (equal-or-is-subtuple junction
                                                     (nth vertex-no junction-loop)
                                                     ':edge-labels))
                   ;;expand junction, at the edges that have superior labels.
                   ;;junction must be refined to match a junction in junction-loop
                   (let ((arc-nos ())
                         (expand-junctions ()))
                     (loop for junction-loop in junction-loops
                           for junction-in-loop = (nth vertex-no junction-loop) do
                       (when (equal-or-is-subtuple junction-in-loop
                                                   junction
                                                   ':edge-labels)
                         (loop for arc-no from 0 below (length junction) do
                           (let ((arc-in-junction (nth arc-no junction))
                                 (arc-in-loop (nth arc-no junction-in-loop)))
                             (and (not (eq arc-in-loop arc-in-junction))
                                  (eq-or-is-a arc-in-loop arc-in-junction ':edge-labels)
                                  (not (memq arc-no arc-nos))
                                  (push arc-no arc-nos))))))
                     (and arc-nos
                          (setq expand-junctions
                                (expand-tuple-at-nths junction arc-nos ':edge-labels)))
                     (cond (expand-junctions
                            (rplacd (last junctions-ptr) expand-junctions))
                           (t                     ;cannot be expanded, so must throw away.
```

```
            (push junction deleted-junctions))))
        ;;increment ptr
        (rplacd junctions-ptr (cddr junctions-ptr)))
       (t
        (setq junctions-ptr (cdr junctions-ptr)))))
  (setq junctions (cdr junctions)))

;;record the new set of junctions, always the last non null set that is locally
;;consistent with its first-constraining supports.
(send vertex :set-junctions (or junctions deleted-junctions))

;;find set of supports
(when deleted-junctions
  (cond ((null junctions)
         ;;detect a contradiction in the set of supports.
         (send vertex :set-labeling-inconsistency '1-inconsistent)
         (mark-conflicting-supports (send vertex-labeling :supports) ;conflict
                                    (send labeling :supports)))      ;in 2 sets
        (t
         (send vertex-labeling :set-supports
               (tagged-nunion (send vertex-labeling :supports)       ;concatenate
                              (send labeling :supports)))))) ;2 sets of supports

;;signal=T if vertex is revised, and still has a consistent set of junctions
(and junctions
     deleted-junctions)))))



(defmethod (:RESTRICT-JUNCTION-LOOPS-OF-CYCLE-WITH-JUNCTIONS VERTEX) (cycle)
  ;;Require: Vertex has consistent junctions
  ;;Effect: Cycle can only have junction-loops that contains at least an junction
  ;;        of vertex.
  (let* ((cycle-labeling (send cycle :labeling))
         (junction-loops (send cycle :junction-loops))) ;compute loops if not already done

    (and (not (send cycle-labeling :node-inconsistentp))
         junction-loops

         (let ((vertices-in-cycle (send cycle :vertex-list))
               (deleted-loops ()))

           ;;we mutate the set of junction-loops of cycle,
           ;;this work with label hierarchy.
           (let ((junction-loops-ptr (cons 'ptr junction-loops)))
             (setq junction-loops junction-loops-ptr)   ;another pointer to junction-loops
             (do ((junction-loop (cadr junction-loops-ptr)
                                 (cadr junction-loops-ptr))
                  (vertex-no (find-position-in-list self vertices-in-cycle))
                  (junctions (send labeling :links)))
                 ((null junction-loop))
               (let ((junction-in-loop (nth vertex-no junction-loop)))
                 (cond
                   ;;junction-loop is not consistent with any junction of vertex
                   ((loop for junction in junctions
                          never (equal-or-is-subtuple junction-in-loop
                                                      junction
                                                      ':edge-labels))
                    ;;expand junction-in-loop, at the edges that have superior labels.
                    ;;junction-loop may be refined to match a junction in junctions
                    (let ((arc-nos ())
                          (expand-loops ()))
                      (loop for junction in junctions do
                        (when (equal-or-is-subtuple junction
                                                    junction-in-loop
                                                    ':edge-labels)

                          ;;then expand junction-loop with the expand-junctions.
                          (loop for arc-no from 0 below (length junction) do
                            (let ((arc-in-junction (nth arc-no junction))
                                  (arc-in-loop (nth arc-no junction-in-loop)))
                              (and (not (eq arc-in-junction arc-in-loop))
                                   (eq-or-is-a arc-in-junction arc-in-loop ':edge-labels)
                                   (not (memq arc-no arc-nos))
                                   (push arc-no arc-nos))))))
```

```
            (and arc-nos
                 (let ((expand-junctions
                        (expand-tuple-at-nths junction-in-loop arc-nos
                                              ':edge-labels)))
                   (setq expand-loops
                         (expand-loop-at-vertex-with-junctions
                           vertices-in-cycle junction-loop
                           self expand-junctions))))
            (cond (expand-loops
                   (rplacd (last junction-loops-ptr) expand-loops))
                  (t                    ;cannot be expanded, so must throw away.
                   (push junction-loop deleted-loops))))
          ;;increment ptr
          (rplacd junction-loops-ptr (cddr junction-loops-ptr)))
         (t
          (setq junction-loops-ptr (cdr junction-loops-ptr))))))
    (setq junction-loops (cdr junction-loops)))

  ;;record the new set of junction-loops,
  ;;always the last non null set that is locally
  ;;consistent with its first-constraining supports.
  (send cycle :set-junction-loops (or junction-loops deleted-loops))

  ;;find set of supports
  (when deleted-loops
    (cond ((null junction-loops)
           ;;detect a contradiction in the set of supports.
           (send cycle :set-labeling-inconsistency '1-inconsistent)
           (mark-conflicting-supports (send cycle-labeling :supports)  ;conflict
                                      (send labeling :supports)))      ;in 2 sets

          (t
           (send cycle-labeling :set-supports
                 (tagged-nunion (send cycle-labeling :supports)        ;concatenate
                                (send labeling :supports)))))) ;2 sets of supports

        ;;signal=T if cycle is revised, and still has a consistent set of junction-loops
        (and junction-loops
             deleted-loops)))))


(defun EXPAND-LOOP-AT-VERTEX-WITH-JUNCTIONS
       (vertex-list junction-loop vertex expand-junctions &aux (expand-loops ()))
  ;;Assume: Loop is closed.
  ;;Effect: Find the junction-loops by replacing junction at vertex-no at expand-junctions.
  ;;        Check that expand-junction can fit in junction-loop.
  (let* ((vertex-no (find-position-in-list vertex vertex-list))
         (before-no (mod (1- vertex-no) (length vertex-list)))
         (after-no (mod (1+ vertex-no) (length vertex-list)))
         (before-vertex (nth before-no vertex-list))
         (after-vertex (nth after-no vertex-list)))
    ;;insert the interfacing junctions.
    (store-junction-in-diagram (nth before-no junction-loop) before-vertex)
    (store-junction-in-diagram (nth after-no junction-loop) after-vertex)
    ;;check that expand-junctions can fit in junction-loop
    (loop for expand-junction in expand-junctions do
      (when (junction-consistent-with-diagramp expand-junction vertex)
        (store-junction-in-diagram expand-junction vertex)
        (push (loop for old-junction in junction-loop
                    for jvertex in vertex-list
                    collect
                      (select jvertex
                        ((before-vertex vertex after-vertex)
                         ;;most constraining label for this junction
                         (loop for edge in (send jvertex :edge-list)
                               collect (send edge :diagram-label)))
                        (otherwise
                         (copylist old-junction))))
              expand-loops)
        (undo-junction-in-diagram vertex)))
    ;;clear the diagram
    (undo-junction-in-diagram before-vertex)
    (undo-junction-in-diagram after-vertex)
    expand-loops))
```

APPENDIX G

```
;;; Enforcing local consistency over each edge. Each edge must have labels consistent
;;; with the two junctions at its two vertices, and with the two junction-loops
;;; about its two faces.

(defmethod (:FIND-JUNCTION-PAIRS SCENE) ()
  ;;Effect: For each face in region, do a depth-first search for all valid labelings
  ;;        of the edges and vertices around the loop.
  ;;Note: Will also handle inconsistent topology around edges.

  (loop for edge in 2d-edge-list do (send edge :find-junction-pairs))

  (when *tracep*
    (send self :display-labeling :edges :labels)
    (send self :display-labeling :edges :no-of-junction-pairs)))

(defmethod (:FIND-JUNCTION-PAIRS EDGE) (&aux (junction-pairs ()) (pair-labels ()))
  ;;Require: Both vertices at the two ends of edge have valid junctions.
  ;;Effect: Do a complete depth-first search for all valid pairs of junctions
  ;;        for the two vertices at the two ends of edge.
  ;;        There must exists a common edge-label between the 2 junctions.
  ;;        This common edge-label must be consistent with an edge-label in
  ;;        (send self :labels)
  ;;        Support is the edge itself with its apriori or default label,
  ;;        and the supports of the two end vertices.

  (when (not (send labeling :inconsistentp 2))  ;up to its neighbors

    (let ((edge-labels (send self :labels)))
      (loop for junction1 in (send vertex1 :junctions) do
        (store-junction-in-diagram junction1 vertex1)
        (loop for junction2 in (send vertex2 :junctions) do
          (when (junction-consistent-with-diagramp junction2 vertex2)
            (store-junction-in-diagram junction2 vertex2)
            ;;the pair of junctions is now consistent to both vertices.
            ;;the label of the common edge must be consistent to an edge-label
            (let ((elabel (send self :diagram-label)))
              (when (loop for edge-label in edge-labels
                          thereis (eq-or-is-a elabel edge-label ':edge-labels))
                (and (not (memq elabel pair-labels))
                     (push elabel pair-labels))
                (push (list (loop for edge in (send vertex1 :edge-list)
                                  collect (send edge :diagram-label))
                            (loop for edge in (send vertex2 :edge-list)
                                  collect (send edge :diagram-label)))
                      junction-pairs)))
            (undo-junction-in-diagram vertex2)))
        (undo-junction-in-diagram vertex1)))

    ;;Record the set of junction-pairs and the associated edge-labels.
    (send self :set-junction-pairs junction-pairs)
    (send self :set-labels (find-highest-classes pair-labels ':edge-labels))

    ;;Keep track of the set of supports for the junction-loops of face.
    (let ((edge-supports (send self :labeling-supports))
          (additional-supports ())
          (vertex-list (list vertex1 vertex2)))
      (loop for vertex in vertex-list do
        (loop for node in (send vertex :labeling-supports) do (set-tag node)))
      (loop for node in edge-supports do (unset-tag node))
      (setq additional-supports
            (loop for vertex in vertex-list
                  nconc (loop for node in (send vertex :labeling-supports)
                              if (send node :tag)
                                collect (progn (unset-tag node)
                                               node))))
      (cond ((null junction-pairs)
             (send self :set-labeling-inconsistency '1-inconsistent)
             (mark-conflicting-supports edge-supports   ;conflict in 2 sets
                                        additional-supports))
            (t
             (send self :set-labeling-supports
                   (tagged-nunion edge-supports ;concatenate 2 sets
                                  additional-supports)))))      ;of supports
      junction-pairs))
```

APPENDIX H

```
;;; Constraint propagation over vertex-edge-face links in level 3:
;;; junctions, junction-pairs, junction-loops.

(defmethod (:CSP-VERTEX-EDGE-CYCLE-FACE-3 SCENE)
           (&aux (vertex-fifo (make-instance 'fifo))
                 (edge-fifo (make-instance 'fifo))
                 (cycle-fifo (make-instance 'fifo))
                 (face-fifo (make-instance 'fifo)))

  ;;Require: Local consistency.
  ;;Effect: Constraint satisfaction and propagation along the vertex-edge-face links.
  ;;   Do until (and (emptyp vertex-fifo) (emptyp edge-fifo) (emptyp face-fifo))
  ;;      a. For each edge in edge-fifo queue:
  ;;         * constrain the set of junction-loops
  ;;           of the faces on both sides of edge, using the set of junction-pairs.
  ;;           Push the faces that are constrained in face-fifo queue.
  ;;         * constrain the set of junctions
  ;;           at its two end points, using the set of junction-pairs.
  ;;           Push the vertices that are constrained in vertex-fifo queue.
  ;;      b. For each face in face-fifo queue:
  ;;         * constrain the set of junctions
  ;;           at its vertices, using the set of junction-loops.
  ;;           Push the vertices that are constrained in vertex-fifo queue.
  ;;         * constrain the set of junction-pairs
  ;;           at its edges, using the set of junction-loops.
  ;;           Push the edges that are constrained in edge-fifo queue.
  ;;      c. For each vertex in vertex-fifo queue:
  ;;         * constrain the set of junction-pairs
  ;;           of the edges intersecting at vertex, using the set of junctions.
  ;;           Push the edges that are constrained in edge-fifo queue.
  ;;         * constrain the set of junction-loops
  ;;           of the faces meeting at vertex, using the set of junctions.
  ;;           Push the faces that are constrained in face-fifo queue.


  ;;Constraint satisfaction and propagation.
  (loop for firstp first t then ()
        until (and (not firstp)
                   (send vertex-fifo :emptyp)
                   (send edge-fifo :emptyp)
                   (send cycle-fifo :emptyp)
                   (send face-fifo :emptyp)) do

    ;;Step a: Edges constrain cycles and vertices, find cycle-fifo and vertex-fifo
    (let ((restrict-elabelsp ()))
      (loop for edge in (send edge-fifo :elements) do
        (and (send edge :deduce-labels-of-edge-from-junction-pairs)
             (setq restrict-elabelsp t)))
      (and *tracep*
           restrict-elabelsp
           (send self :display-labeling :edges :labels)
           (format t "~% > Restrict labels of edges from their junction-pairs.")))
    (and firstp
         (send edge-fifo :pushes 2d-edge-list))

    (let ((restrict-cyclesp ())
          (restrict-verticesp ()))

      (loop until (send edge-fifo :emptyp)
            for edge = (send edge-fifo :pop) do
        (unless (send (send edge :labeling) :node-inconsistentp)

          (loop for cycle in (send edge :cycle-list) do
            (and (send edge :restrict-junction-loops-of-cycle-with-junction-pairs cycle)
                 (setq restrict-cyclesp t)
                 (send cycle-fifo :push cycle)))

          (let ((vertex1 (send edge :vertex1))
                (vertex2 (send edge :vertex2)))
            (and (send edge :restrict-junctions-of-vertex-with-junction-pairs vertex1)
                 (setq restrict-verticesp t)
                 (send vertex-fifo :push vertex1))
            (and (send edge :restrict-junctions-of-vertex-with-junction-pairs vertex2)
```

```
            (setq restrict-verticesp t)
            (send vertex-fifo :push vertex2)))))

   (and *tracep*
        restrict-cyclesp
        (send self :display-labeling :cycles :no-of-junction-loops)
        (format t "~% > Edges restrict their adjacent cycles."))
   (and *tracep*
        restrict-verticesp
        (send self :display-labeling :vertices :no-of-junctions)
        (format t "~% > Edges restrict their adjacent vertices.")))


;;Step b: Cycles constrain vertices, edges and faces;
;;        find vertex-fifo, edge-fifo, and face-fifo
(let ((restrict-clabelsp ()))
  (loop for cycle in (send cycle-fifo :elements) do
    (and (send cycle :deduce-labels-of-cycle-from-junction-loops)
         (setq restrict-clabelsp t)))
  (and *tracep*
       restrict-clabelsp
       (send self :display-labeling :cycles :labels)
       (format t "~% > Restrict labels of cycles from their junction-loops.")))
(and firstp
     (send cycle-fifo :pushes 2d-cycle-list))
(when *late-cycles*
  (send cycle-fifo :pushes *late-cycles*)
  (setq *late-cycles* ()))

(let ((restrict-verticesp ())
      (restrict-edgesp ())
      (restrict-faces ()) (restrict-facesp ()))

  (loop until (send cycle-fifo :emptyp)
        for cycle = (send cycle-fifo :pop) do
    (unless (send (send cycle :labeling) :node-inconsistentp)

      (loop for vertex in (send cycle :vertex-list) do
        (and (send cycle :restrict-junctions-of-vertex-with-junction-loops vertex)
             (setq restrict-verticesp t)
             (send vertex-fifo :push vertex)))

      (loop for edge in (send cycle :edge-list) do
        (and (send cycle :restrict-junction-pairs-of-edge-with-junction-loops edge)
             (setq restrict-edgesp t)
             (send edge-fifo :push edge)))

      (let ((face (send cycle :face)))
        (and (not (memq face restrict-faces))
             (push face restrict-faces)))))

  (loop for face in restrict-faces do
    (and (send face :restrict-labels-of-face-with-cycle-junction-loops)
         (setq restrict-facesp t)
         (send face-fifo :push face)))

  (and *tracep*
       restrict-facesp
       (send self :display-labeling :faces :labels)
       (format t "~% > Cycles restrict their linked faces."))
  (and *tracep*
       restrict-verticesp
       (send self :display-labeling :vertices :no-of-junctions)
       (format t "~% > Cycles restrict their linked vertices."))
  (and *tracep*
       restrict-edgesp
       (send self :display-labeling :edges :no-of-junction-pairs)
       (format t "~% > Cycles restrict their linked edges.")))

;;Step c: faces constrain cycles
(and firstp
     (send face-fifo :pushes 2d-face-list))
(let ((restrict-cyclesp ()))
  (loop until (send face-fifo :emptyp)
        for face = (send face-fifo :pop) do
    (unless (send (send face :labeling) :node-inconsistentp)
```

```
      (loop for cycle in (send face :cycle-list) do
        (and (send face :restrict-junction-loops-of-cycle-with-face-labels cycle)
             (setq restrict-cyclesp t)
             (send cycle-fifo :push cycle)))))
    (and *tracep*
         restrict-cyclesp
         (send self :display-labeling :cycles :no-of-junction-loops)
         (format t "~% > Faces restrict their adjacent cycles. ")))


  ;;Step d: Vertices constrain edges and cycles, find edge-fifo and cycle-fifo
  (let ((restrict-vlabelsp ()))
    (loop for vertex in (send vertex-fifo :elements) do
      (and (send vertex :deduce-labels-of-vertex-from-junctions)
           (setq restrict-vlabelsp t)))
    (and *tracep*
         restrict-vlabelsp
         (send self :display-labeling :vertices :labels)
         (format t "~% > Restrict labels of vertices with junctions.")))
  (and firstp
       (send vertex-fifo :pushes 2d-vertex-list))

  (let ((restrict-edgesp ())
        (restrict-cyclesp ()))

    (loop until (send vertex-fifo :emptyp)
          for vertex = (send vertex-fifo :pop) do
      (unless (send (send vertex :labeling) :node-inconsistentp)

        (loop for edge in (send vertex :edge-list) do
          (and (send vertex :restrict-junction-pairs-of-edge-with-junctions edge)
               (setq restrict-edgesp t)
               (send edge-fifo :push edge)))
        (loop for cycle in (send vertex :cycle-list) do
          (and (send vertex :restrict-junction-loops-of-cycle-with-junctions cycle)
               (setq restrict-cyclesp t)
               (send cycle-fifo :push cycle)))))

    (and *tracep*
         restrict-edgesp
         (send self :display-labeling :edges :no-of-junction-pairs)
         (format t "~% > Vertices restrict their linked edges."))
    (and *tracep*
         restrict-cyclesp
         (send self :display-labeling :cycles :no-of-junction-loops)
         (format t "~% > Vertices restrict their linked cycles.")))

  ))


;;; Constraint propagation over vertex-edge links in level 2 and 3.

(defmethod (:RESTRICT-JUNCTIONS-OF-VERTEX-WITH-JUNCTION-PAIRS EDGE) (vertex)
  ;;Require: Edge has consistent junction-pairs.
  ;;Effect: Vertex can only have junctions that are part of at least one junction-pair
  ;;        of edge.
  (let ((vertex-labeling (send vertex :labeling)))
    (and (not (send vertex-labeling :node-inconsistentp))

      (let ((vertex-no (find-position-in-list vertex (list vertex1 vertex2)))
            (junctions (send vertex-labeling :links))
            (deleted-junctions ()))

        ;;we mutate the set of junctions of vertex,
        ;;this work with label hierarchy.
        (let ((junctions-ptr (cons 'ptr junctions)))
          (setq junctions junctions-ptr)      ;another pointer to junctions
          (do ((junction (cadr junctions-ptr)
                         (cadr junctions-ptr))
               (junction-pairs (send labeling :links)))
              ((null junction))
            (cond
              ;;junction is not part of any junction-pair
              ((loop for junction-pair in junction-pairs
                     never (equal-or-is-subtuple junction
                                                 (nth vertex-no junction-pair)
```

```
                                        ':edge-labels))
        ;;expand junction, at the edges that have superior labels.
        ;;junction must be refined to match a junction in junction-pair
        (let ((arc-nos ())
              (expand-junctions ()))
          (loop for junction-pair in junction-pairs
                for junction-in-pair = (nth vertex-no junction-pair) do
            (when (equal-or-is-subtuple junction-in-pair
                                        junction
                                        ':edge-labels)
              (loop for arc-no from 0 below (length junction) do
                (let ((arc-in-junction (nth arc-no junction))
                      (arc-in-pair (nth arc-no junction-in-pair)))
                  (and (not (eq arc-in-pair arc-in-junction))
                       (eq-or-is-a arc-in-pair arc-in-junction ':edge-labels)
                       (not (memq arc-no arc-nos))
                       (push arc-no arc-nos))))))
          (and arc-nos
               (setq expand-junctions
                     (expand-tuple-at-nths junction arc-nos ':edge-labels)))
          (cond (expand-junctions
                 (rplacd (last junctions-ptr) expand-junctions))
                (t                       ;cannot be expanded, so must throw away.
                 (push junction deleted-junctions))))
        ;;increment ptr
        (rplacd junctions-ptr (cddr junctions-ptr)))
       (t
        (setq junctions-ptr (cdr junctions-ptr)))))
    (setq junctions (cdr junctions)))

  ;;Record the new set of junctions, always the last non null set that is locally
  ;;consistent with its first-constraining supports.
  (send vertex :set-junctions (or junctions deleted-junctions))

  ;;Find set of supports
  (when deleted-junctions
    (cond ((null junctions)
           ;;detect a contradiction in the set of supports.
           (send vertex :set-labeling-inconsistency '1-inconsistent)
           (mark-conflicting-supports (send vertex-labeling :supports) ;conflict
                                      (send labeling :supports)))     ;in 2 sets
          (t
           (send vertex-labeling :set-supports
                 (tagged-nunion (send vertex-labeling :supports)       ;concatenate
                                (send labeling :supports)))))) ;2 sets of supports

  ;;signal=T if vertex is revised, and still has a consistent set of junctions
  (unless (send vertex-labeling :node-inconsistentp)
    deleted-junctions)))))


(defmethod (:RESTRICT-JUNCTION-PAIRS-OF-EDGE-WITH-JUNCTIONS VERTEX) (edge)
  ;;Require: Vertex has consistent junctions
  ;;Effect: Edge can only have junction-pairs that contain at least one junction
  ;;        of vertex.
  ;;        Similar to :restrict-junction-loops-of-face-with-junctions.

  (let ((edge-labeling (send edge :labeling)))
    (and (not (send edge-labeling :node-inconsistentp))

         (let ((vertices-in-edge (list (send edge :vertex1) (send edge :vertex2)))
               (junction-pairs (send edge-labeling :links))
               (deleted-pairs ()))

           ;;we mutate the set of junction-pairs of edge,
           ;;this work with label hierarchy.
           (let ((junction-pairs-ptr (cons 'ptr junction-pairs)))
             (setq junction-pairs junction-pairs-ptr)   ;another pointer to junction-pairs
             (do ((junction-pair (cadr junction-pairs-ptr)
                                 (cadr junction-pairs-ptr))
                  (vertex-no (find-position-in-list self vertices-in-edge))
                  (junctions (send labeling :links)))
                 ((null junction-pair))
               (let ((junction-in-pair (nth vertex-no junction-pair)))
                 (cond
                   ;;junction-pair is not consistent with any junction of vertex
```

```
        ((loop for junction in junctions
              never (equal-or-is-subtuple junction-in-pair
                                          junction
                                          ':edge-labels))
         ;;expand junction-in-pair, at the edges that have superior labels.
         ;;junction-pair may be refined to match a junction in junctions
         (let ((arc-nos ())
               (expand-pairs ()))
           (loop for junction in junctions do
             (when (equal-or-is-subtuple junction
                                         junction-in-pair
                                         ':edge-labels)

               ;;then expand junction-pair with the expand-junctions.
               (loop for arc-no from 0 below (length junction) do
                 (let ((arc-in-junction (nth arc-no junction))
                       (arc-in-pair (nth arc-no junction-in-pair)))
                   (and (not (eq arc-in-junction arc-in-pair))
                        (eq-or-is-a arc-in-junction arc-in-pair ':edge-labels)
                        (not (memq arc-no arc-nos))
                        (push arc-no arc-nos))))))
           (and arc-nos
                (let ((expand-junctions
                        (expand-tuple-at-nths junction-in-pair arc-nos
                                              ':edge-labels)))
                  (setq expand-pairs
                        (expand-loop-at-vertex-with-junctions
                          vertices-in-edge junction-pair
                          self expand-junctions))))
           (cond (expand-pairs
                  (rplacd (last junction-pairs-ptr) expand-pairs))
                 (t                   ;cannot be expanded, so must throw away.
                  (push junction-pair deleted-pairs))))
         ;;increment ptr
         (rplacd junction-pairs-ptr (cddr junction-pairs-ptr)))
        (t
         (setq junction-pairs-ptr (cdr junction-pairs-ptr))))))
  (setq junction-pairs (cdr junction-pairs)))

;;Record the new set of junctions, always the last non null set that is locally
;;consistent with its first-constraining supports.
(send edge :set-junction-pairs (or junction-pairs deleted-pairs))

;;Find set of supports
(when deleted-pairs
  (cond ((null junction-pairs)
         ;;detect a contradiction in the set of supports.
         (send edge :set-labeling-inconsistency '1-inconsistent)
         (mark-conflicting-supports (send edge-labeling :supports)   ;conflict
                                    (send labeling :supports)))      ;in 2 sets
        (t
         (send edge-labeling :set-supports
               (tagged-nunion (send edge-labeling :supports) ;concatenate 2 sets
                              (send labeling :supports)))))) ;of supports

;;signal=T if edge is revised, and still has a consistent set of junction-pairs
(unless (send edge-labeling :node-inconsistentp)
  deleted-pairs)))))

(defmethod (:RESTRICT-JUNCTION-LOOPS-OF-CYCLE-WITH-JUNCTION-PAIRS EDGE) (cycle)
  ;;Require: Edge has consistent junction-pairs
  ;;         Edge and its two end-points are part of cycle.
  ;;Effect: Cycle can only have junction-loops that contains at least a junction-pair
  ;;        of edge.
  (let ((cycle-labeling (send cycle :labeling)))
    (and (not (send cycle-labeling :node-inconsistentp))

         (let ((vertex1-no (find-position-in-list vertex1 (send cycle :vertex-list)))
               (vertex2-no (find-position-in-list vertex2 (send cycle :vertex-list)))
               (junction-loops (send cycle :junction-loops))    ;compute loops if not done
               (deleted-loops ()))
```

```
;;we mutate the set of junction-loops of cycle,
;;this work with label hierarchy.
(let ((junction-loops-ptr (cons 'ptr junction-loops)))
  (setq junction-loops junction-loops-ptr)   ;another pointer to junction-loops
  (do ((junction-loop (cadr junction-loops-ptr)
                      (cadr junction-loops-ptr))
       (junction-pairs (send labeling :links)))
      ((null junction-loop))
    (let ((junction1-in-loop (nth vertex1-no junction-loop))
          (junction2-in-loop (nth vertex2-no junction-loop)))
      (cond
        ;;junction-loop is not consistent with any junction-pair of edge
        ((loop for junction-pair in junction-pairs
               never (and (equal-or-is-subtuple junction1-in-loop
                                                (first junction-pair)
                                                ':edge-labels)
                          (equal-or-is-subtuple junction2-in-loop
                                                (second junction-pair)
                                                ':edge-labels)))
         ;;junction-loop may be refined to match a junction-pair in junction-pairs
         (let ((arc1-nos ())
               (arc2-nos ())
               (expand-loops ()))
           (loop for junction-pair in junction-pairs
                 for junction1-in-pair = (first junction-pair)
                 for junction2-in-pair = (second junction-pair) do
             (when (and (equal-or-is-subtuple junction1-in-pair
                                              junction1-in-loop
                                              ':edge-labels)
                        (equal-or-is-subtuple junction2-in-pair
                                              junction2-in-loop
                                              ':edge-labels))
               ;;expand junction1-in-loop, at edges that have superior labels
               (loop for arc1-no from 0 below (length junction1-in-pair) do
                 (let ((arc1-in-pair (nth arc1-no junction1-in-pair))
                       (arc1-in-loop (nth arc1-no junction1-in-loop)))
                   (and (not (eq arc1-in-pair arc1-in-loop))
                        (eq-or-is-a arc1-in-pair arc1-in-loop ':edge-labels)
                        (not (memq arc1-no arc1-nos))
                        (push arc1-no arc1-nos))))
               ;;expand junction2-in-loop, at edges that have superior labels
               (loop for arc2-no from 0 below (length junction2-in-pair) do
                 (let ((arc2-in-pair (nth arc2-no junction2-in-pair))
                       (arc2-in-loop (nth arc2-no junction2-in-loop)))
                   (and (not (eq arc2-in-pair arc2-in-loop))
                        (eq-or-is-a arc2-in-pair arc2-in-loop ':edge-labels)
                        (not (memq arc2-no arc2-nos))
                        (push arc2-no arc2-nos))))))
           (and (or arc1-nos arc2-nos)
                (let ((expand-junction1s-in-loop
                        (expand-tuple-at-nths junction1-in-loop arc1-nos
                                              ':edge-labels))
                      (expand-junction2s-in-loop
                        (expand-tuple-at-nths junction2-in-loop arc2-nos
                                              ':edge-labels)))
                  ;;check that expand-junctions at vertex1 and/or vertex2
                  ;;can fit in junction-loop
                  (setq expand-loops
                        (cond ((null expand-junction2s-in-loop)
                               (expand-loop-at-vertex-with-junctions
                                 (send cycle :vertex-list) junction-loop
                                 vertex1 expand-junction1s-in-loop))
                              ((null expand-junction1s-in-loop)
                               (expand-loop-at-vertex-with-junctions
                                 (send cycle :vertex-list) junction-loop
                                 vertex2 expand-junction2s-in-loop))
                              (t
                               (expand-loop-at-vertex-pair-with-junctions
                                 (send cycle :vertex-list) junction-loop
                                 vertex1 expand-junction1s-in-loop
                                 vertex2 expand-junction2s-in-loop))))))
           (cond (expand-loops
                  (rplacd (last junction-loops-ptr) expand-loops))
                 (t                   ;cannot be expanded, so must throw away.
```

```
            (push junction-loop deleted-loops))))
  ;;increment ptr
  (rplacd junction-loops-ptr (cddr junction-loops-ptr)))
 (t
                  (setq junction-loops-ptr (cdr junction-loops-ptr))))))
          (setq junction-loops (cdr junction-loops)))

        ;;Record the new set of junction-loops,
        ;;always the last non null set that is locally
        ;;consistent with its first-constraining supports.
        (send cycle :set-junction-loops (or junction-loops deleted-loops))

        ;;Find set of supports
        (when deleted-loops
          (cond ((null junction-loops)
                 ;;detect a contradiction in the set of supports.
                 (send cycle :set-labeling-inconsistency '1-inconsistent)
                 (mark-conflicting-supports (send cycle-labeling :supports)  ;conflict
                                            (send labeling :supports)))      ;in 2 sets
                (t
                 (send cycle-labeling :set-supports
                       (tagged-nunion (send cycle-labeling :supports)        ;concatenate
                                      (send labeling :supports)))))) ;2 sets of supports

        ;;signal=T if cycle is revised, and still has a consistent set of junction-loops
        (and junction-loops
             deleted-loops)))))


(defun EXPAND-LOOP-AT-VERTEX-PAIR-WITH-JUNCTIONS
       (vertex-list junction-loop
        vertex1 expand-junction1s vertex2 expand-junction2s
        &aux (expand-loops ()))
  ;;Assume: Loop is closed.
  ;;Effect: Find the junction-loops by replacing junction at vertex-no by expand-junctions.
  ;;        Check that expand-junction can fit in junction-loop.

  ;;insert the interfacing junctions.
  (loop for junction in junction-loop
        for vertex in vertex-list do
    (unless (or (eq vertex vertex1) (eq vertex vertex2))
      (store-junction-in-diagram junction vertex)))
  ;;check that expand-junctions can fit in junction-loop
  (loop for expand-junction1 in expand-junction1s do
    (when (junction-consistent-with-diagramp expand-junction1 vertex1)
      (store-junction-in-diagram expand-junction1 vertex1)
      (loop for expand-junction2 in expand-junction2s do
        (when (junction-consistent-with-diagramp expand-junction2 vertex2)
          (store-junction-in-diagram expand-junction2 vertex2)
          (push (loop for vertex in vertex-list
                      collect
                        ;;most constraining label for this junction
                        (loop for edge in (send vertex :edge-list)
                              collect (send edge :diagram-label)))
                expand-loops)
          (undo-junction-in-diagram vertex2)))
      (undo-junction-in-diagram vertex1)))
 ;;clear the diagram
 (loop for vertex in vertex-list do
    (unless (or (eq vertex vertex1) (eq vertex vertex2))
      (undo-junction-in-diagram vertex)))
  expand-loops)


(defmethod (:RESTRICT-JUNCTION-PAIRS-OF-EDGE-WITH-JUNCTION-LOOPS CYCLE) (edge)
  ;;Require: Cycle has consistent junction-loops
  ;;Effect: Edge can only have junction-pairs that contains at least a junction-loop
  ;;        of cycle.
  (let ((edge-labeling (send edge :labeling))
        (junction-loops (send labeling :links)))
    (and (not (send edge-labeling :node-inconsistentp))
         junction-loops

         (let ((vertex1 (send edge :vertex1))
               (vertex2 (send edge :vertex2))
               (junction-pairs (send edge-labeling :links))
```

```
    (deleted-pairs ()))

;;we mutate the set of junction-pairs of edge,
;;this work with label hierarchy.
(let ((junction-pairs-ptr (cons 'ptr junction-pairs)))
  (setq junction-pairs junction-pairs-ptr)   ;another pointer to junction-pairs
  (do ((junction-pair (cadr junction-pairs-ptr)
                      (cadr junction-pairs-ptr))
       (vertex1-no-in-cycle (find-position-in-list vertex1 vertex-list))
       (vertex2-no-in-cycle (find-position-in-list vertex2 vertex-list)))
      ((null junction-pair))
    (let ((junction1-in-pair (first junction-pair))
          (junction2-in-pair (second junction-pair)))
      (cond
        ;;junction-pair is not consistent with any junction-loop of cycle
        ((loop for junction-loop in junction-loops
               never (and (equal-or-is-subtuple
                            junction1-in-pair
                            (nth vertex1-no-in-cycle junction-loop)
                            ':edge-labels)
                          (equal-or-is-subtuple
                            junction2-in-pair
                            (nth vertex2-no-in-cycle junction-loop)
                            ':edge-labels)))
         ;;junction-pair may be refined to match a junction-loop in junction-loops
         (let ((arc1-nos ())
               (arc2-nos ())
               (expand-pairs ()))
           (loop for junction-loop in junction-loops
                 for junction1-in-loop = (nth vertex1-no-in-cycle junction-loop)
                 for junction2-in-loop = (nth vertex2-no-in-cycle junction-loop) do
             (when (and (equal-or-is-subtuple junction1-in-loop
                                              junction1-in-pair
                                              ':edge-labels)
                        (equal-or-is-subtuple junction2-in-loop
                                              junction2-in-pair
                                              ':edge-labels))
               ;;expand junction1-in-pair, at edges that have superior labels
               (loop for arc1-no from 0 below (length junction1-in-loop) do
                 (let ((arc1-in-loop (nth arc1-no junction1-in-loop))
                       (arc1-in-pair (nth arc1-no junction1-in-pair)))
                   (and (not (eq arc1-in-loop arc1-in-pair))
                        (eq-or-is-a arc1-in-loop arc1-in-pair ':edge-labels)
                        (not (memq arc1-no arc1-nos))
                        (push arc1-no arc1-nos))))
               ;;expand junction2-in-pair, at edges that have superior labels
               (loop for arc2-no from 0 below (length junction2-in-loop) do
                 (let ((arc2-in-loop (nth arc2-no junction2-in-loop))
                       (arc2-in-pair (nth arc2-no junction2-in-pair)))
                   (and (not (eq arc2-in-loop arc2-in-pair))
                        (eq-or-is-a arc2-in-loop arc2-in-pair ':edge-labels)
                        (not (memq arc2-no arc2-nos))
                        (push arc2-no arc2-nos))))))
           (and (or arc1-nos arc2-nos)
                (let ((expand-junction1s-in-pair
                        (expand-tuple-at-nths junction1-in-pair arc1-nos
                                              ':edge-labels))
                      (expand-junction2s-in-pair
                        (expand-tuple-at-nths junction2-in-pair arc2-nos
                                       ':edge-labels)))
           ;;check that expand-junctions at vertex1 and/or vertex2
           ;;can fit in junction-pair
           (setq expand-pairs
                 (cond ((null expand-junction2s-in-pair)
                        (expand-loop-at-vertex-with-junctions
                          (list vertex1 vertex2) junction-pair
                          vertex1 expand-junction1s-in-pair))
                       ((null expand-junction1s-in-pair)
                        (expand-loop-at-vertex-with-junctions
                          (list vertex1 vertex2) junction-pair
                          vertex2 expand-junction2s-in-pair))
                       (t
                        (expand-loop-at-vertex-pair-with-junctions
                          (list vertex1 vertex2) junction-pair
                          vertex1 expand-junction1s-in-pair
                          vertex2 expand-junction2s-in-pair)))))
```

```
                (cond (expand-pairs
                       (rplacd (last junction-pairs-ptr) expand-pairs))
                      (t                    ;cannot be expanded, so must throw away.
                       (push junction-pair deleted-pairs))))
             ;;increment ptr
             (rplacd junction-pairs-ptr (cddr junction-pairs-ptr)))
            (t
             (setq junction-pairs-ptr (cdr junction-pairs-ptr))))))
      (setq junction-pairs (cdr junction-pairs)))

    ;;Record the new set of junction-pairs,
    ;;always the last non null set that is locally
    ;;consistent with its first-constraining supports.
    (send edge :set-junction-pairs (or junction-pairs deleted-pairs))

    ;;Find set of supports
    (when deleted-pairs
      (cond ((null junction-pairs)
             ;;detect a contradiction in the set of supports.
             (send edge :set-labeling-inconsistency '1-inconsistent)
             (mark-conflicting-supports (send edge-labeling :supports)   ;conflict
                                        (send labeling :supports)))      ;in 2 sets
            (t
             (send edge-labeling :set-supports
                   (tagged-nunion (send edge-labeling :supports) ;concatenate 2 sets
                                  (send labeling :supports)))))) ;of supports

    ;;signal=T if edge is revised, and still has a consistent set of junction-pairs
    (and junction-pairs
         deleted-pairs)))))
```

APPENDIX I

```
;;; Constraint propagation in level 0:
;;; vertex-labels, edge-labels, face-labels.

(defmethod (:CSP-VERTEX-EDGE-CYCLE-FACE-0 SCENE)
           (&aux (vertex-fifo (make-instance 'fifo))
                 (edge-fifo (make-instance 'fifo))
                 (cycle-fifo (make-instance 'fifo))
                 (face-fifo (make-instance 'fifo)))

  ;;Require: Local consistency of image segmentation.
  ;;Effect: Constraint satisfaction and propagation along the vertex-edge-face links.
  ;;   Do until (and (emptyp vertex-fifo) (emptyp edge-fifo) (emptyp face-fifo))
  ;;      a. For each vertex in vertex-fifo queue:
  ;;         * constrain the set of edge-labels
  ;;           of the edges intersecting at vertex, using the set of vertex-labels.
  ;;           Push the edges that are constrained in edge-fifo queue.
  ;;         * constrain the set of face-labels
  ;;           of the faces meeting at vertex, using the set of vertex-labels.
  ;;           Push the faces that are constrained in face-fifo queue.
  ;;      b. For each edge in edge-fifo queue:
  ;;         * constrain the set of face-labels
  ;;           of the faces on both sides of edge, using the set of edge-labels.
  ;;           Push the faces that are constrained in face-fifo queue.
  ;;         * constrain the set of vertex-labels
  ;;           at its two end points, using the set of edge-labels.
  ;;           Push the vertices that are constrained in vertex-fifo queue.
  ;;      c. For each face in face-fifo queue:
  ;;         * constrain the set of vertex-labels
  ;;           at its vertices, using the set of face-labels.
  ;;           Push the vertices that are constrained in vertex-fifo queue.
  ;;         * constrain the set of edge-labels
  ;;           at its edges, using the set of face-labels.
  ;;           Push the edges that are constrained in edge-fifo queue.

  ;;Step 0: (send *scene* :initialize-labels)

  ;;Initialize all the Fifo queues.
  (send vertex-fifo :pushes 2d-vertex-list)
  (send edge-fifo :pushes 2d-edge-list)
  (send cycle-fifo :pushes 2d-cycle-list)
  (send face-fifo :pushes 2d-face-list)
```

```
;;Constraint satisfaction and propagation.
(loop until (and (send vertex-fifo :emptyp)
                 (send edge-fifo :emptyp)
                 (send cycle-fifo :emptyp)
                 (send face-fifo :emptyp)) do

  ;;Step a: Vertices constrain edges and cycles, find edge-fifo and cycle-fifo
  (let ((restrict-edgesp ())
        (restrict-cyclesp ()))

    (loop until (send vertex-fifo :emptyp)
          for vertex = (send vertex-fifo :pop) do
      (unless (send (send vertex :labeling) :node-inconsistentp)

        (loop for edge in (send vertex :edge-list) do
          (and (send vertex :restrict-labels-of-edge-with-vertex-labels edge)
               (setq restrict-edgesp t)
               (send edge-fifo :push edge)))

        (loop for cycle in (send vertex :cycle-list) do
          (and (send vertex :restrict-labels-of-cycle-with-vertex-labels cycle)
               (setq restrict-cyclesp t)
               (send cycle-fifo :push cycle)))))

    (and *tracep*
         restrict-edgesp
         (send self :display-labeling :edges :labels)
         (format t "~% > Vertices restrict their linked edges."))
    (and *tracep*
         restrict-cyclesp
         (send self :display-labeling :cycles :labels)
         (format t "~% > Vertices restrict their linked cycles.")))
;;Step b: Edges constrain cycles and vertices, find cycle-fifo and vertex-fifo
(let ((restrict-cyclesp ())
      (restrict-verticesp ()))

  (loop until (send edge-fifo :emptyp)
        for edge = (send edge-fifo :pop) do
    (unless (send (send edge :labeling) :node-inconsistentp)

      (loop for cycle in (send edge :cycle-list) do
        (and (send edge :restrict-labels-of-cycle-with-edge-labels cycle)
             (setq restrict-cyclesp t)
             (send cycle-fifo :push cycle)))

      (let ((vertex1 (send edge :vertex1))
            (vertex2 (send edge :vertex2)))
        (and (send edge :restrict-labels-of-vertex-with-edge-labels vertex1)
             (setq restrict-verticesp t)
             (send vertex-fifo :push vertex1))
        (and (send edge :restrict-labels-of-vertex-with-edge-labels vertex2)
             (setq restrict-verticesp t)
             (send vertex-fifo :push vertex2)))))

  (and *tracep*
       restrict-cyclesp
       (send self :display-labeling :cycles :labels)
       (format t "~% > Edges restrict their linked cycles."))
  (and *tracep*
       restrict-verticesp
       (send self :display-labeling :vertices :labels)
       (format t "~% > Edges restrict their linked vertices.")))


;;Step c: Cycles constrain vertices, edges, and faces;
;;        Find vertex-fifo, edge-fifo, and face-fifo.
(let ((restrict-verticesp ())
      (restrict-edgesp ())
      (restrict-facesp ()) (restrict-faces ()))

  (loop until (send cycle-fifo :emptyp)
        for cycle = (send cycle-fifo :pop) do
    (unless (send (send cycle :labeling) :node-inconsistentp)

      (loop for vertex in (send cycle :vertex-list) do
        (and (send cycle :restrict-labels-of-vertex-with-cycle-labels vertex)
```

```
                (setq restrict-verticesp t)
                (send vertex-fifo :push vertex)))

        (loop for edge in (send cycle :edge-list) do
          (and (send cycle :restrict-labels-of-edge-with-cycle-labels edge)
               (setq restrict-edgesp t)
               (send edge-fifo :push edge)))

        (let ((face (send cycle :face)))
          (and (not (memq face restrict-faces))
               (push face restrict-faces)))))

    (loop for face in restrict-faces do
      (and (send face :restrict-labels-of-face-with-cycle-labels)
           (setq restrict-facesp t)
           (send face-fifo :push face)))

    (and *tracep*
         restrict-verticesp
         (send self :display-labeling :vertices :labels)
         (format t "~% > Cycles restrict their linked vertices."))
    (and *tracep*
         restrict-edgesp
         (send self :display-labeling :edges :labels)
         (format t "~% > Cycles restrict their linked edges."))
    (and *tracep*
         restrict-facesp
         (send self :display-labeling :faces  :labels)
         (format t "~% > Cycles restrict their linked faces.")))

  ;;Step d: faces constrain cycles
        (let ((restrict-cyclesp ()))
          (loop until (send face-fifo :emptyp)
                for face = (send face-fifo :pop) do
            (unless (send (send face :labeling) :node-inconsistentp)
              (loop for cycle in (send face :cycle-list) do
                (and (send face :restrict-labels-of-cycle-with-face-labels cycle)
                     (setq restrict-cyclesp t)
                     (send cycle-fifo :push cycle)))))
          (and *tracep*
               restrict-cyclesp
               (send self :display-labeling :cycles :labels)
               (format t "~% > Faces restrict their linked cycles.")))
```

APPENDIX J

```
;;; Constraint propagation over vertex-edge-face links in level 1:
;;; junctions, edge-labels, face-labels.

(defmethod (:CSP-VERTEX-EDGE-CYCLE-FACE-1 SCENE)
           (&aux (vertex-fifo (make-instance 'fifo))
                 (edge-fifo (make-instance 'fifo))
                 (face-fifo (make-instance 'fifo))
                 (cycle-fifo (make-instance 'fifo)))

  ;;Requires: (send self :find-junctions) has already been done.
  ;;          All junctions are locally consistent with everything else.
  ;;Effect: Constraint satisfaction and propagation along the vertex-edge-cycle links.
  ;;   Do until (and (emptyp vertex-fifo) (emptyp edge-fifo) (emptyp face-fifo))
  ;;      a. For each vertex in vertex-fifo queue:
  ;;         * constrain the set of edge-labels
  ;;           of the edges intersecting at vertex, using the set of junctions.
  ;;           Push the edges that are constrained in edge-fifo queue.
  ;;         * constrain the set of face-labels
  ;;           of the faces meeting at vertex, using the set of junctions.
  ;;           Push the faces that are constrained in face-fifo queue.
  ;;      b. For each edge in edge-fifo queue:
  ;;         * constrain the set of face-labels
  ;;           of the faces on both sides of edge, using the set of edge-labels.
  ;;           Push the faces that are constrained in face-fifo queue.
  ;;         * constrain the set of junctions
  ;;           at its two end points, using the set of edge-labels.
  ;;           Push the vertices that are constrained in vertex-fifo queue.
  ;;      c. For each face in face-fifo queue:
  ;;         * constrain the set of junctions
  ;;           at its vertices, using the set of face-labels.
```

```
;;          Push the vertices that are constrained in vertex-fifo queue.
;;        * constrain the set of edge-labels
;;          at its edges, using the set of face-labels.
;;          Push the edges that are constrained in edge-fifo queue.
;;     d. Note that vertex-edge-face links are changed if there exists a push.


;;Constraint satisfaction and propagation.
(loop for firstp first t then ()
      until (and (not firstp)
                 (send vertex-fifo :emptyp)
                 (send edge-fifo :emptyp)
                 (send face-fifo :emptyp)
                 (send cycle-fifo :emptyp)) do

  ;;Step a: Vertices constrain edges and cycles, find edge-fifo and cycle-fifo
  ;;Update the labels of the vertices first.
  (let ((restrict-vlabelsp ()))              ;for vertices that have restricted set of
    (loop for vertex in (send vertex-fifo :elements) do      ;junctions
      (and (send vertex :deduce-labels-of-vertex-from-junctions)
           (setq restrict-vlabelsp t)))
    (and *tracep*
         restrict-vlabelsp
         (send self :display-labeling :vertices :labels)
         (format t "~% > Restrict labels of vertices from their junctions.")))
  (and firstp
       (send vertex-fifo :pushes 2d-vertex-list))

  (let ((restrict-edgesp ())
        (restrict-cyclesp ()))

    (loop until (send vertex-fifo :emptyp)
          for vertex = (send vertex-fifo :pop) do
      (unless (send (send vertex :labeling) :node-inconsistentp)

        (loop for edge in (send vertex :edge-list) do
          (and (send vertex :restrict-labels-of-edge-with-junctions edge)
               (setq restrict-edgesp t)
               (send edge-fifo :push edge)))

        (loop for cycle in (send vertex :cycle-list) do
          (and (send vertex :restrict-labels-of-cycle-with-junctions cycle)
               (setq restrict-cyclesp t)
               (send cycle-fifo :push cycle)))))
   (and *tracep*
        restrict-edgesp
        (send self :display-labeling :edges :labels)
        (format t "~% > Vertices restrict their linked edges."))
   (and *tracep*
        restrict-cyclesp
        (send self :display-labeling :cycles :labels)
        (format t "~% > Vertices restrict their linked cycles.")))

;;Step b: Edges constrain cycles and vertices, find cycle-fifo and vertex-fifo
(and firstp
     (send edge-fifo :pushes 2d-edge-list))

(let ((restrict-cyclesp ())
      (restrict-verticesp ()))

  (loop until (send edge-fifo :emptyp)
        for edge = (send edge-fifo :pop) do
    (unless (send (send edge :labeling) :node-inconsistentp)

      (loop for cycle in (send edge :cycle-list) do
        (and (send edge :restrict-labels-of-cycle-with-edge-labels cycle)
             (setq restrict-cyclesp t)
             (send cycle-fifo :push cycle)))

      (let ((vertex1 (send edge :vertex1))
            (vertex2 (send edge :vertex2)))
        (and (send edge :restrict-junctions-of-vertex-with-edge-labels vertex1)
             (setq restrict-verticesp t)
             (send vertex-fifo :push vertex1))
        (and (send edge :restrict-junctions-of-vertex-with-edge-labels vertex2)
             (setq restrict-verticesp t)
```

```
            (send vertex-fifo :push vertex2)))))

  (and *tracep*
       restrict-cyclesp
       (send self :display-labeling :cycles :labels)
       (format t "~% > Edges restrict their linked cycles."))
  (and *tracep*
       restrict-verticesp
       (send self :display-labeling :vertices :no-of-junctions)
       (format t "~% > Edges restrict their linked vertices.")))


;;Step c: Cycles constrain vertices, edges, and faces.
;;        find vertex-fifo, edge-fifo, and face-fifo.
(and firstp
     (send cycle-fifo :pushes 2d-cycle-list))

(let ((restrict-verticesp ())
      (restrict-edgesp ())
      (restrict-facesp ()) (restrict-faces ()))

  (loop until (send cycle-fifo :emptyp)
        for cycle = (send cycle-fifo :pop) do
    (unless (send (send cycle :labeling) :node-inconsistentp)

      (loop for vertex in (send cycle :vertex-list) do
        (and (send cycle :restrict-junctions-of-vertex-with-cycle-labels vertex)
             (setq restrict-verticesp t)
             (send vertex-fifo :push vertex)))

      (loop for edge in (send cycle :edge-list) do
        (and (send cycle :restrict-labels-of-edge-with-cycle-labels edge)
             (setq restrict-edgesp t)
             (send edge-fifo :push edge)))

      (let ((face (send cycle :face)))
        (and (not (memq face restrict-faces))
             (push face restrict-faces)))))

  (loop for face in restrict-faces do
    (and (send face :restrict-labels-of-face-with-cycle-labels)
         (setq restrict-facesp t)
         (send face-fifo :push face)))
  (and *tracep*
       restrict-facesp
       (send self :display-labeling :faces :labels)
       (format t "~% > Cycles restrict their linked faces."))
  (and *tracep*
       restrict-verticesp
       (send self :display-labeling :vertices :no-of-junctions)
       (format t "~% > Cycles restrict their linked vertices."))
  (and *tracep*
       restrict-edgesp
       (send self :display-labeling :edges :labels)
       (format t "~% > Cycles restrict their linked edges.")))

;;Step d: faces constrain cycles
(and firstp
     (send face-fifo :pushes 2d-face-list))

(let ((restrict-cyclesp ()))
  (loop until (send face-fifo :emptyp)
        for face = (send face-fifo :pop) do
    (unless (send (send face :labeling) :node-inconsistentp)
      (loop for cycle in (send face :cycle-list) do
        (and (send face :restrict-labels-of-cycle-with-face-labels cycle)
             (setq restrict-cyclesp t)
             (send cycle-fifo :push cycle)))))
  (and *tracep*
       restrict-cyclesp
       (send self :display-labeling :cycles :labels)
       (format t "~% > Faces restrict their linked cycles.")))
```

APPENDIX K

```
;;; Constraint propagation over vertex-edge-face links in level 2:
;;; junctions, edge-labels, junction-loops.

(defmethod (:CSP-VERTEX-EDGE-CYCLE-FACE-2 SCENE)
           (&aux (vertex-fifo (make-instance 'fifo))
                 (edge-fifo (make-instance 'fifo))
                 (cycle-fifo (make-instance 'fifo))
                 (face-fifo (make-instance 'fifo)))

  ;;Requires: (send self :find-junction-loops) has already been done.
  ;;          All junction-loops are consistent with everything else.
  ;;Effect: Constraint satisfaction and propagation along the vertex-edge-face links.
  ;;   Do until (and (emptyp vertex-fifo) (emptyp edge-fifo) (emptyp face-fifo))
  ;;      a. For each face in face-fifo queue:
  ;;          * constrain the set of junctions
  ;;            at its vertices, using the set of junction-loops.
  ;;            Push the vertices that are constrained in vertex-fifo queue.
  ;;          * constrain the set of edge-labels
  ;;            at its edges, using the set of junction-loops.
  ;;            Push the edges that are constrained in edge-fifo queue.
  ;;      b. For each vertex in vertex-fifo queue:
  ;;          * constrain the set of edge-labels
  ;;            of the edges intersecting at vertex, using the set of junctions.
  ;;            Push the edges that are constrained in edge-fifo queue.
  ;;          * constrain the set of junction-loops
  ;;            of the faces meeting at vertex, using the set of junctions.
  ;;            Push the faces that are constrained in face-fifo queue.
  ;;      c. For each edge in edge-fifo queue:
  ;;          * constrain the set of junctions
  ;;            at its two end points, using the set of edge-labels.
  ;;            Push the vertices that are constrained in vertex-fifo queue.
  ;;          * constrain the set of junction-loops
  ;;            of the faces on both sides of edge, using the set of edge-labels.
  ;;            Push the faces that are constrained in face-fifo queue.

  ;;Constraint satisfaction and propagation.
  (loop for firstp first t then ()
        until (and (not firstp)
                   (send vertex-fifo :emptyp)
                   (send edge-fifo :emptyp)
                   (send cycle-fifo :emptyp) (null *late-cycles*)
                   (send face-fifo :emptyp)) do

    ;;Step a: Cycles constrain vertices, edges, faces;
    ;;        find vertex-fifo, edge-fifo, and face-fifo
    ;;Update labels of cycles having restricted loops first.
    (let ((restrict-clabelsp ()))
      (loop for cycle in (send cycle-fifo :elements) do
        (and (send cycle :deduce-labels-of-cycle-from-junction-loops)
             (setq restrict-clabelsp t)))
      (and *tracep*
           restrict-clabelsp
           (send self :display-labeling :cycles :labels)
           (format t "~% > Restrict labels of cycles from their junction-loops.")))
    (when *late-cycles*
      (send cycle-fifo :pushes *late-cycles*)
      (setq *late-cycles* ()))

    (let ((restrict-verticesp ())
          (restrict-edgesp ())
          (restrict-faces ()) (restrict-facesp ()))

      (loop until (send cycle-fifo :emptyp)
            for cycle = (send cycle-fifo :pop) do
        (unless (send (send cycle :labeling) :node-inconsistentp)

          (loop for vertex in (send cycle :vertex-list) do
            (and (send cycle :restrict-junctions-of-vertex-with-junction-loops vertex)
                 (setq restrict-verticesp t)
                 (or (send vertex-fifo :push vertex)     ;if already in vertex-fifo, then
                     (send vertex :deduce-labels-of-vertex-from-junctions))))   ;update labels

          (loop for edge in (send cycle :edge-list) do
            (and (send cycle :restrict-labels-of-edge-with-junction-loops edge)
```

```
          (setq restrict-edgesp t)
          (send edge-fifo :push edge)))

     (let ((face (send cycle :face)))
       (and (not (memq face restrict-faces))
            (push face restrict-faces)))))

  (loop for face in restrict-faces do
    (and (send face :restrict-labels-of-face-with-cycle-junction-loops)      ;cycle-labels
         (setq restrict-facesp t)           ;instead of junction-loops
         (send face-fifo :push face)))

  (and *tracep*
       restrict-facesp
       (send self :display-labeling :faces :labels)
       (format t "~% > Cycles restrict their linked faces."))
  (and *tracep*
       restrict-verticesp
       (send self :display-labeling :vertices :no-of-junctions)
       (format t "~% > Cycles restrict their linked vertices."))
  (and *tracep*
       restrict-edgesp
       (send self :display-labeling :edges :labels)
       (format t "~% > Cycles restrict their linked edges.")))

;;Step b: faces constrain cycles
(and firstp
     (send face-fifo :pushes 2d-face-list))

(let ((restrict-cyclesp ()))
  (loop until (send face-fifo :emptyp)
        for face = (send face-fifo :pop) do
    (unless (send (send face :labeling) :node-inconsistentp)
      (loop for cycle in (send face :cycle-list) do
        (and (send face :restrict-junction-loops-of-cycle-with-face-labels cycle)
             (setq restrict-cyclesp t)
             (send cycle-fifo :push cycle)))))
  (and *tracep*
       restrict-cyclesp
       (send self :display-labeling :cycles :no-of-junction-loops)
       (format t "~% > Faces restrict their linked cycles.")))


;;Step c: Vertices constrain edges and cycles, find edge-fifo and cycle-fifo
(let ((restrict-vlabelsp ()))
  (loop for vertex in (send vertex-fifo :elements) do
    (and (send vertex :deduce-labels-of-vertex-from-junctions)
         (setq restrict-vlabelsp t)))
  (and *tracep*
       restrict-vlabelsp
       (send self :display-labeling :vertices :labels)
       (format t "~% > Restrict labels of vertices from their junctions.")))
(and firstp
     (send vertex-fifo :pushes 2d-vertex-list))

(let ((restrict-edgesp ())
      (restrict-cyclesp ()))
  (loop until (send vertex-fifo :emptyp)
        for vertex = (send vertex-fifo :pop) do
    (unless (send (send vertex :labeling) :node-inconsistentp)

      (loop for edge in (send vertex :edge-list) do
        (and (send vertex :restrict-labels-of-edge-with-junctions edge)
             (setq restrict-edgesp t)
             (send edge-fifo :push edge)))

      (loop for cycle in (send vertex :cycle-list) do
        (and (send vertex :restrict-junction-loops-of-cycle-with-junctions cycle)
             (setq restrict-cyclesp t)
             (send cycle-fifo :push cycle)))))

  (and *tracep*
       restrict-edgesp
       (send self :display-labeling :edges :labels)
       (format t "~% > Vertices restrict their linked edges."))
  (and *tracep*
```

```
        restrict-cyclesp
        (send self :display-labeling :cycles :no-of-junction-loops)
        (format t "~% > Vertices restrict their linked cycles.")))

  ;;Step d: Edges constrain cycles and vertices, find cycle-fifo and vertex-fifo
  (and firstp
       (send edge-fifo :pushes 2d-edge-list))

  (let ((restrict-cyclesp ())
        (restrict-verticesp ()))

    (loop until (send edge-fifo :emptyp)
          for edge = (send edge-fifo :pop) do
      (unless (send (send edge :labeling) :node-inconsistentp)

        (loop for cycle in (send edge :cycle-list) do
          (and (send edge :restrict-junction-loops-of-cycle-with-edge-labels cycle)
               (setq restrict-cyclesp t)
               (send cycle-fifo :push cycle)))

        (let ((vertex1 (send edge :vertex1))
              (vertex2 (send edge :vertex2)))
          (and (send edge :restrict-junctions-of-vertex-with-edge-labels vertex1)
               (setq restrict-verticesp t)
               (send vertex-fifo :push vertex1))
          (and (send edge :restrict-junctions-of-vertex-with-edge-labels vertex2)
               (setq restrict-verticesp t)
               (send vertex-fifo :push vertex2)))))

    (and *tracep*
         restrict-cyclesp
         (send self :display-labeling :cycles :no-of-junction-loops)
         (format t "~% > Edges restrict their linked cycles."))
    (and *tracep*
         restrict-verticesp
         (send self :display-labeling :vertices :no-of-junctions)
         (format t "~% > Edges restrict their linked vertices.")))
  ))


;;; Constraint propagation over face-edge links in level 1 and 2.


(defmethod (:RESTRICT-LABELS-OF-EDGE-WITH-JUNCTION-LOOPS CYCLE) (edge)
  ;;Require: Cycle consistent junction-loops
  ;;         Edge and its two end points are part of cycle.
  ;;Effect: Edge can only have labels that are at least in one junction-loop.
  (let ((edge-labeling (send edge :labeling))
        (junction-loops (send labeling :links)))        ;use current loops
    (and (not (send edge-labeling :node-inconsistentp))
         junction-loops

         (let ((vertex (or (send edge :vertex1)
                           (send edge :vertex2)))
               (edge-labels (send edge-labeling :labels))
               (deleted-labels ())
               (ce-labels ()))                    ;edge-labels from junction-loops

           ;;collect the edge-labels from the junction-loops, and find the highest labels
           (let ((vertex-no (find-position-in-list vertex vertex-list))
                 (edge-no-in-vertex
                   (find-position-in-list edge (send vertex :edge-list))))
             (loop for junction-loop in junction-loops
                   for ce-label = (nth edge-no-in-vertex
                                       (nth vertex-no junction-loop)) do
               (and (not (memq ce-label ce-labels))
                    (push ce-label ce-labels)))
             (setq ce-labels (find-highest-classes ce-labels ':edge-labels)))

           ;;we mutate the set of labels of edge,
           ;;this work with label hierarchy.
           (let ((edge-labels-ptr (cons 'ptr edge-labels)))
             (setq edge-labels edge-labels-ptr) ;pointer to the list
             (do ((edge-label (cadr edge-labels-ptr)
                              (cadr edge-labels-ptr)))
```

```
              ((null edge-label))
             (cond
               ;;edge-label is not part of any junction-loop
               ((loop for ce-label in ce-labels
                      never (eq-or-is-a edge-label ce-label ':edge-labels))
                (cond
                  ;;edge-label must be refined to match an arc of some junction-loop
                  ((loop for ce-label in ce-labels
                         thereis (eq-or-is-a ce-label edge-label ':edge-labels))
                   (rplacd (last edge-labels-ptr)      ;replace it by its equivalent labels
                           (expand-class edge-label ':edge-labels)))
                  ;;no need for refinement, must throw away.
                  (t
                   (push edge-label deleted-labels)))
                (rplacd edge-labels-ptr (cddr edge-labels-ptr)))       ;increment ptr

               ;;edge-label is part of an junction-loop
               (t
                (setq edge-labels-ptr (cdr edge-labels-ptr))))))       ;increment ptr
         (setq edge-labels (cdr edge-labels)) ;get back the edge-labels

         ;;Record the new set of edge-labels, always the last non null set that is locally
         ;;consistent with its first-constraining supports.
         (send edge :set-labels (or edge-labels deleted-labels))

         ;;Find set of supports
         (when deleted-labels
           (cond ((null edge-labels)
                  ;;detect a contradiction in the set of supports.
                  (send edge :set-labeling-inconsistency '1-inconsistent)
                  (mark-conflicting-supports (send edge-labeling :supports)   ;conflict
                                             (send labeling :supports)))      ;in 2 sets
                 (t
                  (send edge-labeling :set-supports
                        (tagged-nunion (send edge-labeling :supports) ;concatenate 2 sets
                                       (send labeling :supports)))))) ;of supports
         ;;signal=T if edge is revised, and still has a consistent set of labels
         (and edge-labels
              deleted-labels)))))


(defmethod (:RESTRICT-JUNCTION-LOOPS-OF-CYCLE-WITH-EDGE-LABELS EDGE) (cycle)
  ;;Require: Edge has consistent edge-labels
  ;;         Edge and its two end points are part of cycle.
  ;;Effect: Cycle can only have junction-loops that contains at least an edge-label
  ;;        of edge.
  (let* ((cycle-labeling (send cycle :labeling))
         (junction-loops (send cycle :junction-loops))) ;compute loops if not already done
    (and (not (send cycle-labeling :node-inconsistentp))
         junction-loops

         (let ((vertices-in-cycle (send cycle :vertex-list))
               (deleted-loops ()))

           ;;we mutate the set of junction-loops of cycle,
           ;;this work with label hierarchy.
           (let ((junction-loops-ptr (cons 'ptr junction-loops)))
             (setq junction-loops junction-loops-ptr)   ;another pointer to junction-loops
             (let ((vertex1-no (find-position-in-list vertex1 vertices-in-cycle))
                   (vertex2-no (find-position-in-list vertex2 vertices-in-cycle))
                   (edge-no-in-vertex1
                     (find-position-in-list self (send vertex1 :edge-list)))
                   (edge-no-in-vertex2
                     (find-position-in-list self (send vertex2 :edge-list))))
               (do ((junction-loop (cadr junction-loops-ptr)
                                   (cadr junction-loops-ptr))
                    (edge-labels (send self :labels)))
                   ((null junction-loop))
                 (let* ((junction1-in-loop (nth vertex1-no junction-loop))
                        (junction2-in-loop (nth vertex2-no junction-loop))
                        (arc-in-loop (or (nth edge-no-in-vertex1 junction1-in-loop)
                                         (nth edge-no-in-vertex2 junction2-in-loop))))
                   (cond
                     ;;junction-loop is not consistent with any edge-label of edge
                     ((loop for edge-label in edge-labels
                            never (eq-or-is-a arc-in-loop edge-label ':edge-labels))
```

```
             ;;expand junction-loop, at edge if it has superior labels.
             (let ((arc1-nos ()) (arc2-nos ())
                   (expand-loops ()))
               (loop for edge-label in edge-labels do
                 (when (and (eq-or-is-a  edge-label arc-in-loop ':edge-labels)
                            (not (eq edge-label arc-in-loop)))
                   (and (not (memq edge-no-in-vertex1 arc1-nos))
                        (push edge-no-in-vertex1 arc1-nos))
                   (and (not (memq edge-no-in-vertex2 arc2-nos))
                        (push edge-no-in-vertex2 arc2-nos))))
               (and (or arc1-nos arc2-nos)
                    (let ((expand-junction1s
                            (expand-tuple-at-nths junction1-in-loop
                                                  arc1-nos ':edge-labels))
                          (expand-junction2s
                            (expand-tuple-at-nths junction2-in-loop
                                                  arc2-nos ':edge-labels)))
                      (setq expand-loops
                            (expand-loop-at-vertex-pair-with-junctions
                              vertices-in-cycle junction-loop
                              vertex1 expand-junction1s
                              vertex2 expand-junction2s))))
               (cond (expand-loops
                      (rplacd (last junction-loops-ptr) expand-loops))
                     (t                ;cannot be expanded, so must throw away.
                      (push junction-loop deleted-loops))))
             ;;increment ptr
             (rplacd junction-loops-ptr (cddr junction-loops-ptr)))
            (t
             (setq junction-loops-ptr (cdr junction-loops-ptr))))))
      (setq junction-loops (cdr junction-loops)))

    ;;Record the new set of junction-loops,
    ;;always the last non null set that is locally
    ;;consistent with its first-constraining supports.
    (send cycle :set-junction-loops (or junction-loops deleted-loops))

    ;;Find set of supports
    (when deleted-loops
      (cond ((null junction-loops)
             ;;detect a contradiction in the set of supports.
             (send cycle :set-labeling-inconsistency '1-inconsistent)
             (mark-conflicting-supports (send cycle-labeling :supports)  ;conflict
                                        (send labeling :supports)))      ;in 2 sets
            (t
             (send cycle-labeling :set-supports
                   (tagged-nunion (send cycle-labeling :supports)        ;concatenate
                                  (send labeling :supports)))))) ;2 sets of supports

    ;;signal=T if cycle is revised, and still has a consistent set of junction-loops
    (and junction-loops
         deleted-loops)))))


(defmethod (:RESTRICT-LABELS-OF-FACE-WITH-CYCLE-JUNCTION-LOOPS FACE) ()
  ;;Require: the set of labels of cycle is consistent with the junction-loops.
  ;;Effect: Update the set of labels of the cycles, and
  ;;        then restrict the labels of the common face
  (send self :restrict-labels-of-face-with-cycle-labels))

(defmethod (:RESTRICT-JUNCTION-LOOPS-OF-CYCLE-WITH-FACE-LABELS FACE) (cycle)
  ;;Effect: Find the labels for each junction-loop and check that the junction-loop
  ;;        has labels consistent with a face-label.
  ;;        This one has an effect only if the user restricts a face-label in the
  ;;        middle of the CSP.
  ;;        Otherwise, with the sequence of CSP0-2, we already have all the junction-loops
  ;;        consistent with a face-labels.
  (and (send self :restrict-labels-of-cycle-with-face-labels cycle)
       (send cycle :restrict-labelings-with-labels)))
```

APPENDIX L

```
(defmethod (:DEDUCE-VERTEX-LABELS SCENE) (&aux (restrictedp ()))
  ;;Effect: Determine vertex-labels from the junctions.
  (loop for vertex in 2d-vertex-list do
    (unless (send (send vertex :labeling) :node-inconsistentp)
      (and (send vertex :deduce-labels-of-vertex-from-junctions)
           (setq restrictedp t))))
  (and *tracep*
       restrictedp
       (send self :display-labeling ':vertices ':labels)))


(defmethod (:DEDUCE-LABELS-OF-VERTEX-FROM-JUNCTIONS VERTEX) ()
  ;;Require: Vertex has consistent junctions.
  ;;Effect: Vertex can only have labels that are at least consistent with 1 junction.
  (let ((vertex-labels (send self :labels))
        (deleted-labels ())
        (junction-vlabels ()))                    ;vertex-label for each junction

    ;;collect the vertex labels from the junctions, and find highest labels
    (loop for junction in (send self :junctions)
          for junction-vlabel = (send self :vertex-label-from-junction junction) do
      (and (not (memq junction-vlabel junction-vlabels))
           (push junction-vlabel junction-vlabels)))
    (setq junction-vlabels (find-highest-classes junction-vlabels ':vertex-labels))

    (multiple-value (vertex-labels deleted-labels)
      (restrict-labels1-with-labels2 vertex-labels junction-vlabels ':vertex-labels))

    ;;record the new set of labels,
    (send self :set-labels vertex-labels)

    (and deleted-labels
         vertex-labels)))


(defmethod (:VERTEX-LABEL-FROM-JUNCTION VERTEX) (junction)
  ;;Effect: Find the vertex-label, which is one of (I, V, T, Y, A)
  (let ((ray-junction (loop for arc in junction
                            for edge in edge-list
                            collect (if (is-occluding-arcp arc)
                                        (send edge :ray-from-occluding-arc self arc)
                                        arc))))
    (cond
      ((= (length ray-junction) 2)
       (cond ((eq (first ray-junction) (second ray-junction))
              'I)
             ((member ray-junction (get '*ray-junction-dic* 'V))
              'V)
             (t
              '?)))
      ((= (length ray-junction) 3)
       (cond ((and (eq (first ray-junction) '↓) (eq (second ray-junction) '↑))
              'T)
             ((member ray-junction (get '*ray-junction-dic* 'A))
              'A)
             ((member ray-junction (get '*ray-junction-dic* 'Y))
              'Y)
             (t
              '?)))
      (t
       '?))))                                  ;can be either M or ?
  ;;; Determine the face-labels from the junction-loops

  (defmethod (:DEDUCE-CYCLE-LABELS SCENE) (&aux (restrictedp ()))
    ;;Effect: Determine cycle-labels from the junction-loops.
    (loop for cycle in 2d-cycle-list do
      (unless (send (send cycle :labeling) :node-inconsistentp)
        (and (send cycle :deduce-labels-of-cycle-from-junction-loops)
             (setq restrictedp t))))
    (and *tracep*
         restrictedp
         (send self :display-labeling ':cycles ':labels)))
```

```
(defmethod (:DEDUCE-LABELS-OF-CYCLE-FROM-JUNCTION-LOOPS CYCLE) ()
  ;;Require: Cycle has consistent junction-loops.
  ;;Effect: Cycle can only have labels that are at least consistent with one junction-loop
  (let ((cycle-labels (send self :labels))
        (deleted-labels ())
        (loop-labels ()))
    (loop for junction-loop in (send self :junction-loops)
          for loop-label = (send self :cycle-label-from-junction-loop junction-loop) do
      (and (not (memq loop-label loop-labels))
           (push loop-label loop-labels)))
    (setq loop-labels (find-highest-classes loop-labels ':face-labels))

    (multiple-value (cycle-labels deleted-labels)
      (restrict-labels1-with-labels2 cycle-labels loop-labels ':face-labels))

    ;;record the new set of labels,
    (send self :set-labels cycle-labels)

    (and deleted-labels
         cycle-labels)))


(defmethod (:CYCLE-LABEL-FROM-JUNCTION-LOOP CYCLE) (junction-loop)
  ;;Effect: Find the most restricted labels for vertex-list, given the
  ;;        most restricted labels of its edges and the default jlabels.

  (let ((label ()))
    (loop for vertex in vertex-list
          for junction in junction-loop do
      (store-junction-in-diagram junction vertex))
    (setq label (send self :label-from-labeled-diagram))
    (loop for vertex in vertex-list do
      (undo-junction-in-diagram vertex))
    label))


(defmethod (:RESTRICT-LABELINGS-WITH-LABELS CYCLE) ()
  ;;Require: Labels are most refined, so that we don't have to expand junction-loops.
  ;;Effect: Check that all junction-loops are consistent with cycle-labels.
  (and (not (send labeling :node-inconsistentp))
       (let* ((cycle-labels (send labeling :labels))
              (junction-loops (send labeling :links))
              (no-of-loops0 (length junction-loops)))
         (loop for junction-loop in junction-loops
               for loop-label = (send self :cycle-label-from-junction-loop junction-loop) do
           (and (loop for cycle-label in cycle-labels
                      never (eq-or-is-a loop-label cycle-label ':face-labels))
                (setq junction-loops (delq junction-loop junction-loops))))
         (and (< (length junction-loops) no-of-loops0)
              (send labeling :set-links junction-loops)))))
;;; Determine the edge-labels from the junction-pairs.

 (defmethod (:DEDUCE-EDGE-LABELS SCENE) (&aux (restrictedp ()))
   ;;Effect: Determine edge-labels from the junction-pairs, or junctions.
   (loop for edge in 2d-edge-list do
     (unless (send (send edge :labeling) :node-inconsistentp)
       (and (send edge :deduce-labels-of-edge-from-junction-pairs)
            (setq restrictedp t))))
   (and *tracep*
        restrictedp
        (send self :display-labeling ':edges ':labels)))

 (defmethod (:DEDUCE-LABELS-OF-EDGE-FROM-JUNCTION-PAIRS EDGE) ()
   ;;Require: Edge has consistent junction-pairs.
   ;;Effect: Edge can only have labels that are at least in one junction-pair,
   ;;        or equivalently in one junction.
   (let ((edge-labels (send self :labels))
         (deleted-labels ())
         (pair-labels ()))

     ;;collect the edge-labels from the junction-pairs
     (let* ((end-point (if (send vertex1 :junctions) vertex1 vertex2))
            (vertex-no (if (eq end-point vertex1) 0 1))
            (edges-at-end-point (send end-point :edge-list))
            (edge-no (find-position-in-list self edges-at-end-point)))
       (loop for junction-pair in (send self :junction-pairs)
```

```
        for elabel = (nth edge-no (nth vertex-no junction-pair)) do
      (and (not (memq elabel pair-labels))
           (push elabel pair-labels)))
    (setq pair-labels (find-highest-classes pair-labels ':edge-labels)))

  (multiple-value (edge-labels deleted-labels)
    (restrict-labels1-with-labels2 edge-labels pair-labels ':edge-labels))

  ;;record the new set of labels,
  (send self :set-labels edge-labels)

  (and deleted-labels
       edge-labels)))

(defmethod (:EDGE-LABEL-FROM-JUNCTION-PAIR EDGE) (junction-pair)
  (let* ((end-point (if (send vertex1 :junctions) vertex1 vertex2))
         (vertex-no (if (eq end-point vertex1) 0 1))
         (edges-at-end-point (send end-point :edge-list))
         (edge-no (find-position-in-list self edges-at-end-point)))
    (nth edge-no (nth vertex-no junction-pair))))
```

APPENDIX M

```
;;; global variables

(defvar *TRACEP* T)                              ;some global flags.
(defvar *DEBUGP* ())

(defvar *FUDGE-ANGLE* (deg-to-rad 10.0))        ;fudge is 10 degree.

;;; macros.

(defun EQ-OR-IS-A (thing1 thing2 sub-prop)
  (if (eq thing1 thing2) thing1
      (loop for sub-thing2 in (get thing2 sub-prop)
        thereis (eq-or-is-a thing1 sub-thing2 sub-prop))))


(defun IS-A-CLASSP (thing sub-prop)
  (get thing sub-prop))


(defun EXPAND-CLASS (thing sub-prop)
  (copylist (get thing sub-prop)))


(defun FIND-HIGHEST-CLASSES (labels prop)
  ;;Require: No duplication in labels.
  (let ((higher-labels (copylist labels)))
    (loop for label in labels do
      (loop for hlabel in higher-labels
            thereis (and (neq hlabel label)
                         (eq-or-is-a label hlabel prop)
                         (setq higher-labels (delq label higher-labels)))))
    higher-labels))

;;; Define n-tuple, and operations on n-tuples.

(defun EQUAL-OR-IS-SUBTUPLE (tuple1 tuple2 sub-prop)
  ;;Effect: T if the two tuples contain the same element, or if
  ;;        elements in tuple1 is a sub-element of coresponding elements of tuple2.
  (and (or (equal tuple1 tuple2)
           (loop for elmt1 in tuple1
                 for elmt2 in tuple2
                 always (eq-or-is-a elmt1 elmt2 sub-prop)))
       tuple1))

(defun TUPLE-EQUALP (tuple1 tuple2)
  (loop for elmt1 in tuple1
        for elmt2 in tuple2
        always (eq elmt1 elmt2)))
```

```
(defun EXPAND-TUPLE-AT-NTH (tuple elmt-no sub-prop)
  ;;Return: nil or list of expansions, with sub-elements replaced in elmt-no of tuple.
  (loop for sub-elmt in (get (nth elmt-no tuple) sub-prop)
        collect
          (loop for i from 0 below (length tuple)
                collect (if (= i elmt-no) sub-elmt
                            (nth i tuple)))))

(defun EXPAND-TUPLE-AT-NTHS (tuple elmt-nos sub-prop)
  ;;Return: nil or list of expansions, with sub-elements replaced at elmt-no of tuple.
  (let ((expand-tuples (ncons tuple)))
    (loop for elmt-no in elmt-nos do
      (setq expand-tuples
            (loop for expand-tuple in expand-tuples
                  nconc (or (expand-tuple-at-nth expand-tuple elmt-no sub-prop)
                            (ncons expand-tuple)))))
    (and (cdr expand-tuples)
         expand-tuples)))
;;; try to combine the set of supports.

(defun NCOMBINE-SETS (from-sets into-set &aux (new-elements ()))
  (loop for set in from-sets do
    (loop for elmt in set do
      (unless (or (memq elmt into-set)
                  (memq elmt new-elements))
        (push elmt new-elements))))
  (setq new-elements (nreverse new-elements))
  (nconc new-elements into-set))
(comment
(defun EXPAND-TUPLE-AT-NTH-WITH-SUBELEMENTS (tuple elmt-no sub-elements)
  ;;Return: nil or list of expansions, with sub-elements replaced in elmt-no of tuple.
  (loop for sub-elmt in sub-elements
        collect
          (loop for i from 0 below (length tuple)
                collect (if (= i elmt-no) sub-elmt
                            (nth i tuple)))))


(defun EXPAND-TUPLE-AT-NTHS-WITH-SUBELEMENTS (tuple elmt-nos sub-elements-list)
  ;;Return: nil or list of expansions, with sub-elements replaced at elmt-no of tuple.
  (let ((expand-tuples (ncons tuple)))
    (loop for elmt-no in elmt-nos
          for sub-elements in sub-elements-list do
      (setq expand-tuples
            (loop for expand-tuple in expand-tuples
                  nconc (or (expand-tuple-at-nth-with-subelements expand-tuple
                                                                  elmt-no sub-elements)
                            (ncons expand-tuple)))))
    (and (cdr expand-tuples)
         expand-tuples)))
)
```

What is claimed is:

1. A method for intepreting a two dimensional image of a three-dimensional scene on a computer, said two-dimensional image comprising a plurality of vertices, edges and faces, each said vertex being defined by the intersection of at least two said edges in said two-dimensional image, each said face being bound by a closed chain of said edges, each said vertex being associatively linked with its defining intersecting edges and with the faces bounded by the last recited defining edges, each said face being associatively linked with each said edge of the closed edge chain bounding the face, said method comprising the steps of:

(a) assigning a vertex label, an edge label and a face label respectively to each said vertex, edge and face of said image, each said vertex, edge and face label respectively being selected from predetermined hierarchies of said vertex, edge and face labels;

(b) assuming for each said vertex label a predetermined set of junctions that is consistent with said vertex label, each junction being a possible edge configuration;

(c) assigning for each said face all possible junction loops that are consistent with the face labels assigned to said face, each said junction loop being an n-tuple of said junctions and consisting of one said junction from each of n said vertices respectively at each of n said intersections of the edges bounding said face, each pair of vertices of said image being joined by a common image edge and respectively represented in each said junction loop n-tuple by junctions respectively having the same edge label for said common edge;

(d) assigning for each said edge all possible junction pairs that are consistent with the edge labels assigned to said edge, each said junction pair being a two-tuple of said junctions and consisting of one of said junctions assigned to each said vertex at each end of said edge, within said junction pair the junctions respectively assigned to the vertices at the ends of said edge having the same edge label for that edge; and (e) performing constraint satisfaction and propagation (CSP) between the linked vertices and edges of said image, between the linked vertices and faces of said image and between the linked edges and faces of said image, the CSP being performed using said junctions, said junction pairs and said junction loops assigned to said vertices, edges and faces of said image, respectively; so that the junctions, junction pairs and junction loops and their respectively corresponding vertex, edge and face labels remaining upon completion of step (e) are descriptive of said three-dimensional scene.

2. The method of claim 1 wherein each said vertex label assigned in step (a) is selected on the basis of the number and configuration of the intersecting edges defining the vertex to which the vertex label is being assigned.

3. The method of claim 2 wherein the face label for a selected one of said faces of said image can be assigned on the basis of a priori information, said method comprising the additional step, following step (a), of:

constraining the edge labels assigned to the respective bounding edges of said selected face to be consistent with the face label assigned to said selected face.

4. The method of claim 3 comprising the additional step, following step (b), of:

performing CSP between linked vertices and edges of said image, the CSP being performed using said junctions and said edge labels assigned to said vertices and edges of said image, respectively.

5. The method of claim 4 comprising the additional step, following step (c), of:

performing CSB between linked vertices and edges of said image and between linked vertices and faces of said image, the CSP being performed using said junctions, said edge labels and said junction loop respectively assigned to said vertices, edges and faces of said image.

6. The method of claim 2 comprising the additional step, following step (a), of:

performing CSP between linked vertices, edges and faces using said vertex, edge and face labels respectively assigned to said image vertices, edges and faces.

7. The method of claim 6 comprising the additional step, following step (b), of:

performing CSP between linked vertices, edges and faces of said image, the CSP being performed using said junctions, said edge labels and said face labels assigned to said vertices, edges and faces of said image, respectively.

8. The method of claim 7 comprising the additional step, following step (c), of:

performing CSP between linked vertices, edges and faces of said image, the CSP being performed using said junctions, said edge labels and said junction loops respectively assigned to said vertices, edges and faces of said image.

9. Apparatus for interpreting a two-dimensional image of a three-dimensional scene, said two-dimensional image comprising a plurality of vertices, edges and faces, each said vertex being defined by the intersection of at least two said edges of said two-dimensional image, each said face being bound by a closed chain of said edges, each said vertex being associatively linked with its defining intersecting edges and with the faces bound by the last recited defining edges, each said face being associatively linked with each said edge of the closed edge chain bounding the face, each said vertex, edge and face of said image being an image element, said apparatus comprising:

a parallel processing system comprising a plurality of processors each including processing means for performing arithmetic and logical functions and memory means for storing information, each said image element being stored in the memory means of a different one of said processors;

each particular said processor being intercoupled to at least read information stored in each other said processor storing one of said elements linked to the element stored in said particular processor;

each said processor further including:

(a) means for assigning a vertex label, an edge label and a face label respectively to each said vertex, edge and face of said image, each said vertex, edge and face label respectively being selected from predetermined hierarchies of said vertex, edge and face labels;

(b) means for assigning for each said vertex label a predetermined set of junctions that is consistent with said vertex label, each junction being a possible edge configuration;

(c) means for assignign for each said face all possible junction loops that are consistent with the face labels assigned to said face, each said junction loop being an n-tuple of said junctions and consisting of one said junction from each of n said vertices respectively at each of n said intersections of the edges bounding said face, each pair of vertices of said image being joined by a common image edge and respectively represented in each said function loop n-tuple by junctions respectively having the same edge label for said common edge;

(d) means for assigning for each said edge all possible junction pairs that are consistent with the edge labels assigned to said edge, each said junction pair being a two-tuple of said junctions and consisting of one of said junctions assigned to each said vertex at each end of said edge, within said junction pair the junctions respectively assigned to the vertices at the ends of said edge having the same edge label for that edge label for that edge; and (e) means for performing constraint satisfaction and propagation (CSP) between the linked vertices and edges of said image, between the linked vertices and faces of said image and between the linked edges and faces of said image, the CSP being performed using said junctions, said junction pairs and said junction loops assigned to said vertices, edges and faces of said image, respectively;

so that the junctions, junction pairs and junction loops and their respectively corresponding vertex, edge and face labels remaining upon completion of CSP are descriptive of said three-dimensional scene.

10. Apparatus for interpreting a two-dimensional image of a three-dimensional scene, said two-dimensional image comprising a plurality of vertices, edges and faces, each said vertex being defined by the intersection of at least two said edges in said two-dimensional image, each said face being bound by a closed chain of said edges, each said vertex being associatively linked with its defining intersecting edges and with the faces bounded by the last recited defining edges, each said face being associatively linked with each said edge of the closed edge chain bounding the face, said apparatus comprising:

(a) means for assigning a vertex label, an edge label and a face label respectively to each said vertex, edge and face of said image, each said vertex, edge and face label respectively being selected from predetermined hierarchies of said vertex, edge and face labels;

(b) means for assigning for each said vertex label a predetermined set of junctions that is consistent with said vertex label, each junction being a possible edge configuration;

(c) means for assigning for each said face all possible junction loops that are consistent with the face labels assigned to said face, each said junction loop being an n-tuple of said junctions and consisting of one said junction from each of n said vertices respectively at each of n said intersections of the edges bounding said face, each pair of vertices of said image being joined by a common image edge and respectively represented in each said junction loop n-tuple by junctions respectively having the same edge label for said common edge;

(d) means for assigning for each said edge all possible junction pairs that are consistent with the edge labels assigned to said edge, each said junction pair being a two-tuple of said junctions and consisting of one of said junctions assigned to each said vertex at each end of said edge, within said junction pair the junctions respectively assigned to the vertices at the ends of said edge having the same edge label for that edge; and (e) means for performing constraint satisfaction and propagation (CSP) between the linked vertices and edges of said image, between the linked vertices and faces of said image and between the linked edges and faces of said image, the CSP being performed using said junctions, said junction pairs and said junction loops assigned to said vertices, edges and faces of said images, respectively;

so that the junctions, junction pairs and junction loops and their respectively corresponding vertex, edge and face labels remaining upon completion of CSP are descriptive of said three-dimensional scene.

* * * * *